US007860439B2

(12) United States Patent

Kawada et al.

(10) Patent No.: US 7,860,439 B2
(45) Date of Patent: Dec. 28, 2010

(54) IMAGE FORMING APPARATUS, AN IMAGE FORMING METHOD AND AN IMAGE DETECTING METHOD

(75) Inventors: Kunihiro Kawada, Matsumoto (JP); Yujiro Nomura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 179 days.

(21) Appl. No.: 12/210,901

(22) Filed: Sep. 15, 2008

(65) Prior Publication Data

US 2009/0074438 A1 Mar. 19, 2009

(30) Foreign Application Priority Data

Sep. 18, 2007 (JP) ............................ 2007-240759
Jul. 31, 2008 (JP) ............................ 2008-198065

(51) Int. Cl.
*G03G 15/01* (2006.01)
*B41J 2/385* (2006.01)
*G01D 15/06* (2006.01)

(52) U.S. Cl. ...................................... 399/301; 347/116

(58) Field of Classification Search .................. 399/49, 399/51, 301; 347/116, 141
See application file for complete search history.

(56) References Cited

U.S. PATENT DOCUMENTS

| | | | | |
|---|---|---|---|---|
| 6,198,896 | B1 * | 3/2001 | Nakayasu et al. | 399/301 |
| 6,321,060 | B1 * | 11/2001 | Nakayasu et al. | 399/301 |
| 6,393,228 | B2 * | 5/2002 | Hisano | 399/49 |
| 6,701,117 | B2 * | 3/2004 | Kaji | 399/301 |

FOREIGN PATENT DOCUMENTS

| | | |
|---|---|---|
| JP | 2642351 | 8/1997 |
| JP | 2004-347999 | 12/2004 |

* cited by examiner

*Primary Examiner*—Sandra L Brase
(74) *Attorney, Agent, or Firm*—DLA Piper LLP (US)

(57) ABSTRACT

An image forming apparatus, includes: a latent image carrier that moves in a first direction; an exposure head that includes a light emitting element and an imaging optical system row which is arranged in the first direction and which is made up of imaging optical systems which are arranged in a second direction different from the first direction and image light emitted from the light emitting element on the latent image carrier; a developing unit that develops a latent image formed on the latent image carrier by the exposure head; and two detectors that detect an image obtained by developing a latent image by the developing unit, the latent image being formed using the same imaging optical system row.

15 Claims, 40 Drawing Sheets

IMAGE FORMING APPARATUS, AN IMAGE FORMING METHOD AND AN IMAGE DETECTING METHOD

CROSS REFERENCE TO RELATED APPLICATION

The disclosure of Japanese Patent Applications No. 2007-240759 filed on Sep. 18, 2007 and No. 2008-198065 filed on Jul. 31, 2008 including specification, drawings and claims is incorporated herein by reference in its entirety.

BACKGROUND

1. Technical Field

The invention relates to technology for forming a detection image and detecting the detection image by a plurality of detectors.

2. Related Art

An image forming apparatus for forming a latent image by exposing a photosensitive member surface by an exposure unit and forming an image by developing the latent image is known. For example, an image forming apparatus disclosed in Japanese Patent No. 2642351 or JP-A-2004-347999 forms desired images by successively forming linear latent images extending in a direction substantially orthogonal to a moving direction of a surface of a photosensitive drum by means of an exposure unit while moving the surface of the photosensitive drum in a specified direction. In the apparatus of Japanese Patent No. 2642351 and JP-A-2004-347999, a color image is formed by superimposing images of a plurality of colors formed as described above.

In such an image forming apparatus, there are cases where a plurality of detectors are provided, detection images are formed for the respective detectors and information on image formation is obtained from the detection results on the detection images by these plurality of detectors. For example, an image forming apparatus disclosed in Japanese Patent No. 2642351 obtains color misregistration information necessary for color image formation by forming detection images for a plurality of different colors ("detection pattern" of Japanese Patent No. 2642351). More specifically, this apparatus forms detection images of different colors for the formation of a satisfactory color image by properly superimposing toner images of the respective colors. The detection images are detected by optical sensors and the positions of the detection images are obtained from the detection results. The color misregistration information is obtained from the thus obtained positions of the detection images of the respective colors. Further, the apparatus disclosed in Japanese Patent No. 2642351 includes two optical sensors and forms the detection images for each optical sensor. The color misregistration information is obtained from the detection results on the detection images by the two optical sensors.

Further, an image forming apparatus disclosed in JP-A-2004-347999 forms detection images ("registration marks" in JP-A-2004-347999) to obtain information on color misregistration resulting from the tilt (skew) of an exposure unit relative to a photosensitive drum. Specifically, two optical sensors are arranged side by side in a direction orthogonal to a moving direction of a drum surface, and the detection images are formed for each optical sensor. The information on color misregistration resulting from the skew is obtained from the detection results of the respective optical sensors.

As described above, in the apparatuses disclosed in Japanese Patent No. 2642351 and JP-A-2004-347999, a plurality of detectors are provided, the detection images are formed for each detector, and the information on image formation is obtained from the detection results on the detection images by these plurality of detectors.

SUMMARY

In an apparatus which obtains the information on image formation by a plurality of detectors as described above, detection characteristics of the respective detectors are desirably the same. However, in the case of using a line head as described next as an exposure unit, there have been cases where the detection characteristics of the respective detectors differ due to a variation in the moving speed of a latent image carrier (photosensitive drum).

More specifically, this line head includes a plurality of light emitting elements grouped into light emitting element groups to realize the formation of high-resolution images. The respective light emitting element groups can expose mutually different areas in a direction orthogonal to a specified moving direction by emitting light beams toward a latent image carrier surface moving in the specified moving direction. In the case of forming detection images, the light emitting element groups form latent images by exposing the latent image carrier surface and these latent images are developed to form detection images. However, there are cases where the positions of the latent images formed by different light emitting element groups vary in a sub scanning direction due to a variation in the moving speed of the latent image carrier surface. A similar variation occurs in the detection images obtained by developing latent images with such a variation. As a result, there have been cases where the detection characteristics (sensing profiles) of the respective detectors differ as described later.

An advantage of some aspects of the invention is to provide technology for suppressing a difference in detection characteristic between detectors even if the above variation of detection images occurs.

According to a first aspect of the invention, there is provided an image forming apparatus, comprising: a latent image carrier that moves in a first direction; an exposure head that includes a light emitting element and an imaging optical system row which is arranged in the first direction and which is made up of imaging optical systems which are arranged in a second direction different from the first direction and image light emitted from the light emitting element on the latent image carrier; a developing unit that develops a latent image formed on the latent image carrier by the exposure head; and two detectors that detect an image obtained by developing a latent image by the developing unit, the latent image being formed using the same imaging optical system row.

According to a second aspect of the invention, there is provided an image forming method, comprising: exposing a latent image carrier that moves in a first direction by an exposure head that includes a light emitting element and an imaging optical system row which is arranged in the first direction and which is made up of an imaging optical system which is arranged in a second direction different from the first direction and images light emitted from the light emitting element on the latent image carrier; developing a latent image formed on the latent image carrier by the exposure head to form an image; and detecting an image obtained by developing a latent image formed using the same imaging optical system row by means of two detectors.

According to a third aspect of the invention, there is provided an image detecting method, comprising: exposing a latent image carrier that moves in a first direction by an exposure head that includes a light emitting element and an imaging optical system row which is arranged in the first direction and which is made up of an imaging optical system which is arranged in a second direction different from the first direction and images light emitted from the light emitting element; developing a latent image formed by the exposure head to form an image; and detecting an image obtained by developing a latent image formed using the same imaging optical system row by means of two detectors.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DESCRIPTION OF EXEMPLARY EMBODIMENTS

I. Basic Construction of an Image Forming Apparatus

Figure 1:
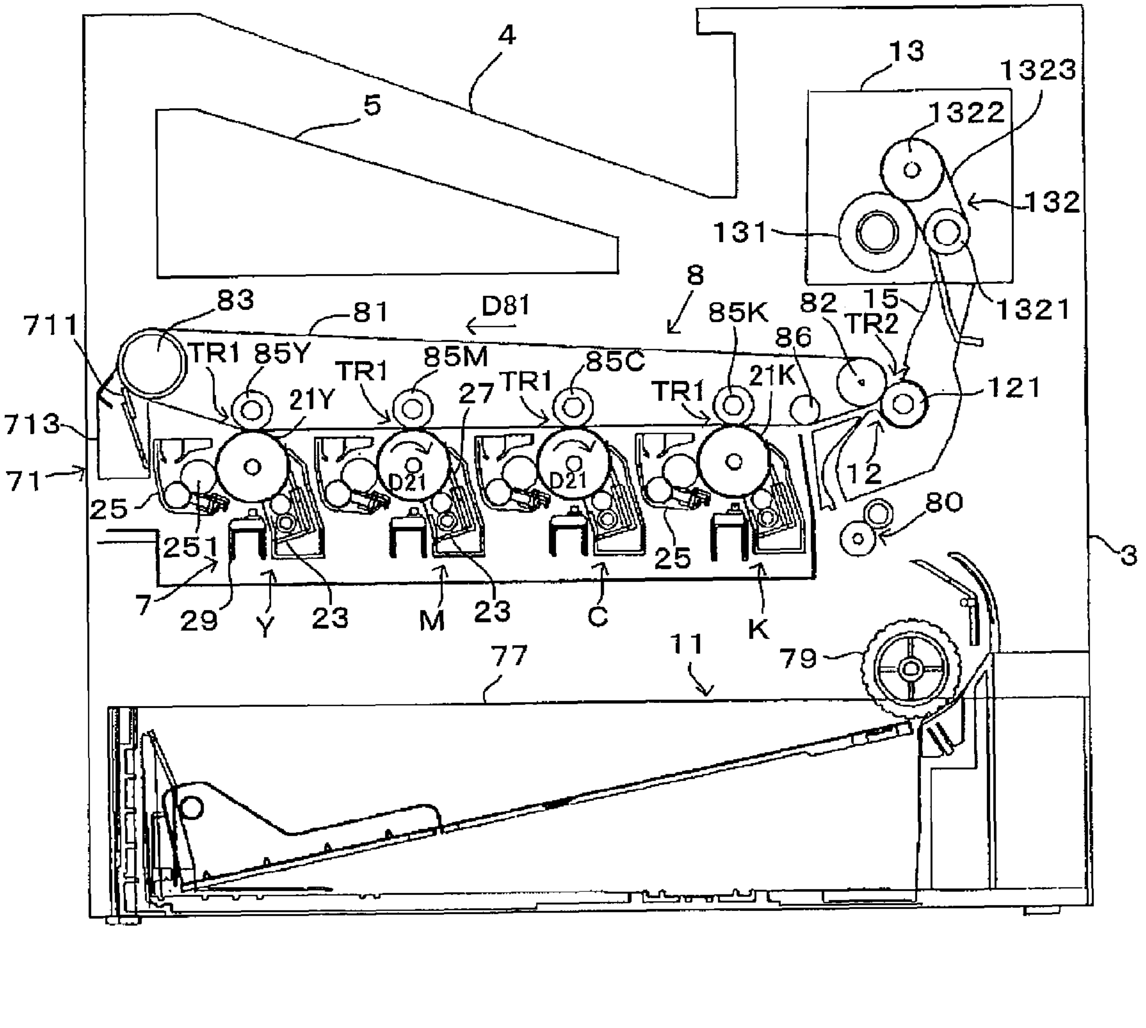
FIG. 1 is a diagram showing an embodiment of an image forming apparatus to which the invention is applicable.
Figure 2:
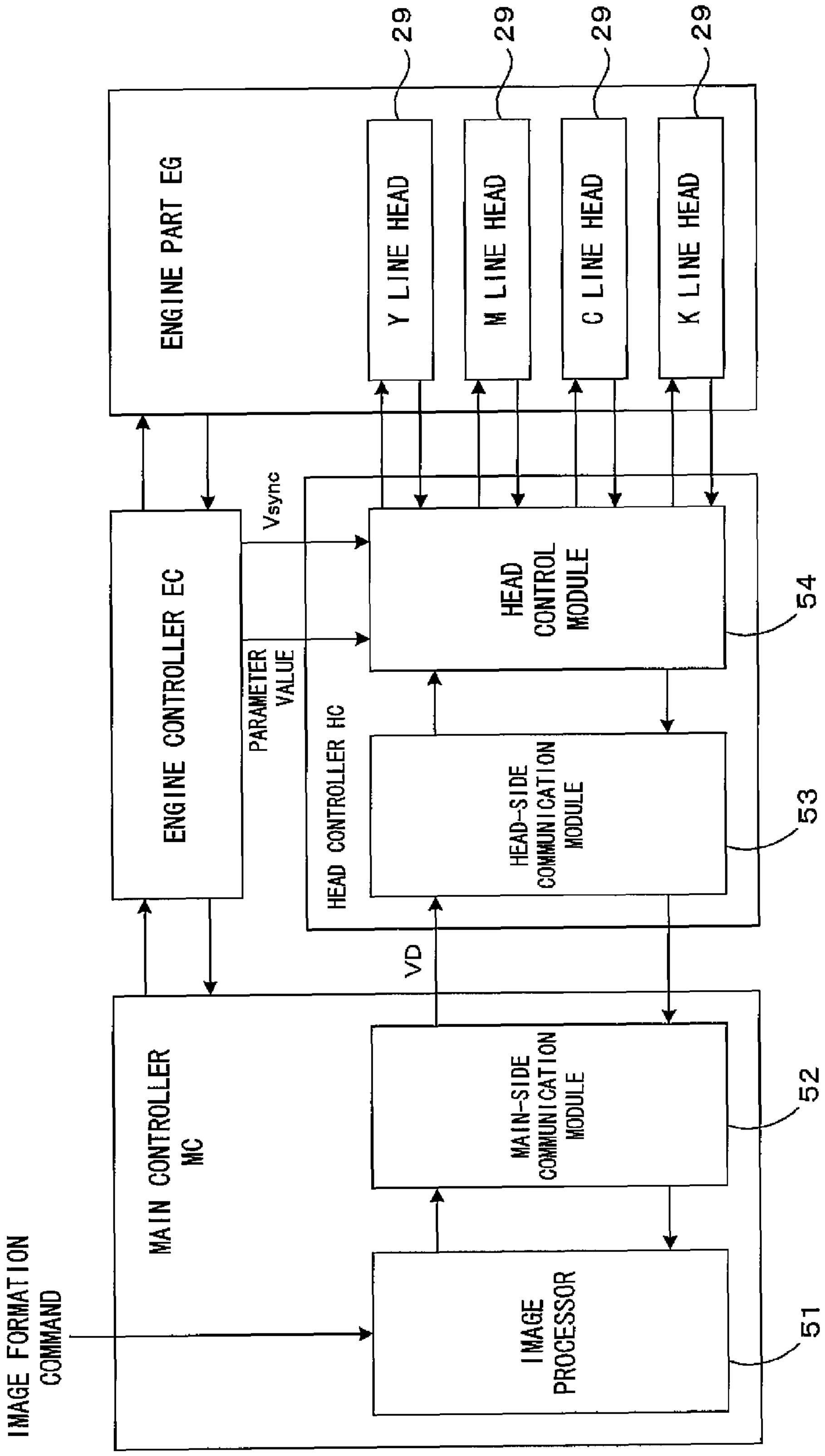
FIG. 2 is a diagram showing the electrical construction of the image forming apparatus of FIG. 1.

FIG. 1 is a diagram showing an embodiment of an image forming apparatus to which the invention is applicable. FIG. 2 is a diagram showing the electrical construction of the image forming apparatus of FIG. 1. This apparatus is an image forming apparatus that can selectively execute a color mode for forming a color image by superimposing four color toners of black (K), cyan (C), magenta (M) and yellow (Y) and a monochromatic mode for forming a monochromatic image using only black (K) toner. In other words, this image forming apparatus is of the so-called tandem one. FIG. 1 is a diagram corresponding to the execution of the color mode. In this image forming apparatus, when an image formation command is given from an external apparatus such as a host computer to a main controller MC having a CPU, a memory and the like, the main controller MC feeds a control signal and the like to an engine controller EC and feeds video data VD corresponding to the image formation command to a head controller HC. This head controller HC controls line heads 29 of the respective colors based on the video data VD from the main controller MC, a vertical synchronization signal Vsync from the engine controller EC and parameter values from the engine controller EC. In this way, an engine part EG performs a specified image forming operation to form an image corresponding to the image formation command on a sheet such as a copy sheet, transfer sheet, form sheet or transparent sheet for OHP.

An electrical component box 5 having a power supply circuit board, the main controller MC, the engine controller EC and the head controller HC built therein is disposed in a housing main body 3 of the image forming apparatus. An image forming unit 7, a transfer belt unit 8 and a sheet feeding unit 11 are also arranged in the housing main body 3. A secondary transfer unit 12, a fixing unit 13 and a sheet guiding member 15 are arranged at the right side in the housing main body 3 in FIG. 1. It should be noted that the sheet feeding unit 11 is detachably mountable into the housing main body 3. The sheet feeding unit 11 and the transfer belt unit 8 are so constructed as to be detachable for repair or exchange respectively.

The image forming unit 7 includes four image forming stations Y (for yellow), M (for magenta), C (for cyan) and K (for black) which form a plurality of images having different colors. Each of the image forming stations Y, M, C and K includes a cylindrical photosensitive drum 21 having a surface of a specified length in a main scanning direction MD. Each of the image forming stations Y, M, C and K forms a toner image of the corresponding color on the surface of the photosensitive drum 21. The photosensitive drum is arranged so that the axial direction thereof is substantially parallel to the main scanning direction MD. Each photosensitive drum 21 is connected to its own driving motor and is driven to rotate at a specified speed in a direction of arrow D21 in FIG. 1. Hence, the surface of the photosensitive drum 21 is rotated about a rotation axis of the photosensitive drum 21 and transported in a sub scanning direction SD which is orthogonal to or substantially orthogonal to the main scanning direction MD. Further, a charger 23, the line head 29, a developer 25 and a photosensitive drum cleaner 27 are arranged in a rotating direction around each photosensitive drum 21. A charging operation, a latent image forming operation and a toner developing operation are performed by these functional sections. Accordingly, a color image is formed by superimposing toner images formed by all the image forming stations Y, M, C and K on a transfer belt 81 of the transfer belt unit 8 at the time of executing the color mode, and a monochromatic image is formed using only a toner image formed by the image forming station K at the time of executing the monochromatic mode. Meanwhile, since the respective image forming stations of the image forming unit 7 are identically constructed, reference characters are given to only some of the image forming stations while being not given to the other image forming stations in order to facilitate the diagrammatic representation in FIG. 1.

The charger 23 includes a charging roller having the surface thereof made of an elastic rubber. This charging roller is constructed to be rotated by being held in contact with the surface of the photosensitive drum 21 at a charging position. As the photosensitive drum 21 rotates, the charging roller is rotated at the same circumferential speed in a direction driven by the photosensitive drum 21. This charging roller is connected to a charging bias generator (not shown) and charges the surface of the photosensitive drum 21 at the charging position where the charger 23 and the photosensitive drum 21 are in contact upon receiving the supply of a charging bias from the charging bias generator.

The line head 29 is arranged relative to the photosensitive drum 21 so that the longitudinal direction thereof corresponds to the main scanning direction MD and the width direction thereof corresponds to the sub scanning direction SD. Hence, the longitudinal direction of the line head 29 is substantially parallel to the main scanning direction MD. The line head includes a plurality of light emitting elements arrayed in the longitudinal direction and is positioned separated from the photosensitive drum 21. Light beams are emitted from these light emitting elements to irradiate (in other words, expose) the surface of the photosensitive drum 21 charged by the charger 23, thereby forming a latent image on this surface. The head controller HC is provided to control the line heads 29 of the respective colors, and controls the respective line heads 29 based on the video data VD from the main controller MC and a signal from the engine controller EC. Specifically, image data included in an image formation command is inputted to an image processor 51 of the main controller MC. Then, video data VD of the respective colors are generated by applying various image processings to the image data, and the video data VD are fed to the head controller HC via a main-side communication module 52. In the head controller HC, the video data VD are fed to a head control module 54 via a head-side communication module 53. Signals representing parameter values relating to the formation of a latent image and the vertical synchronization signal Vsync are fed to this head control module 54 from the engine controller EC as described above. Based on these signals, the video data VD and the like, the head controller HC generates signals for controlling the driving of the elements of the line heads 29 of the respective colors and outputs them to the respective line heads 29. In this way, the operations of the light emitting elements in the respective line heads 29 are suitably controlled to form latent images corresponding to the image formation command.

The photosensitive drum 21, the charger 23, the developer 25 and the photosensitive drum cleaner 27 of each of the image forming stations Y, M, C and K are unitized as a photosensitive cartridge. Further, each photosensitive cartridge includes a nonvolatile memory for storing information on the photosensitive cartridge. Wireless communication is performed between the engine controller EC and the respective photosensitive cartridges. By doing so, the information on the respective photosensitive cartridges is transmitted to the engine controller EC and information in the respective memories can be updated and stored.

The developer 25 includes a developing roller 251 carrying toner on the surface thereof. By a development bias applied to the developing roller 251 from a development bias generator (not shown) electrically connected to the developing roller 251, charged toner is transferred from the developing roller 251 to the photosensitive drum 21 to develop the latent image formed by the line head 29 at a development position where the developing roller 251 and the photosensitive drum 21 are in contact.

The toner image developed at the development position in this way is primarily transferred to the transfer belt 81 at a primary transfer position TR1 to be described later where the transfer belt 81 and each photosensitive drum 21 are in contact after being transported in the rotating direction D21 of the photosensitive drum 21.

Further, the photosensitive drum cleaner 27 is disposed in contact with the surface of the photosensitive drum 21 downstream of the primary transfer position TR1 and upstream of the charger 23 with respect to the rotating direction D21 of the photosensitive drum 21. This photosensitive drum cleaner 27 removes the toner remaining on the surface of the photosensitive drum 21 to clean after the primary transfer by being held in contact with the surface of the photosensitive drum.

The transfer belt unit 8 includes a driving roller 82, a driven roller (blade facing roller) 83 arranged to the left of the driving roller 82 in FIG. 1, and the transfer belt 81 mounted on these rollers. The surface of the transfer belt 81 is driven to turn in a conveying direction D81 orthogonal to the main scanning direction ND. The transfer belt unit 8 also includes four primary transfer rollers 85Y, 85M, 85C and 85K arranged inside the transfer belt 81 to face in a one-to-one relationship with the photosensitive drums 21 of the respective image forming stations Y, M, C and K when the photosensitive cartridges are mounted. These primary transfer rollers 85Y, 85M, 85C and 85K are respectively electrically connected to a primary transfer bias generator (not shown). As described in detail later, at the time of executing the color mode, all the primary transfer rollers 85Y, 85M, 85C and 85K are positioned on the sides of the image forming stations Y, M, C and K as shown in FIG. 1, whereby the transfer belt 81 is pressed into contact with the photosensitive drums 21 of the image forming stations Y, M, C and K to form the primary transfer positions TR1 between the respective photosensitive drums 21 and the transfer belt 81. By applying primary transfer biases from the primary transfer bias generator to the primary transfer rollers 85Y, 85M, 85C and 85K at suitable timings, the toner images formed on the surfaces of the respective photosensitive drums 21 are transferred to the surface of the transfer belt 81 at the corresponding primary transfer positions TR1 to form a color image.

On the other hand, out of the four primary transfer rollers 85Y, 85M, 85C and 85K, the color primary transfer rollers 85Y, 85M, 85C are separated from the facing image forming stations V; M and C and only the monochromatic primary transfer roller 85K is brought into contact with the image forming station K at the time of executing the monochromatic mode, whereby only the monochromatic image forming station K is brought into contact with the transfer belt 81. As a result, the primary transfer position TR1 is formed only between the monochromatic primary transfer roller 85K and the image forming station K. By applying a primary transfer bias at a suitable timing from the primary transfer bias generator to the monochromatic primary transfer roller 85K, the toner image formed on the surface of the photosensitive drum 21 is transferred to the surface of the transfer belt 81 at the primary transfer position TR1 to form a monochromatic image.

The transfer belt unit 8 further includes a downstream guide roller 86 disposed downstream of the monochromatic primary transfer roller 85K and upstream of the driving roller 82. This downstream guide roller 86 is so disposed as to come into contact with the transfer belt 81 on an internal common tangent to the primary transfer roller 85K and the photosensitive drum 21 at the primary transfer position TR1 formed by the contact of the monochromatic primary transfer roller 85K with the photosensitive drum 21 of the image forming station K.

The driving roller 82 drives to rotate the transfer belt 81 in the direction of the arrow D81 and doubles as a backup roller for a secondary transfer roller 121. A rubber layer having a thickness of about 3 mm and a volume resistivity of 1000 kΩ·cm or lower is formed on the circumferential surface of the driving roller 82 and is grounded via a metal shaft, thereby serving as an electrical conductive path for a secondary transfer bias to be supplied from an unillustrated secondary transfer bias generator via the secondary transfer roller 121. By providing the driving roller 82 with the rubber layer having high friction and shock absorption, an impact caused upon the entrance of a sheet into a contact part (secondary transfer position TR2) of the driving roller 82 and the secondary transfer roller 121 is unlikely to be transmitted to the transfer belt 81 and image deterioration can be prevented.

The sheet feeding unit 11 includes a sheet feeding section which has a sheet cassette 77 capable of holding a stack of sheets, and a pickup roller 79 which feeds the sheets one by one from the sheet cassette 77. The sheet fed from the sheet feeding section by the pickup roller 79 is fed to the secondary transfer position TR2 along the sheet guiding member 15 after having a sheet feed timing adjusted by a pair of registration rollers 80.

The secondary transfer roller 121 is provided freely to abut on and move away from the transfer belt 81, and is driven to abut on and move away from the transfer belt 81 by a secondary transfer roller driving mechanism (not shown). The fixing unit 13 includes a heating roller 131 which is freely rotatable and has a heating element such as a halogen heater built therein, and a pressing section 132 which presses this heating roller 131. The sheet having an image secondarily transferred to the front side thereof is guided by the sheet guiding member 15 to a nip portion formed between the heating roller 131 and a pressure belt 1323 of the pressing section 132, and the image is thermally fixed at a specified temperature in this nip portion. The pressing section 132 includes two rollers 1321 and 1322 and the pressure belt 1323 mounted on these rollers. Out of the surface of the pressure belt 1323, a part stretched by the two rollers 1321 and 1322 is pressed against the circumferential surface of the heating roller 131, thereby forming a sufficiently wide nip portion between the heating roller 131 and the pressure belt 1323. The sheet having been subjected to the image fixing operation in this way is transported to the discharge tray 4 provided on the upper surface of the housing main body 3.

Further, a cleaner 71 is disposed facing the blade facing roller 83 in this apparatus. The cleaner 71 includes a cleaner blade 711 and a waste toner box 713. The cleaner blade 711 removes foreign matters such as toner remaining on the transfer belt after the secondary transfer and paper powder by holding the leading end thereof in contact with the blade facing roller 83 via the transfer belt 81. Foreign matters thus removed are collected into the waste toner box 713. Further, the cleaner blade 711 and the waste toner box 713 are constructed integral to the blade facing roller 83. Accordingly, when the blade facing roller 83 moves, the cleaner blade 711 and the waste toner box 713 move together with the blade facing roller 83.

II. Construction of Line Head

Figure 3:
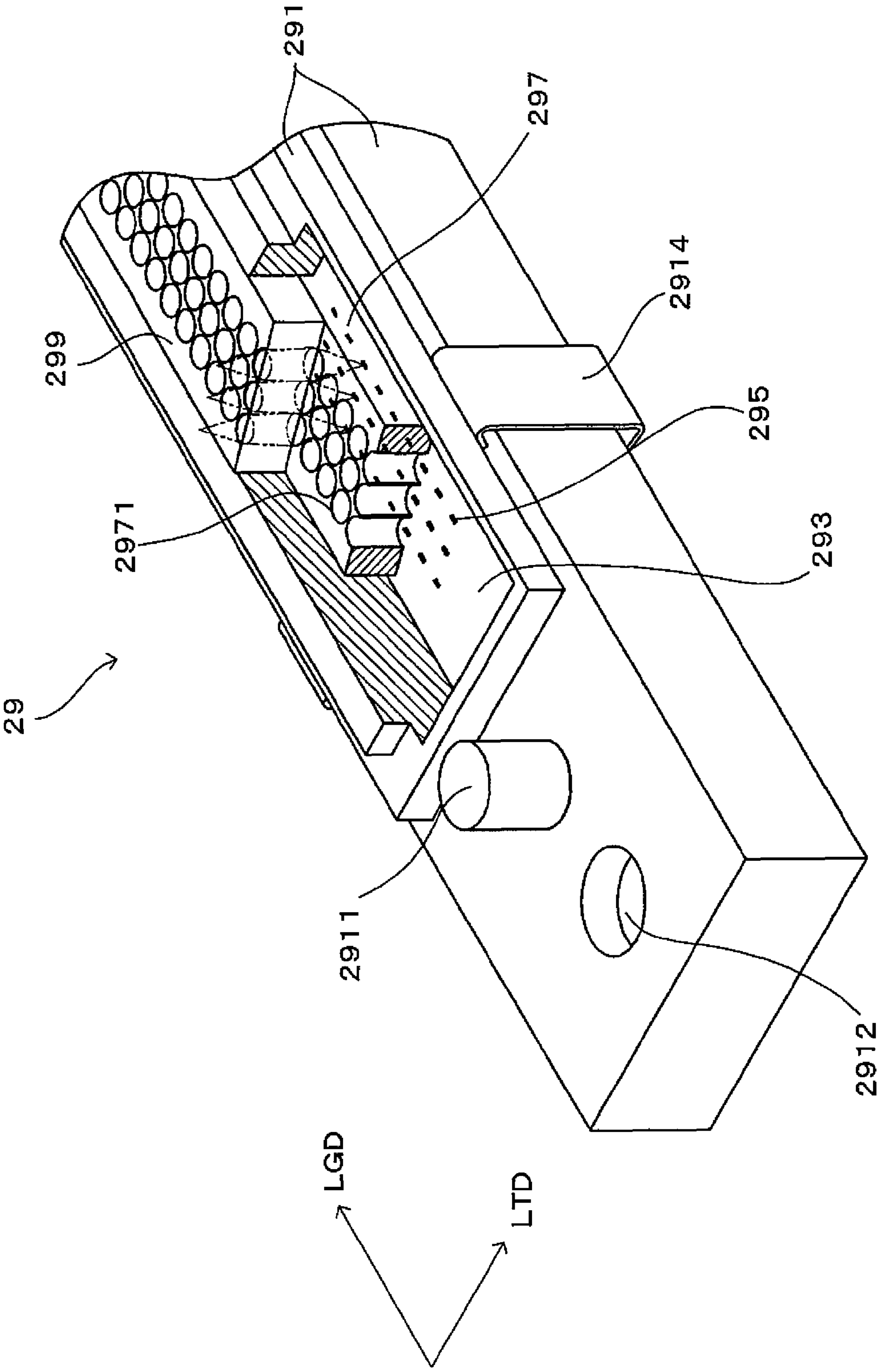
FIG. 3 is a perspective view schematically showing a line head.
Figure 4:
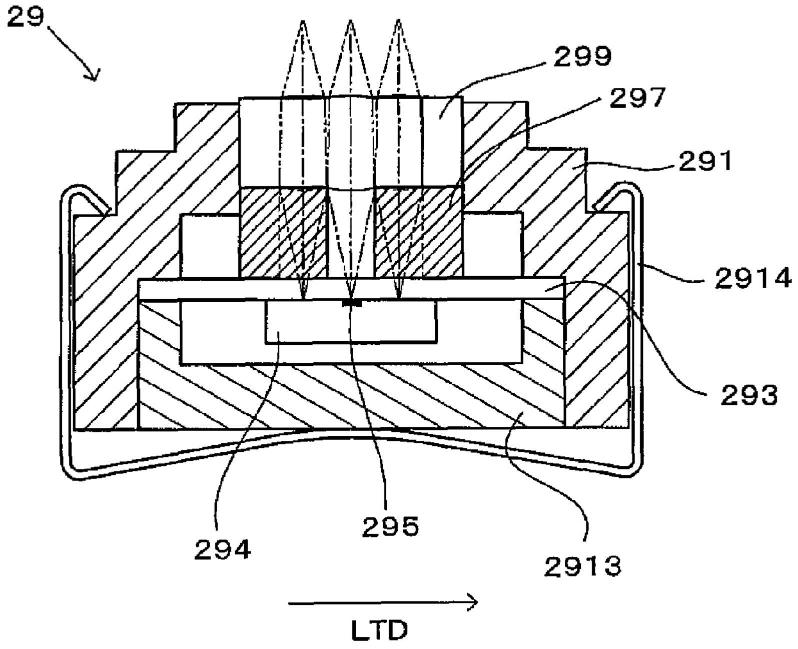
FIG. 4 is a sectional view along a width direction of the line head shown in FIG. 3.

FIG. 3 is a perspective view schematically showing a line head, and FIG. 4 is a sectional view along a width direction of the line head shown in FIG. 3. As described above, the line head 29 is arranged to face the photosensitive drum 21 such that the longitudinal direction LGD corresponds to the main scanning direction MD and the width direction LTD corresponds to the sub scanning direction SD. The longitudinal direction LGD and the width direction LTD are normal to or substantially normal to each other. Hence, the longitudinal direction LGD is parallel to or substantially parallel to the main scanning direction MD while the width direction LTD is parallel to or substantially parallel to the sub scanning direction SD. The line head 29 of this embodiment includes a case 291, and a positioning pin 2911 and a screw insertion hole 2912 are provided at each of the opposite ends of such a case 291 in the longitudinal direction LGD. The line head 29 is positioned relative to the photosensitive drum 21 by fitting such positioning pins 2911 into positioning holes (not shown) perforated in a photosensitive drum cover (not shown) covering the photosensitive drum 21 and positioned relative to the photosensitive drum 21. Further, the line head 29 is positioned and fixed relative to the photosensitive drum 21 by screwing fixing screws into screw holes (not shown) of the photosensitive drum cover via the screw insertion holes 2912 to be fixed.

The case 291 carries a lens array 299 at a position facing the surface of the photosensitive drum 21, and includes a light shielding member 297 and a head substrate 293 inside, the light shielding member 297 being closer to the lens array 299 than the head substrate 293. The head substrate 293 is made of a transmissive material (glass for instance). Further, a plurality of light emitting element groups 295 are provided on an under surface of the head substrate 293 (surface opposite to the lens array 299 out of two surfaces of the head substrate 293). Specifically, the plurality of light emitting element groups 295 are two-dimensionally arranged on the under surface of the head substrate 293 while being spaced by specified distances in the longitudinal direction LGD and the width direction LTD. Here, each light emitting element group 295 is formed by two-dimensionally arraying a plurality of light emitting elements. This will be described in detail later. Bottom emission-type EL (electroluminescence) devices are used as the light emitting elements. In other words, the organic EL devices are arranged as light emitting elements on the under surface of the head substrate 293. Thus, all the light emitting elements 2951 are arranged on the same plane (under surface of the head substrate 293). When the respective light emitting elements are driven by a drive circuit formed on the head substrate 293, light beams are emitted from the light emitting elements in directions toward the photosensitive drum 21. These light beams propagate toward the light shielding member 297 after passing through the head substrate 293 from the under surface thereof to a top surface thereof.

The light shielding member 297 is perforated with a plurality of light guide holes 2971 in a one-to-one correspondence with the plurality of light emitting element groups 295. The light guide holes 2971 are substantially cylindrical holes penetrating the light shielding member 297 and having central axes in parallel with normals to the head substrate 293. Accordingly, out of light beams emitted from the light emitting element groups 295, those propagating toward other than the light guide holes 2971 corresponding to the light emitting element groups 295 are shielded by the light shielding member 297. In this way, all the lights emitted from one light emitting element group 295 propagate toward the lens array 299 via the same light guide hole 2971 and the mutual interference of the light beams emitted from different light emitting element groups 295 can be prevented by the light shielding member 297. The light beams having passed through the light guide holes 2971 perforated in the light shielding member 297 are imaged as spots on the surface of the photosensitive drum 21 by the lens array 299.

As described above, in this embodiment, some lights out of lights being emitted from the light emitting elements 2951 pass through the light guide holes 2971 formed in the light shielding member 297. The some lights are incident on the lenses LS and contribute to image formation. In other words, the lights incident on the lenses LS and contributing to image formation are restricted by the light shielding member 297. Accordingly, a problem of disturbing the formed image by stray lights and the like is suppressed by the light shielding member 297, and a detection image such as a registration mark RM to be described later can be satisfactorily formed. By detecting a detection image satisfactorily formed in this way, the detection result on the detection image can be made stable.

As shown in FIG. 4, an underside lid 2913 is pressed against the case 291 via the head substrate 293 by retainers 2914. Specifically, the retainers 2914 have elastic forces to press the underside lid 2913 toward the case 291, and seal the inside of the case 291 light-tight (that is, so that light does not leak from the inside of the case 291 and so that light does not intrude into the case 291 from the outside) by pressing the underside lid by means of the elastic force. It should be noted that a plurality of the retainers 2914 are provided at a plurality of positions in the longitudinal direction of the case 291. The light emitting element groups 295 are covered with a sealing member 294.

Figure 5:
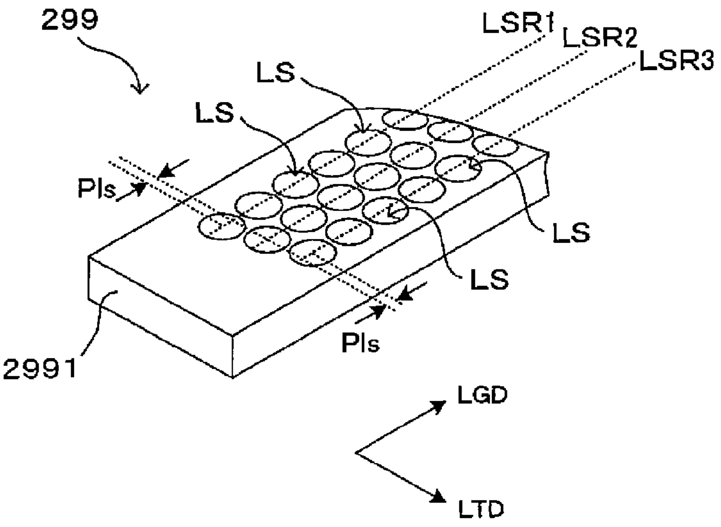
FIG. 5 is a schematic partial perspective view of the lens array.
Figure 6:
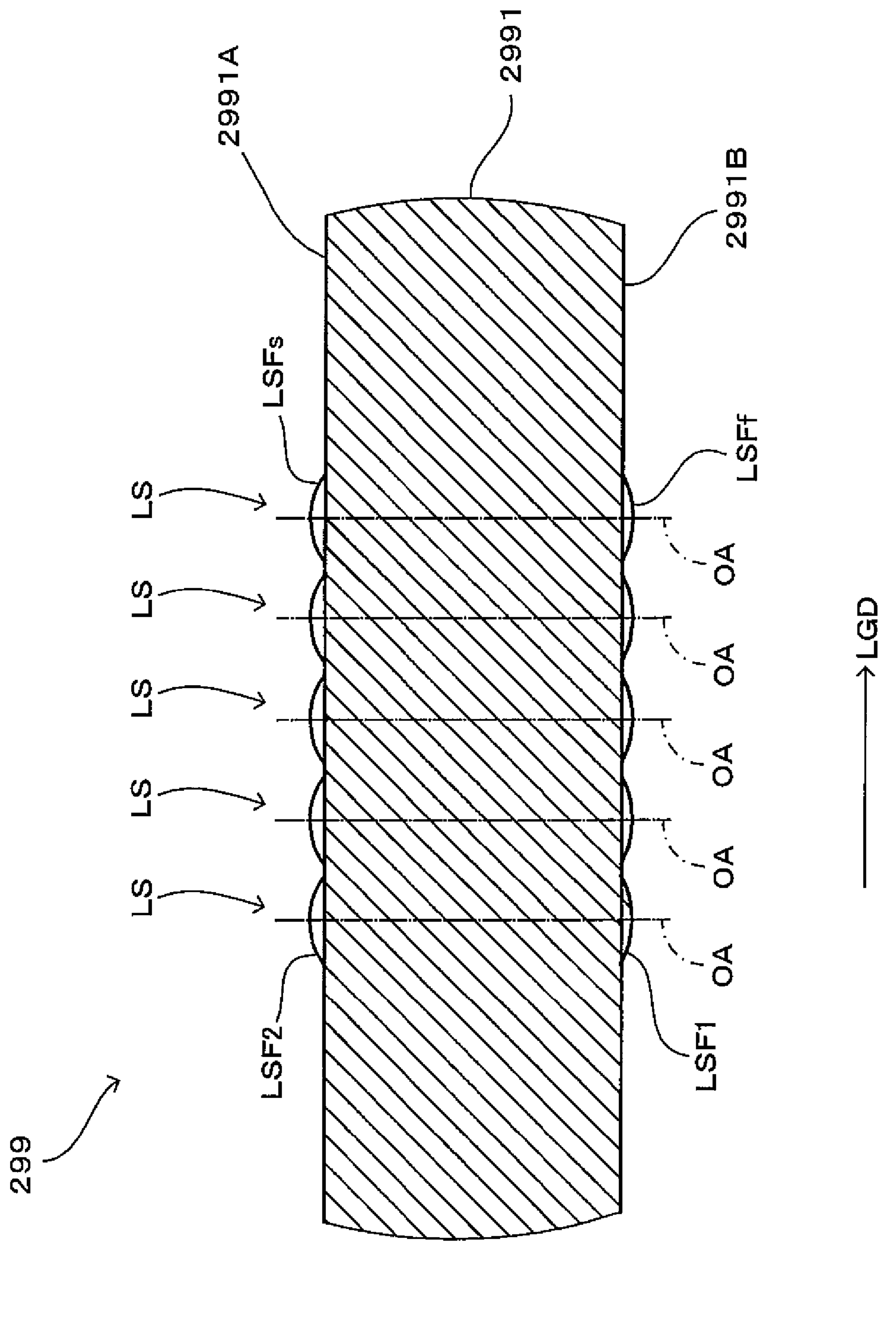
FIG. 6 is a sectional view of the lens array in the longitudinal direction.

FIG. 5 is a schematic partial perspective view of the lens array, and FIG. 6 is a sectional view of the lens array in the longitudinal direction LGD. The lens array 299 includes a lens substrate 2991. First surfaces LSFf of lenses LS are formed on an under surface 29911B of the lens substrate 2991, and second surfaces LSFs of the lenses LS are formed on a top surface 2991A of the lens substrate 2991. The first and second surfaces LSFf, LSFs facing each other and the lens substrate 2991 held between these two surfaces function as one lens LS. The first and second surfaces LSFf, LSFs of the lenses LS can be made of resin for instance.

The lens array 299 is arranged such that optical axes OA of the plurality of lenses LS are substantially parallel to each other. The lens array 299 is also arranged such that the optical axes OA of the lenses LS are substantially normal to the under surface (surface where the light emitting elements 2951 are arranged) of the head substrate 293. At this time, these plurality of lenses LS are arranged in a one-to-one correspondence with the plurality of light emitting element groups 295.

In other words, the plurality of lenses LS are two-dimensionally arranged at specified intervals in the longitudinal direction LGD and in the width direction LTD corresponding to the arrangement of the light emitting element groups 295 to be described later, and focus the lights from the corresponding light emitting element groups 295 to expose the surface of the photosensitive drum 21. These respective lenses LS are arranged as follows. Specifically, a plurality of lens rows LSR, in each of which a plurality of lenses LS are aligned in the longitudinal direction LGD, are arranged in the width direction LTD. In this embodiment, three lens rows LSR1, LSR2, LSR3 are arranged in the width direction LTD. The three lens rows LSR1 to LSR3 are arranged at specified lens pitches Pls in the longitudinal direction, so that the positions of the respective lenses LS differ in the longitudinal direction LGD. In this way, the respective lenses LS can expose regions mutually different in the main scanning direction MD.

Figure 7:
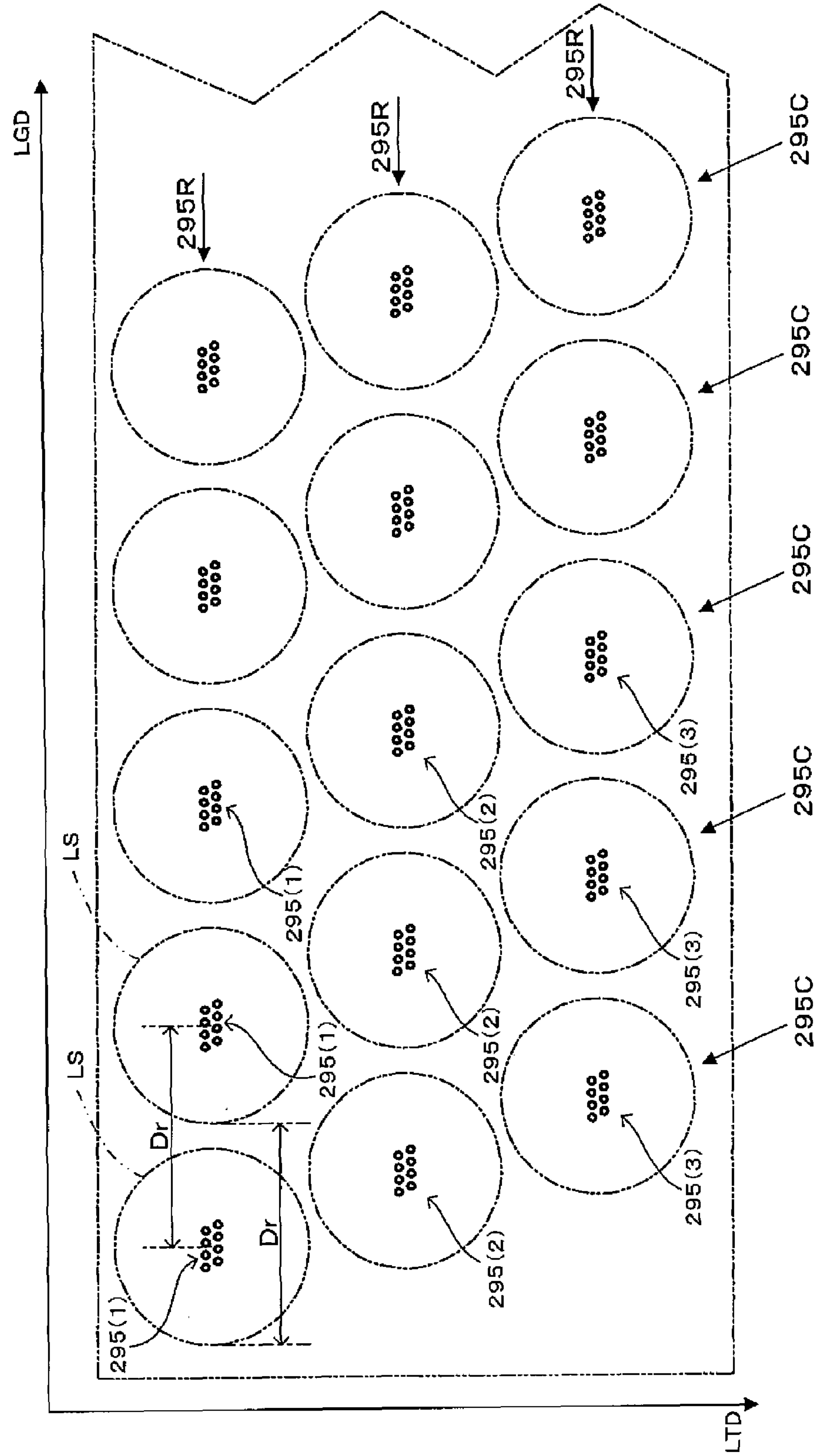
FIG. 7 is a diagram showing the arrangement of the light emitting element groups in the line head.
Figure 8:
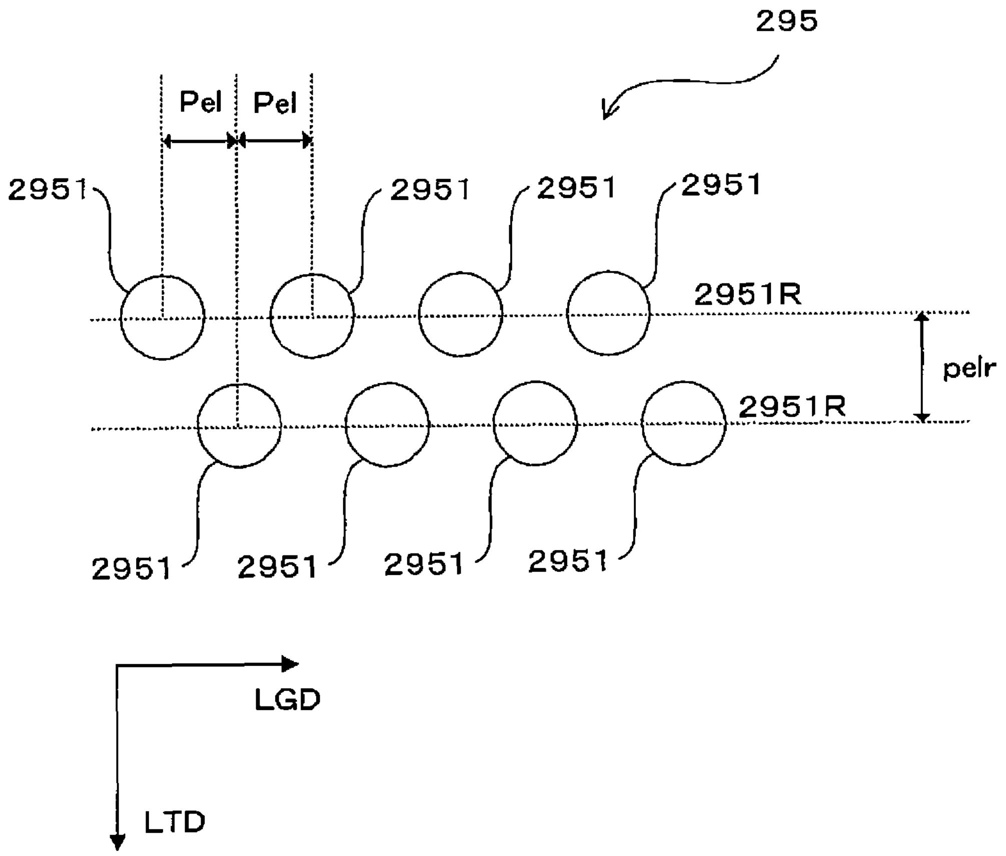
FIG. 8 is a diagram showing the arrangement of the light emitting elements in each light emitting element group.

FIG. 7 is a diagram showing the arrangement of the light emitting element groups in the line head, and FIG. 8 is a diagram showing the arrangement of the light emitting elements in each light emitting element group. The construction of the respective light emitting element groups will be described with reference to FIGS. 7 and 8. Eight light emitting elements 2951 are aligned at specified element pitches Pel in the longitudinal direction LGD in each light emitting element group 295. In each light emitting element group 295, two light emitting element rows 2951R each formed by aligning four light emitting elements 2951 at specified pitches (twice the element pitch Pel) in the longitudinal direction LGD are arranged while being spaced apart by an element row pitch Pelr in the width direction LTD. As a result, eight light emitting elements 2951 are arranged in a staggered manner in each of the light emitting element groups 295. The plurality of light emitting element groups 295 are arranged as follows.

A plurality of light emitting element groups 295 are arranged such that a plurality of light emitting element group columns 295C each including three light emitting element groups 295(1), 295(2) and 295(3) assigned with numbers of 1 to 3 and displaced in the width direction LTD and the longitudinal direction LGD are arranged at group column pitches Dr in the longitudinal direction LGD. The longitudinal-direction positions of the respective light emitting element groups 295 differ, and the respective light emitting element groups 295 can expose mutually different areas in the main scanning direction MD as described later. This group column pitch Dr is a pitch between two light emitting element groups 295 adjacent in the longitudinal direction LGD and equal to a pitch between two lenses LS adjacent in the longitudinal direction LGD. A plurality of light emitting element groups 295 arranged in the longitudinal direction LGD (in other words, a plurality of light emitting element groups 295 arranged at the same width-direction position) is particularly defined to be a light emitting element group row 295R. In this specification, it is assumed that the geometric center of gravity of the light emitting element 2951 is the position of the light emitting element 2951, and the geometric center of gravity of all the light emitting elements belonging to the same light emitting element group 295 is the position of the light emitting element group 295. Further, the longitudinal-direction position and the width-direction position respectively mean a longitudinal-direction component and a width-direction component of a target position.

In this way, as shown in FIG. 7, the respective light emitting element groups 295 are arranged at mutually different positions in the longitudinal direction LGD and arranged such that the positions thereof come in an order of 295(1), 295(2), 295(3), 295(1), 295(2), . . . in the longitudinal direction LGD (arrangement direction). In other words, the respective light emitting element groups 295 are arranged in the order of 295(1), 295(2), 295(3), 295(1), 295(2), . . . in the longitudinal direction LGD (arrangement direction).

The detailed mutual relationship of the light emitting element groups 295, the light guide holes 2971 and the lenses LS is as follows. Specifically, the light guide holes 2971 are perforated in the light shielding member 297 and the lenses LS are arranged in conformity with the arrangement of the light emitting element groups 295. At this time, the center of gravity position of the light emitting element groups 295, the center axes of the light guide holes 2971 and the optical axes OA of the lenses LS substantially coincide. Accordingly, light beams emitted from the light emitting elements 2951 of the light emitting element groups 295 are incident on the lenses LS of the lens array 299 through the light guide holes 2971. Spots are formed on the surface of the photosensitive drum 21 (photosensitive member surface) by imaging these incident light beams by the lenses LS, whereby the photosensitive member surface is exposed. A latent image is formed in the thus exposed part.

III. Terminology in Line Head

Figure 9:
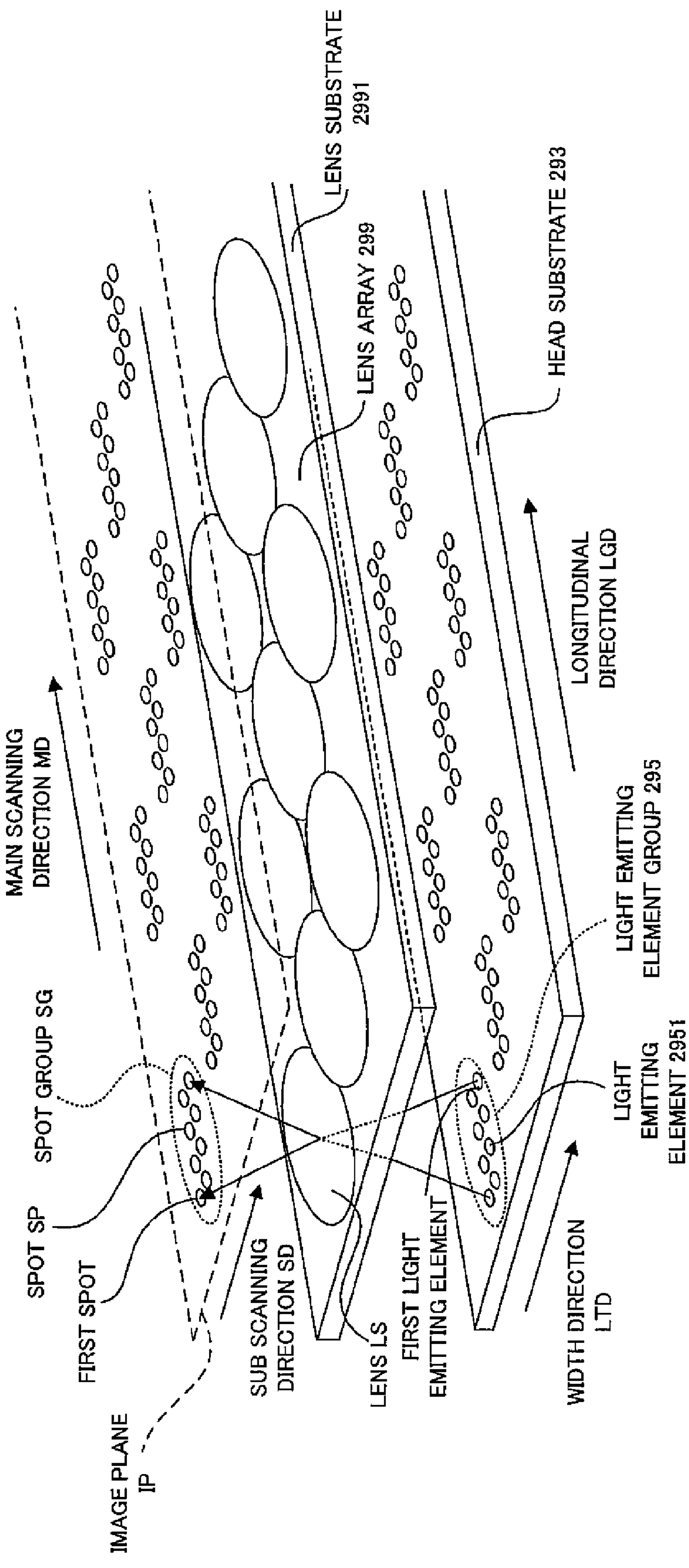
FIGS. 9 and 10 are diagrams showing terminology used in this specification.
Figure 10:
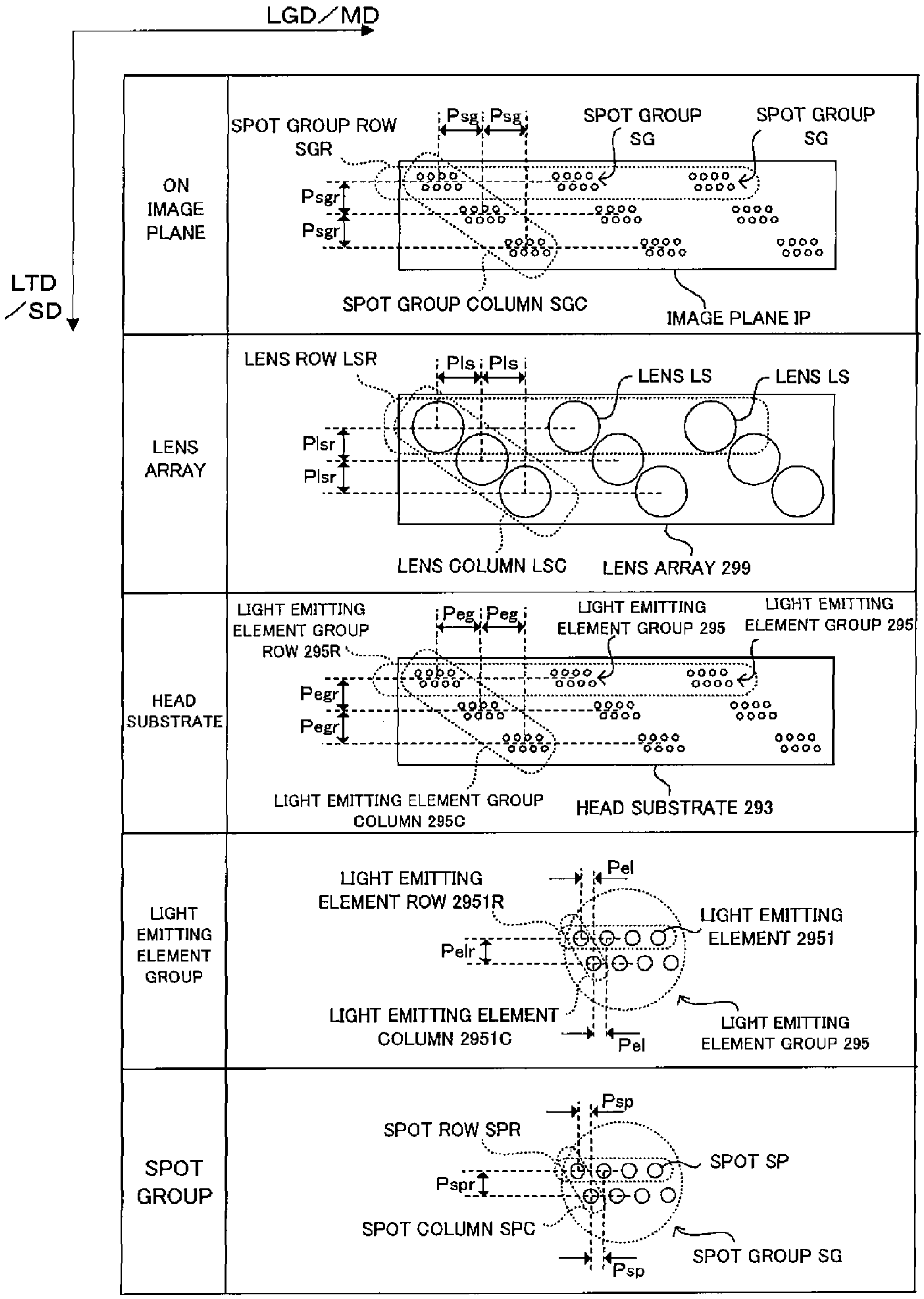

FIGS. 9 and 10 are diagrams showing terminology used in this specification. Here, terminology used in this specification is organized with reference to FIGS. 9 and 10. In this specification, as described above, a conveying direction of the surface (image plane IP) of the photosensitive drum 21 is defined to be the sub scanning direction SD and a direction substantially normal to the sub scanning direction SD is defined to be the main scanning direction MD. Further, a line head 29 is arranged relative to the surface (image plane IP) of the photosensitive drum 21 such that its longitudinal direction LGD corresponds to the main scanning direction MD and its width direction LTD corresponds to the sub scanning direction SD.

Collections of a plurality of (eight in FIGS. 9 and 10) light emitting elements 2951 arranged on the head substrate 293 in one-to-one correspondence with the plurality of lenses LS of the lens array 299 are defined to be light emitting element groups 295. In other words, in the head substrate 293, the plurality of light emitting element groups 295 including a plurality of light emitting elements 2951 are arranged in conformity with the plurality of lenses LS, respectively. Further, collections of a plurality of spots SP formed on the image plane IP by imaging light beams from the light emitting element groups 295 toward the image plane IP by the lenses LS corresponding to the light emitting element groups 295 are defined to be spot groups SG. In other words, a plurality of spot groups SG can be formed in one-to-one correspondence with the plurality of light emitting element groups 295. In each spot group SG the most upstream spot in the main scanning direction MD and the sub scanning direction SD is particularly defined to be a first spot. The light emitting element 2951 corresponding to the first spot is particularly defined to be a first light emitting element.

The lens LS has a negative optical magnification and forms the spot group SG by inverting light beams from the corresponding light emitting element group 295.

Further, spot group rows SGR and spot group columns SGC are defined as shown in the column "On Image Plane" of FIG. 10. Specifically, a plurality of spot groups SG aligned in the main scanning direction MD is defined to be the spot group row SGR. A plurality of spot group rows SGR are arranged at specified spot group row pitches Psgr in the sub scanning direction SD. Further, a plurality of (three in FIG. 10) spot groups SG arranged at the spot group row pitches Psgr in the sub scanning direction SD and at spot group pitches Psg in the main scanning direction MD are defined to be the spot group column SGC. It should be noted that the spot group row pitch Psgr is a distance in the sub scanning direction SD between the geometric centers of gravity of the two spot group rows SGR side by side with the same pitch and that the spot group pitch Psg is a distance in the main scanning direction MD between the geometric centers of gravity of the two spot groups SG side by side with the same pitch.

Lens rows LSR and lens columns LSC are defined as shown in the column of "Lens Array" of FIG. 10. Specifically, a plurality of lenses LS aligned in the longitudinal direction LGD is defined to be the lens row LSR. A plurality of lens rows LSR are arranged at specified lens row pitches Plsr in the width direction LTD. Further, a plurality of (three in FIG. 10) lenses LS arranged at the lens row pitches Plsr in the width direction LTD and at lens pitches Pls in the longitudinal direction LGD are defined to be the lens column LSC. It should be noted that the lens row pitch Plsr is a distance in the width direction LTD between the geometric centers of gravity of the two lens rows LSR side by side with the same pitch and that the lens pitch Pls is a distance in the longitudinal direction LGD between the geometric centers of gravity of the two lenses LS side by side with the same pitch.

Light emitting element group rows 295R and light emitting element group columns 295C are defined as in the column "Head Substrate" of FIG. 10. Specifically, a plurality of light emitting element groups 295 aligned in the longitudinal direction LGD is defined to be the light emitting element group row 295R. A plurality of light emitting element group rows 295R are arranged at specified light emitting element group row pitches Pegr in the width direction LTD. Further, a plurality of (three in FIG. 10) light emitting element groups 295 arranged at the light emitting element group row pitches Pegr in the width direction LTD and at light emitting element group pitches Peg in the longitudinal direction LGD are defined to be the light emitting element group column 295C. It should be noted that the light emitting element group row pitch Pegr is a distance in the width direction LTD between the geometric centers of gravity of the two light emitting element group rows 295R side by side with the same pitch and that the light emitting element group pitch Peg is a distance in the longitudinal direction LGD between the geometric centers of gravity of the two light emitting element groups 295 side by side with the same pitch.

Light emitting element rows 2951R and light emitting element columns 2951C are defined as in the column "Light Emitting Element Group" of FIG. 10. Specifically, in each light emitting element group 295, a plurality of light emitting elements 2951 aligned in the longitudinal direction LGD is defined to be the light emitting element row 2951R. A plurality of light emitting element rows 2951R are arranged at specified light emitting element row pitches Pelr in the width direction LTD. Further, a plurality of (two in FIG. 10) light emitting elements 2951 arranged at the light emitting element row pitches Pelr in the width direction LTD and at light emitting element pitches Pel in the longitudinal direction LGD are defined to be the light emitting element column 2951C. It should be noted that the light emitting element row pitch Pelr is a distance in the width direction LTD between the geometric centers of gravity of the two light emitting element rows 2951R side by side with the same pitch and that the light emitting element pitch Pel is a distance in the longitudinal direction LGD between the geometric centers of gravity of the two light emitting elements 2951 side by side with the same pitch.

Spot rows SPR and spot columns SPC are defined as shown in the column "Spot Group" of FIG. 10. Specifically, in each spot group SG, a plurality of spots SP aligned in the longitudinal direction LGD is defined to be the spot row SPR. A plurality of spot rows SPR are arranged at specified spot row pitches Pspr in the width direction LTD. Further, a plurality of (two in FIG. 10) spots arranged at the spot row pitches Pspr in the width direction LTD and at spot pitches Psp in the longitudinal direction LGD are defined to be the spot column SPC. It should be noted that the spot row pitch Pspr is a distance in the sub scanning direction SD between the geometric centers of gravity of the two spot rows SPR side by side with the same pitch and that the spot pitch Psp is a distance in the main scanning direction MD between the geometric centers of gravity of the two spots SP side by side with the same pitch.

IV. Exposure Operation by Line Head

Figure 11:
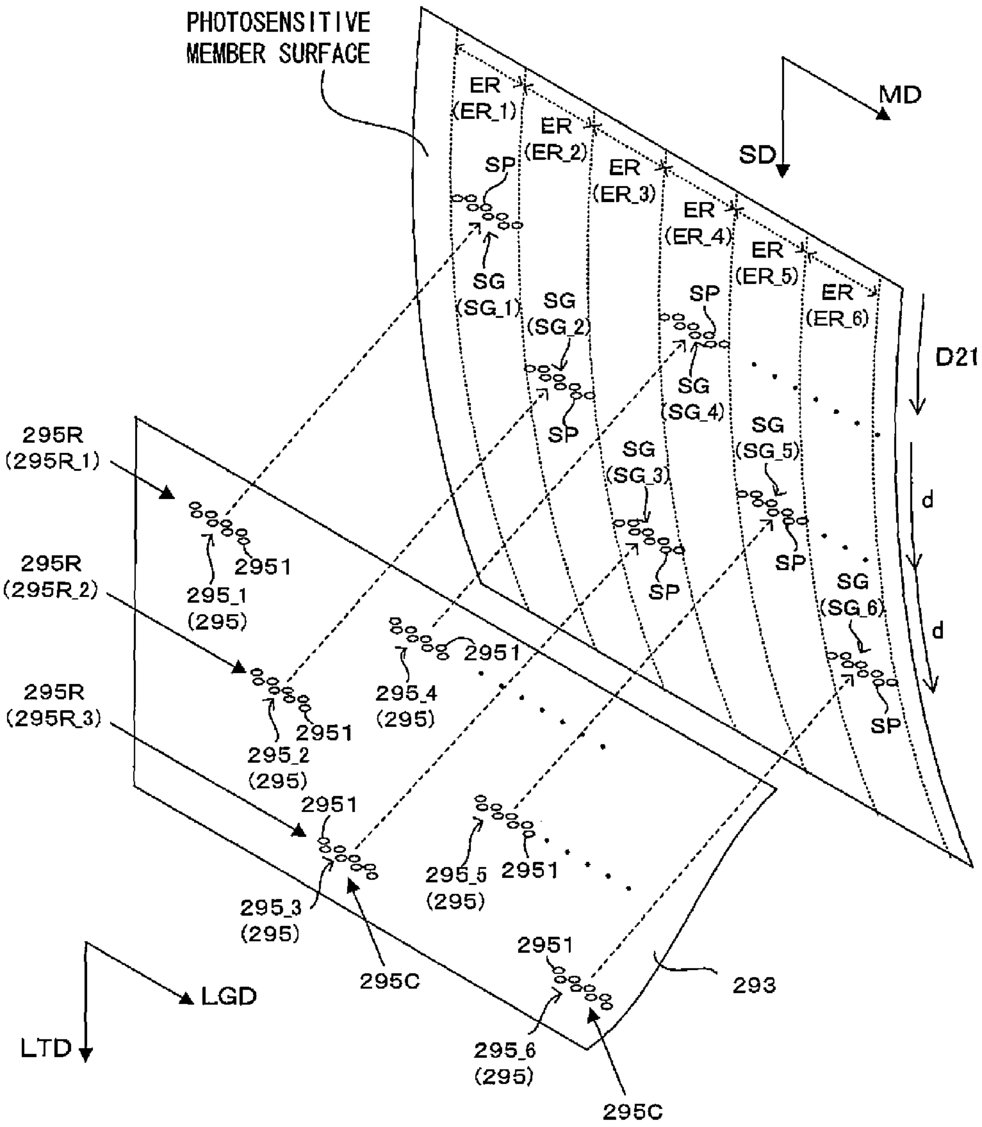
FIG. 11 is a perspective view showing an exposure operation by the line head.

FIG. 11 is a perspective view showing an exposure operation by the line head. As described above, the exposure operation is performed by the lenses LS imaging the lights from the light emitting element groups 295. In FIG. 11, the lens array is not shown. The spot groups SG described next are formed on the photosensitive member surface by imaging the lights from the light emitting element groups 295 by the lenses LS. However, in the following description, the imaging operations of the lenses LS are omitted if necessary and it is merely described that "the light emitting element groups 295 form the spot groups SG" in order to facilitate the understanding of the exposure operation. As shown in FIG. 11, the respective light emitting element groups 295 expose mutually different regions ER (ER1 to ER6). For example, the light emitting element group 295_1 forms the spot group SG_1 on the photosensitive member surface moving in the sub scanning direction SD (first direction D21) by emitting light beams from the respective light emitting elements 2951. In this way, the light emitting element group 295_1 exposes the region ER_1 of a specified width in the main scanning direction MD. Similarly, the light emitting element groups 295_2 to 295_6 expose the regions ER_2 to ER_6.

In the line head 29, the light emitting element group column 295C is formed by offsetting three light emitting element groups 295 from each other in the width direction LTD and in the longitudinal direction LGD. For example, as shown in FIG. 11, the light emitting element groups 295_1 to 295_3 constituting the light emitting element group column 295C are offset from each other in the width direction LTD. The three light emitting element groups 295 constituting the light emitting element group column 295C expose three consecutive exposure regions ER in the main scanning direction MD. In this way, the light emitting element group column 295C is formed by offsetting the light emitting element groups 295, which expose the three consecutive exposure regions ER in the main scanning direction MD, from each other in the width direction LTD. The positions of the spot groups SG formed by the light emitting element groups 295 also differ in the sub scanning direction SD in conformity with the offset arrangement of the light emitting element groups 295 in the width direction LTD.

Figure 12:
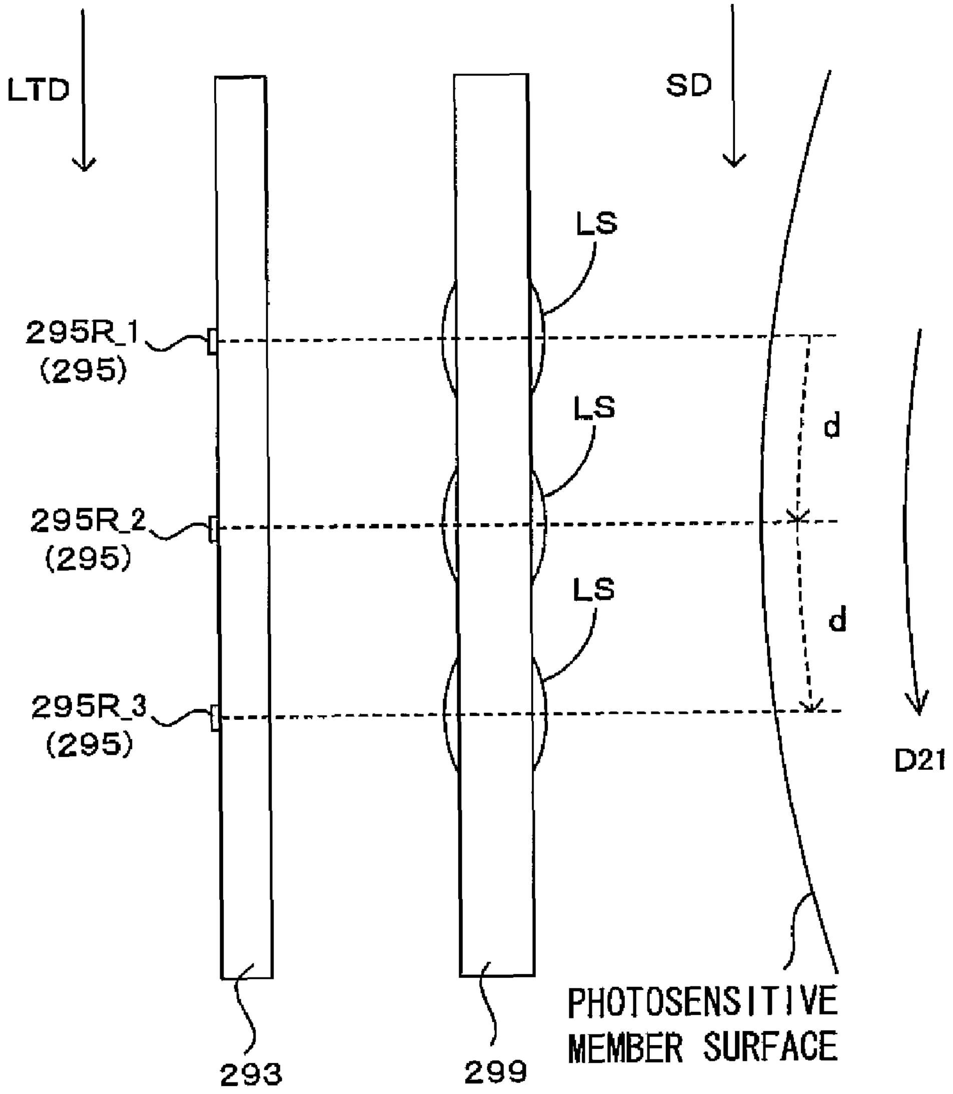
FIG. 12 is a side view showing the exposure operation by the line head.

FIG. 12 is a side view showing the exposure operation by the line head. The exposure operation by the line head will be described with reference to FIGS. 11 and 12. As shown in FIGS. 11 and 12, the light emitting element groups 295 belonging to the same light emitting element group row 295R form the spot groups SG substantially at the same positions in the sub scanning direction SD (first direction D21). On the other hand, the light emitting element groups belonging to the mutually different light emitting element group rows 295R form the spot groups SG at mutually different positions in the sub scanning direction SD (first direction D21). In other words, the first light emitting element group row 295R_1 in the width direction LTD forms the spot groups SG_1, SG_4 at most upstream positions in the sub scanning direction SD. The second light emitting element group row 295R_2 forms the spot groups SG_2, SG_5 at positions downstream of these spot groups SG_1, SG_4 by a distance d. Further, the third light emitting element group row 295R_3 forms the spot groups SG_3, SG_6 at positions downstream of these spot groups SG_2, SG_5 by the distance d.

The formation positions of the spot groups SG in the sub scanning direction SD differ depending on the light emitting element groups 295. Accordingly, the respective light emitting element group rows 295R emit lights at mutually different timings to form the spot groups SG, for example, in the case of forming a latent image extending in the main scanning direction MD.

Figure 13:
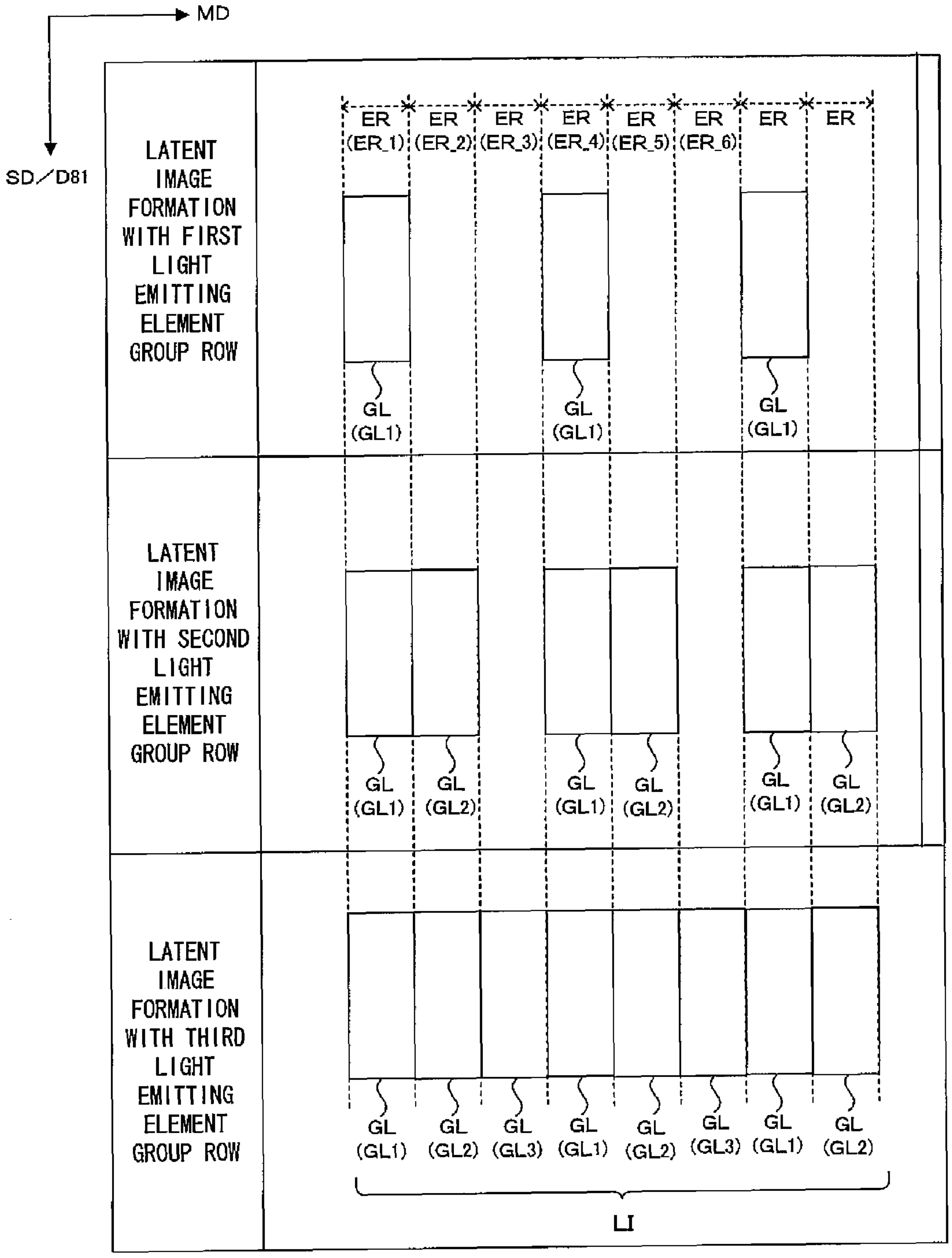
FIG. 13 is a diagram schematically showing an example of a latent image forming operation by the line head.

FIG. 13 is a diagram schematically showing an example of a latent image forming operation by the line head. The example of the latent image forming operation by the line head will be described below with reference to FIGS. 11 to 13. First of all, the first light emitting element group row 295R_1 forms the spot groups SG for a specified period. Thus, group latent images GL1 of a specified width are formed in the regions ER_1, ER_4, . . . in the sub scanning direction SD. Here, the group latent image GL is a latent image formed by one light emitting element group 295. Subsequently, the second light emitting element group row 295R_2 forms the spot groups SG for the specified period at a timing at which the group latent images GL1 formed by the light emitting element group row 295R_1 are conveyed in the sub scanning direction SD by the distance d. Thus, group latent images GL2 of the specified width are formed in the regions ER_2, ER_5, . . . in the sub scanning direction SD. Further, the third light emitting element group row 295R_3 forms the spot groups SG for the specified period at a timing at which the latent images formed by the light emitting element group rows 295R_1, 295R_2 are conveyed in the sub scanning direction SD by the distance d. Thus, group latent images GL3 of the specified width are formed in the regions ER_3, ER_6, . . . in the sub scanning direction SD.

In this specification, group latent images formed by the light emitting element group row 295R_1 (in other words, light emitting element groups 295(1) or a lens row LSR1) are called group latent images GL1 and group toner images obtained by developing the group latent images GL1 are called group toner images GM1. Furthers group latent images formed by the light emitting element group row 295R_2 (in other words, light emitting element groups 295(2) or a lens row LSR2) are called group latent images GL2 and group toner images obtained by developing the group latent images GL2 are called group toner images GM2. Furthermore, group latent images formed by the light emitting element group row 295R_3 (in other words, light emitting element groups 295(3) or a lens row LSR3) are called group latent images GL3 and group toner images obtained by developing the group latent images GL3 are called group toner images GM3.

Figure 14:
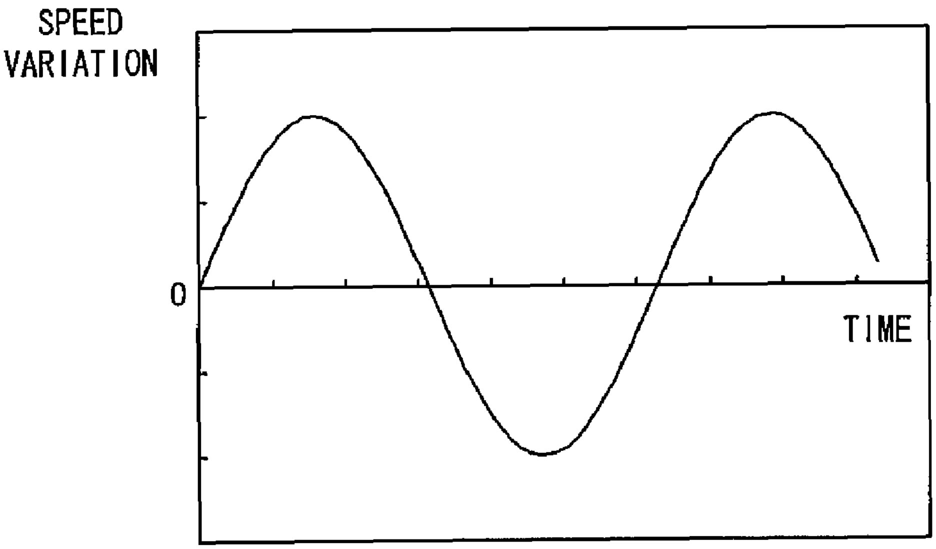
FIG. 14 is a graph showing a relationship between a speed variation of the moving speed of the photosensitive member surface and time.

The respective light emitting element group rows 295R emit lights at different timings in this way, whereby a plurality of group latent images GL1 to GL3 are consecutively formed in the main scanning direction MD to form a latent image LI extending in the main scanning direction MD. However, a moving speed of the photosensitive member surface may vary, for example, as shown in FIG. 14 in some cases due to the eccentricity of the photosensitive drum or the like. FIG. 14 is a graph showing a relationship between a speed variation of the moving speed of the photosensitive member surface and time. As a result, the positions of the group latent images GL1 to GL3 formed by the respective light emitting element groups 295 may vary in the sub scanning direction SD in some cases.

Figure 15:
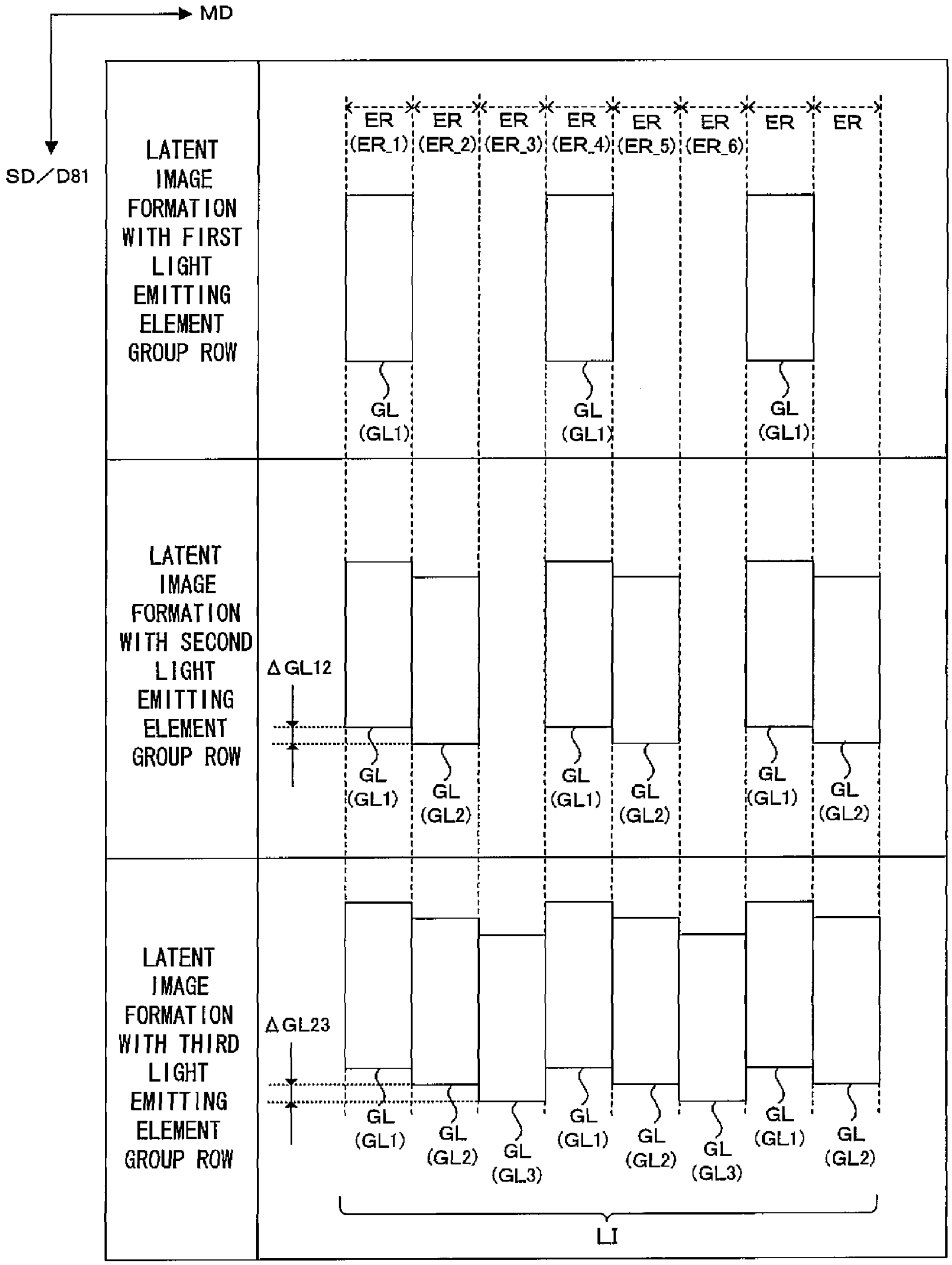
FIG. 15 is a group of diagrams showing positional variations, which can occur in a latent image.

FIG. 15 is a group of diagrams showing positional variations which can occur in a latent image. As in the case shown in FIG. 13, the first light emitting element group row 295R_1 first forms the spot groups SG for the specified period to form the group latent images GL1. Subsequently, the second light emitting element group row 295R_2 forms the spot groups SG for the specified period to form the group latent images GL2. At this time, the group latent images GL2 are formed while being displaced from the group latent images GL1 by a distance ΔGL12 in the sub scanning direction SD due to the variation of the moving speed of the photosensitive member surface. Further, the third light emitting element group row 295R_3 forms the spot groups SG for the specified period to form the group latent images GL3. In this case as well, the group latent images GL3 are formed while being displaced from the group latent images GL2 by a distance ΔGL23 in the sub scanning direction SD due to the variation of the moving speed of the photosensitive member surface. In this way, the formation positions of the group latent images GL1 to GL3 may vary for the respective light emitting element groups in some cases due to the moving speed variation of the photosensitive member surface.

Upon the occurrence of such a positional variation of the latent images for the respective light emitting element groups, there have been cases where a color misregistration correction operation to be described next cannot be properly performed.

V. Color Misregistration Correction Operation

A color misregistration correction operation performed by the image forming apparatus 1 will be described. Specifically, as described above, the image forming apparatus 1 forms a color image by transferring toner images of four colors in such a manner as to superimpose them on the surface of the transfer belt 81. However, in such an image forming apparatus, transfer positions on the transfer belt 81 may be displaced for the respective colors in some cases. Such a displacement appears as a color variation (color misregistration). Accordingly, the image forming apparatus 1 performs a color misregistration correction operation to satisfactorily form a color image.

A cause for displacing the transfer positions for the respective colors is, for example, that the transfer timings mutually differ for the respective colors or the skew of the line head 29 relative to the photosensitive drum 21 differs depending on the color, or the like.

Figure 16:
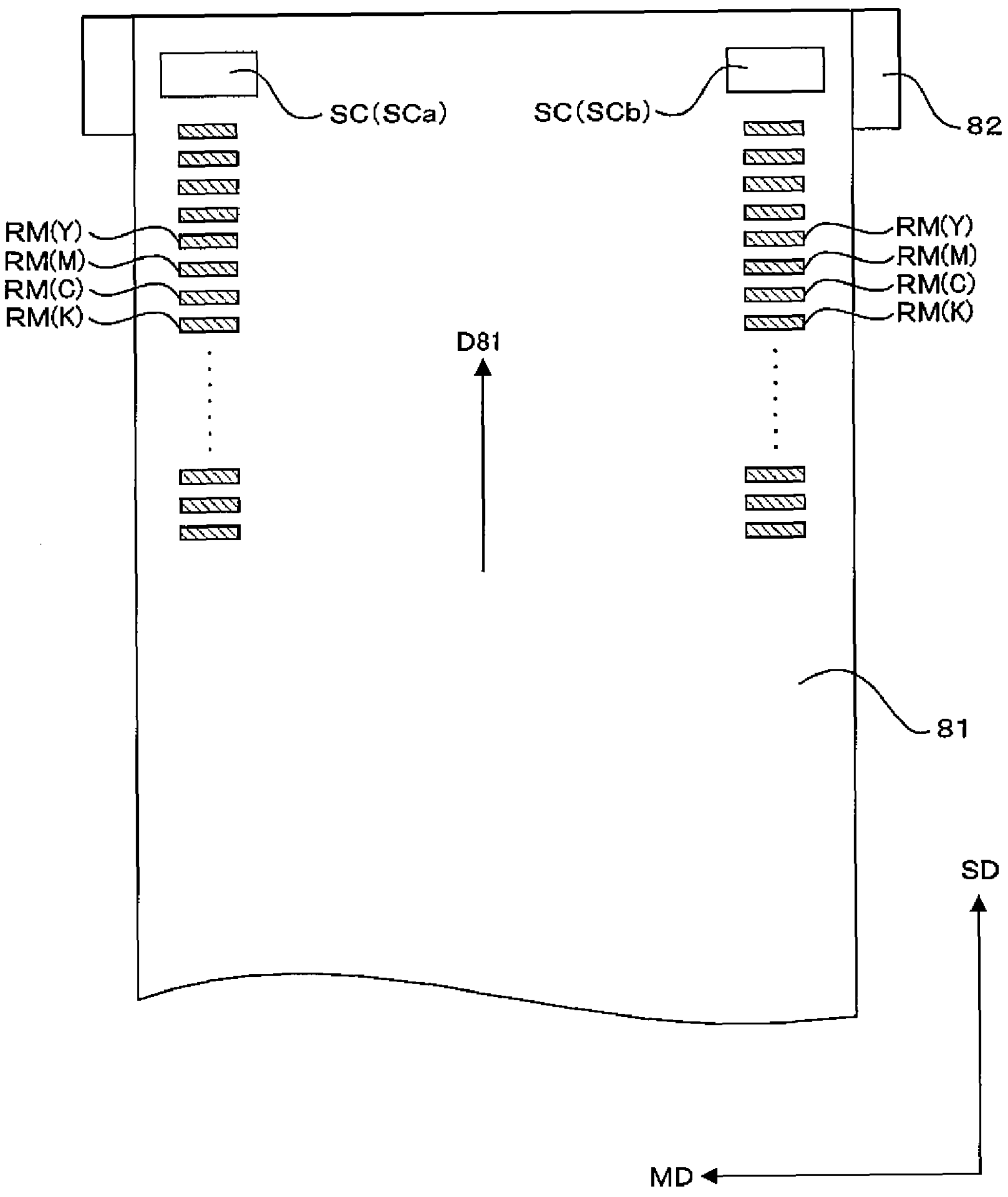
FIG. 16 is a diagram showing a construction for performing the color misregistration correction operation.

FIG. 16 is a diagram showing a construction for performing the color misregistration correction operation and this diagram corresponds to a case when viewed vertically from below (from the lower side in FIG. 1). This color misregistration correction operation is performed using optical sensors SC. Particularly, this color misregistration correction operation is performed using two optical sensors SCa, SCb to effectively suppress the color misregistration resulting from the above skew. These two optical sensors SCa, SCb are so arranged at mutually different positions in the main scanning direction MD (at the opposite ends in the main scanning direction MD in FIG. 16) as to face a part of the transfer belt 81 mounted on the drive roller 82.

Figure 17:
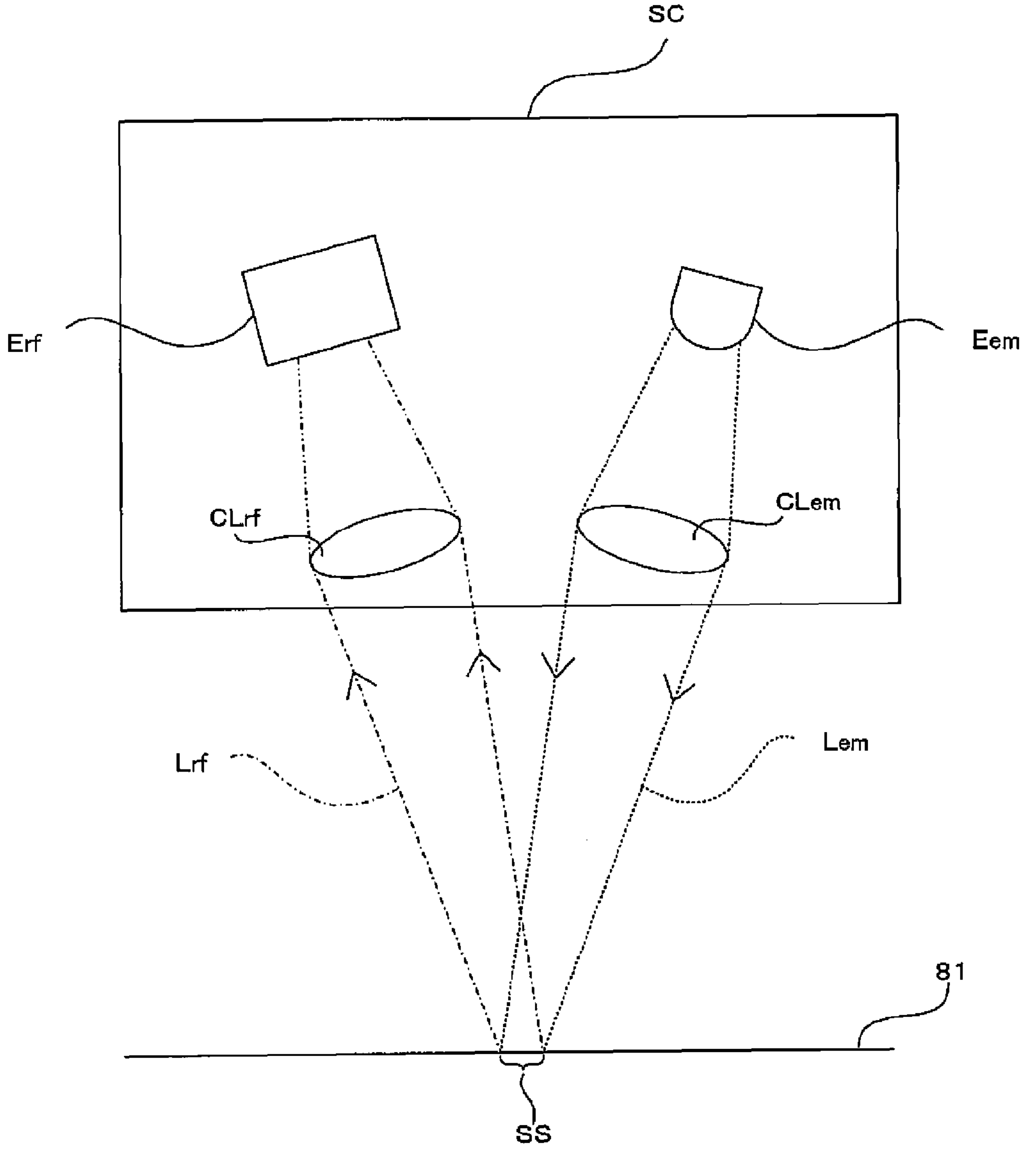
FIG. 17 is a diagram showing an example of the optical sensor.

FIG. 17 is a diagram showing an example of the optical sensor. The optical sensor SC includes a light emitter Eem for emitting an irradiated light Lem toward the surface of the transfer belt 81 and a light receiver Erf for receiving a reflected light Lrf reflected by the transfer belt 81. The optical sensor SC further includes a condenser lens CLem for condensing the irradiated light Lem emitted from the light emitter Eem and a condenser lens CLrf for condensing the reflected light Lrf reflected by the surface of the transfer belt 81. Accordingly, the irradiated light Lem emitted from the light emitter Eem is condensed on the surface of the transfer belt 81 by the condenser lens CLem. Thus, a sensor spot SS is formed on the surface of the transfer belt 81. The reflected light Lrf reflected in an area of the sensor spot SS is condensed by the condenser lens CLrf to be detected by the light receiver Erf. In this way, the optical sensor SC detects an object on the sensor spot SS. Various optical sensors conventionally proposed can be used as the optical sensor SC. So-called distance limited reflective photoelectric sensors BGS (back ground suppression) and the like may be used. Such BGSs include, for example, E3Z-LL61-F80 5M manufactured by OMRON Corporation. This BGS detects an object located inside the sensor spot by projecting a light beam as a sensor spot.

Figure 18:
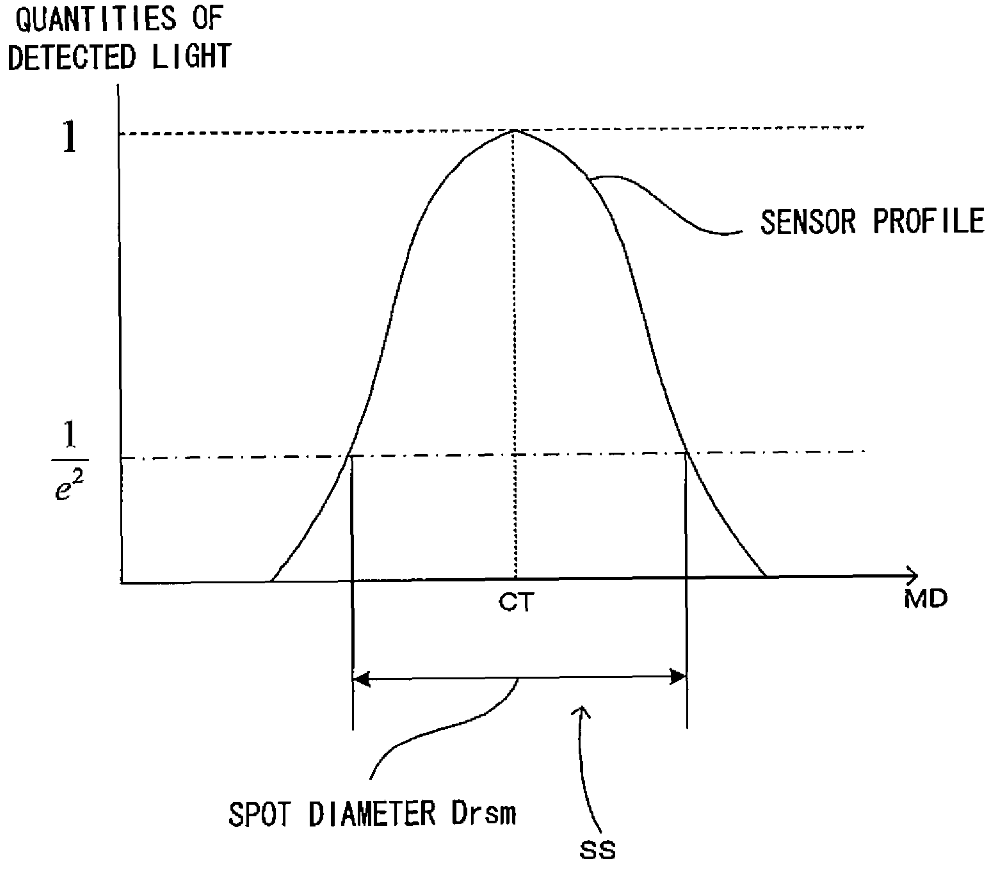
FIG. 18 is a graph of a sensor spot.

FIG. 18 is a graph of a sensor spot. An abscissa of FIG. 18 represents positions in the main scanning direction MD on the surface of the transfer belt 81. An ordinate of FIG. 18 represents the quantities of lights received (detected) by the light receiver Erf out of the reflected lights reflected at the positions represented by the abscissa on the surface of the transfer belt 81. If the quantities detected by the light receiver Erf out of the reflected lights at these positions are plotted with respect to the positions on the surface of the transfer belt 81, a sensor profile shown in FIG. 18 can be obtained. This sensor profile has a substantially bilaterally symmetric distribution peaked at a profile center CT. The sensor spot SS is a range where the detected light quantity is equal to or above $1/e^2$ (e is a base of natural logarithm) in the case of normalizing the sensor profile with a peak value set at 1. Accordingly, a spot diameter Drsm in the main scanning direction of the sensor spot SS corresponds to the length indicated by arrows in FIG. 18. As described above, in this embodiment, the sensor spot SS (detection area) is not determined by the light quantity distribution on the surface of the transfer belt 81, but by a detected light quantity distribution on the light receiver Erf. Although the sensor spot SS is described with respect to the main scanning direction MD here, the content of the sensor spot SS is similar also in the sub scanning direction SD.

In the color misregistration correction operation, registration marks RM of the respective toner colors are formed (FIG. 16). Specifically, the image forming stations Y, M, C and K form test latent images on the surfaces of the corresponding photosensitive drums 21 and develop these test latent images in the respective toner colors to form the registration marks RM(Y), RM(M), RM(C) and RM(K) as the detection images. These registration marks RM are transferred to be arranged side by side in a conveying direction D81 on the surface of the transfer belt 81. Further, as shown in FIG. 16, these registration marks RM are formed for the respective optical sensors SCa, SCb (detection image forming step). The registration marks RM thus formed on the transfer belt 81 are conveyed in the conveying direction D81 and detected by the optical sensors SCa, SCb (image detecting step).

Figure 19:
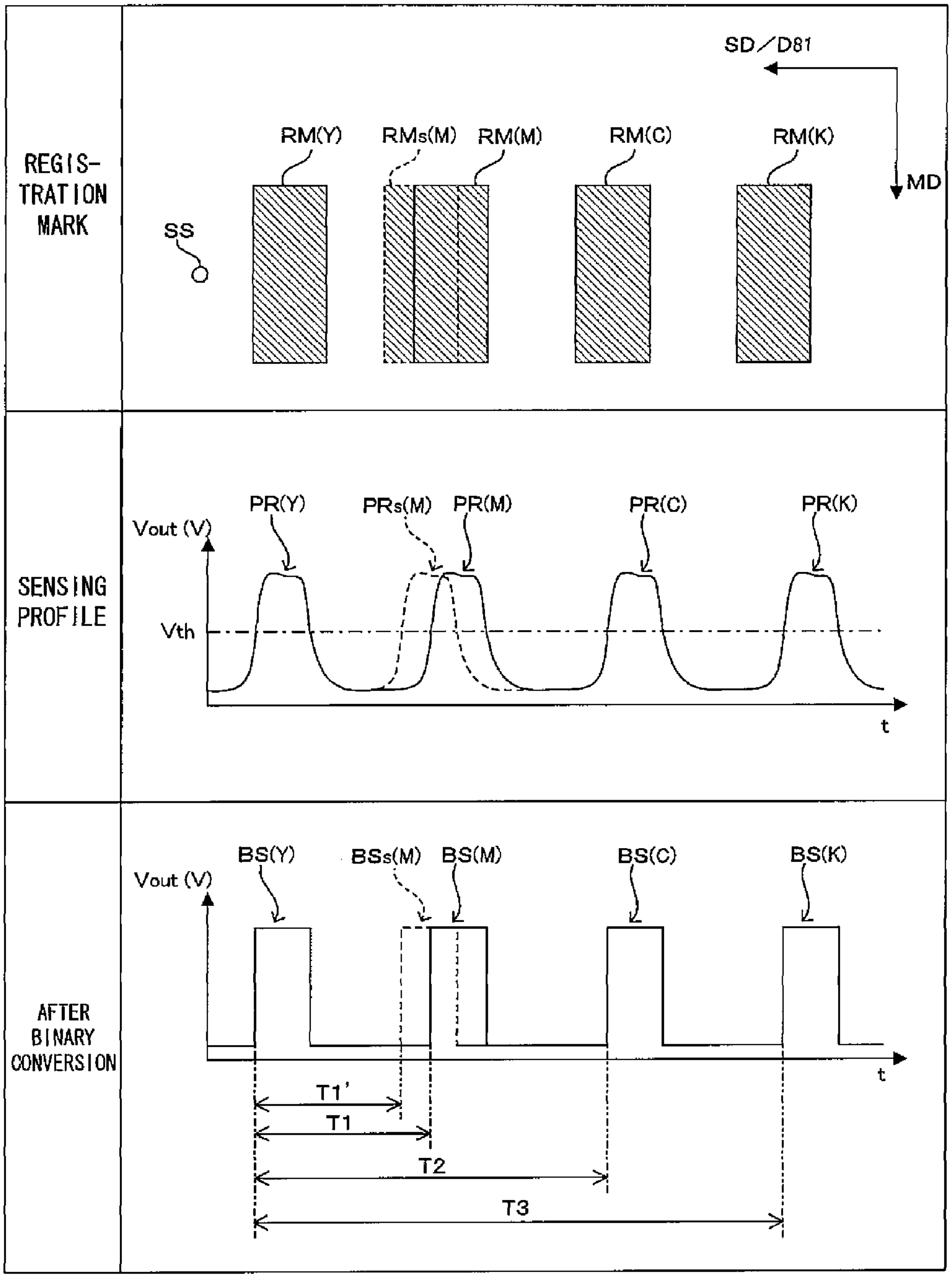
FIG. 19 is a group of diagrams showing a process performed based on the detection result of the optical sensor.
Figure 20:
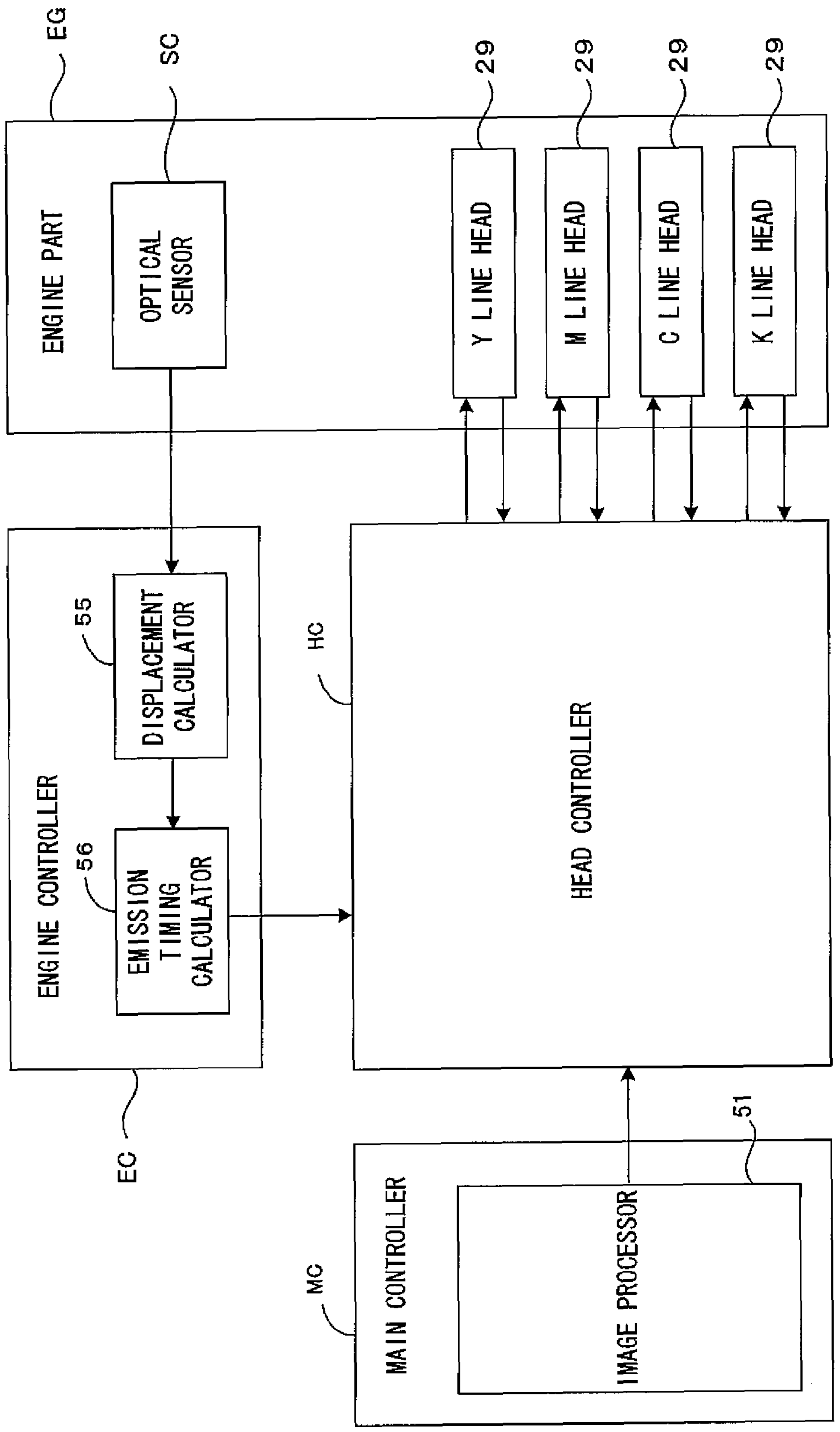
FIG. 20 is a block diagram showing an electrical construction for performing the process based on the detection result of the optical sensor.

FIG. 19 is a group of diagrams showing a process performed based on the detection result of the optical sensor, and FIG. 20 is a block diagram showing an electrical construction for performing the process based on the detection result of the optical sensor. In order to facilitate the understanding of the process in the color misregistration correction operation, it is assumed here that the formation positions of only the registration marks RM of magenta (M) are displaced and the registration marks RM of the other colors are formed at ideal positions. In the row "REGISTRATION MARK" of FIG. 19, the registration marks RM(Y), RM(M), RM(C) and RM(K) shown by solid line are the registration marks of the respective colors in an ideal case free from color misregistration, and registration marks RMs(M) shown by broken line is the registration mark of magenta (M) actually displaced. As described above, the registration marks RM of the respective colors are formed side by side in the conveying direction D81 and pass the sensor spot SS by being conveyed in the conveying direction D81. In this way, the registration marks RM of the respective colors are detected by the optical sensor.

In the row "SENSING PROFILE" of FIG. 19 is shown a detection result of the optical sensor SC. When the registration marks RM(Y), RM(M), RM(C) and RM(K) pass the sensor spot SS, the optical sensor SC outputs detected waveforms PR(Y), PR(M), PR(C) and PR(K) corresponding to the respective registration marks to a displacement calculator 55. These detected waveforms are outputted as voltage signals. In an example shown in FIG. 19, the registration mark of magenta (M) is displaced. Accordingly, the optical sensor SC actually detects the registration mark RMs(M) shown by broken line and outputs a detected waveform PRs(M). This displacement calculator 55 and an emission timing calculator 56 to be described later are both provided in the engine controller EC.

In the displacement calculator 55, the detected waveforms PR(Y), PR(M), PR(C) and PR(K) outputted from the optical sensor SC are converted into binary values using a threshold voltage Vth to obtain binary signals BS(Y), BS(M), BS(C) and BS(K) as shown in the row "AFTER BINARY CONVERSION" of FIG. 19. In the example shown in FIG. 19, the registration mark of magenta (M) is displaced. Accordingly, the displacement calculator 55 generates a binary signal BSs (M) shown by broken line by converting the detected waveform PRs(M) into a binary value. The displacement of the formation position of the registration mark RMs(M) of magenta (M) is calculated from a time interval (time interval Tym) between a rising edge of the binary signal BS(Y) of yellow (Y) as a reference and a rising edge of the binary signal BS of magenta (M). In other words, when Dm: displacement of the registration mark RMs(M) relative to the registration mark RM(Y), S81: conveying velocity of the surface of the transfer belt, T1: time interval Tym in the absence of displacement, T1': time interval Tym in the presence of displacement, the displacement Dm of magenta (M) is calculated by the following equation.

$$Dm=S81\times(T1-T1')$$

The displacement Dm thus calculated is outputted to the emission timing calculator 56, which then calculates an optimal emission timing based on the displacement Dm. The light emission of the line head 29 is controlled based on the thus calculated emission timing to correct the color misregistration.

As described above, in the color misregistration correction operation, the test latent images are formed on the photosensitive member surfaces and are developed to form the registration marks RM as detection images on the surface of the transfer belt. Then, the registration marks RM are detected by the optical sensors SC and the color misregistration is corrected based on the detection values. As described above with reference to FIG. 15, etc., there are cases where the positions of the latent images vary for the respective light emitting element groups due to a variation of the moving speed of the photosensitive member surface. Accordingly, such a positional variation may occur also in the test latent images formed in the color misregistration correction. A similar variation occurs also in the registration marks RM (detection images) obtained by developing the test latent images with such a positional variation. As a result, there have been cases where detection characteristics for the registration marks RM differ between the optical sensors SCa, SCb and the color misregistration cannot be properly corrected.

Figure 21:
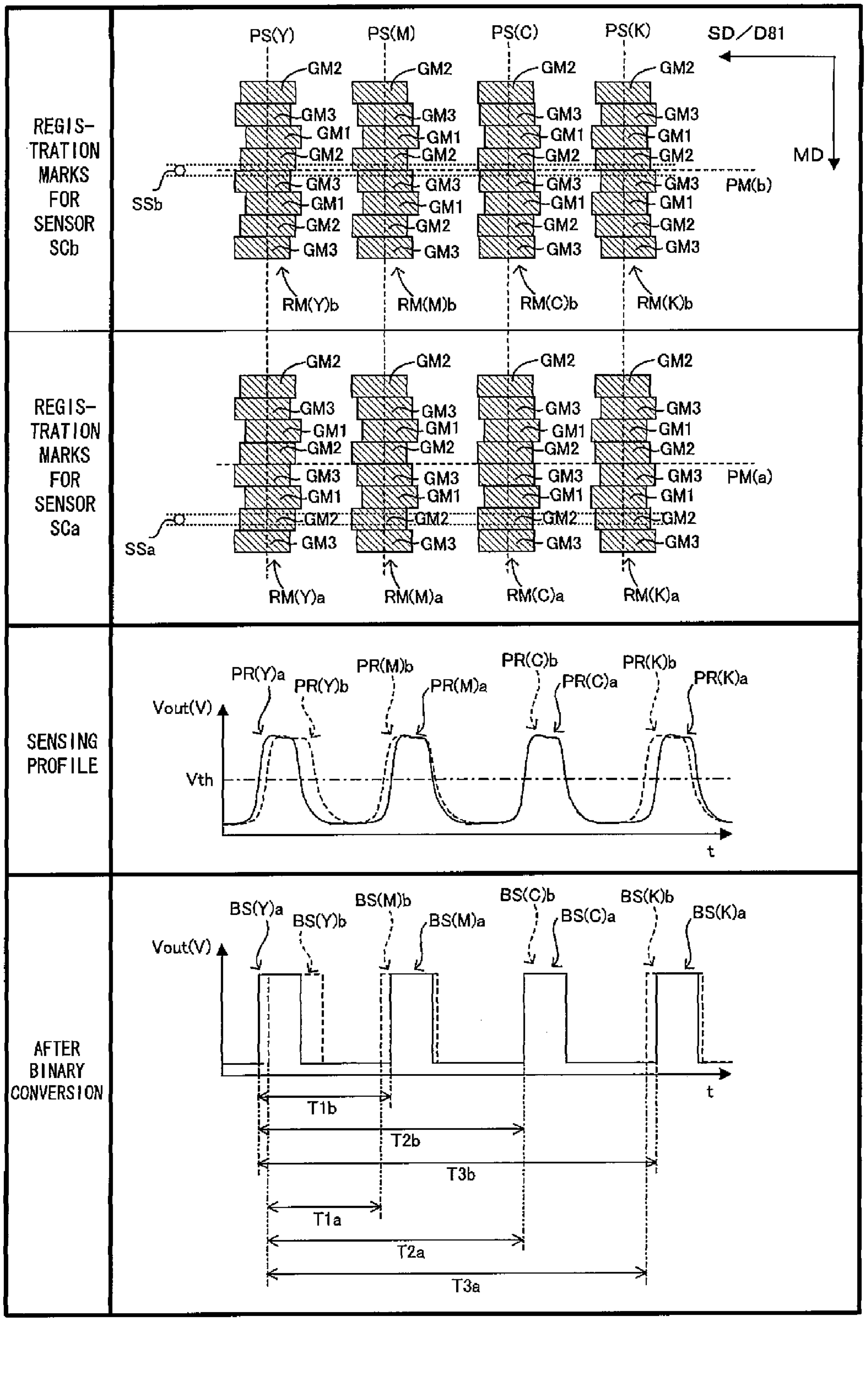
FIG. 21 is a diagram showing an example of the detection results on the registration marks with a positional variation by the optical sensors.
Figure 22:
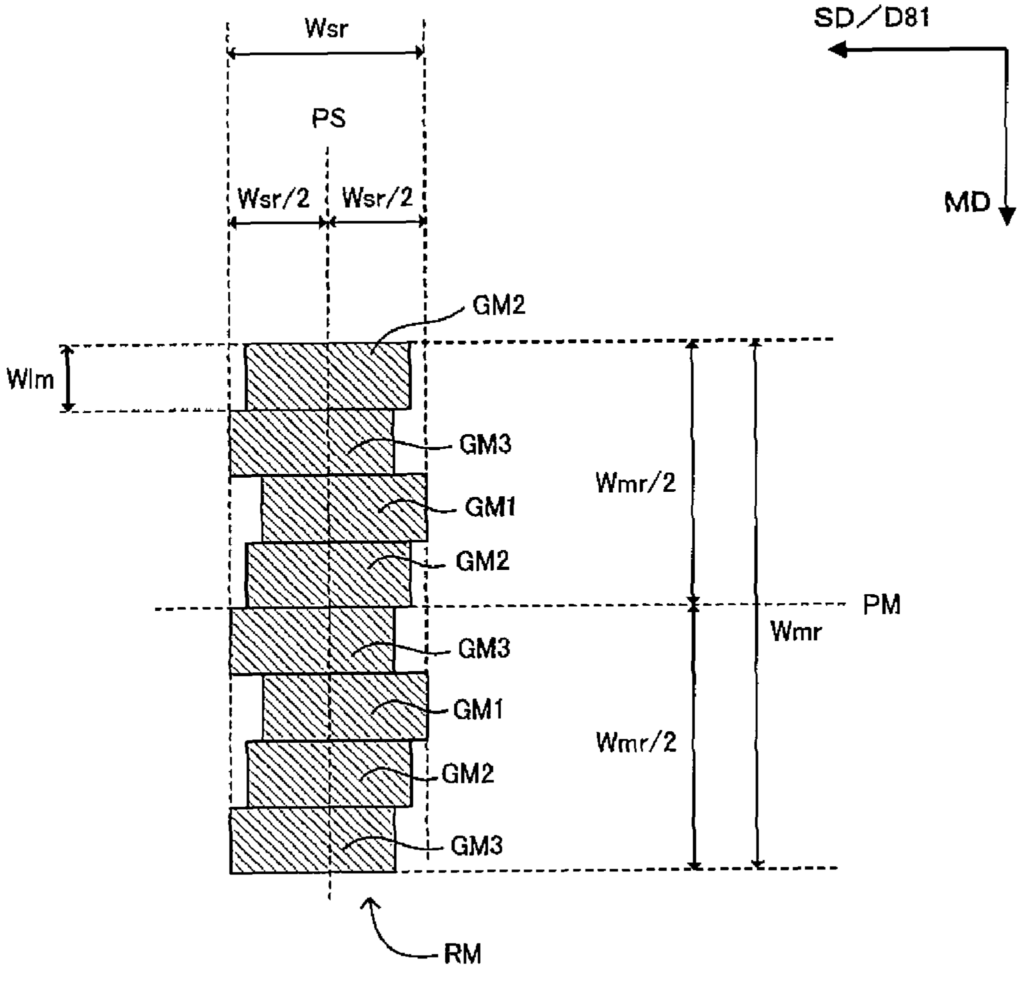
FIG. 22 is a diagram showing an example of a formed registration mark.

FIG. 21 is a diagram showing an example of the detection results on the registration marks with a positional variation by the optical sensors SCa, SCb, and FIG. 22 is a diagram showing an example of a formed registration mark. As shown in the rows "REGISTRATION MARKS FOR SENSOR SCa" and "REGISTRATION MARKS FOR SENSOR SCb" of FIG. 21, registration marks RM are formed for each of the optical sensors SCa, SCb. Each registration mark RM is made up of a plurality of (eight) group toner images GM (GM1 to GM3) consecutive and adjacent in the main scanning direction MD. Here, the group toner images GM1 to GM3 are toner images obtained by developing group latent images GL1 to GL3. In other words, the group toner images GM1 are group toner images formed by the light emitting element group 295(1) having the number 1, the group toner images GM2 are group toner images formed by the light emitting element group 295(2) having the number 2, and the group toner images GM3 are group toner images formed by the light emitting element group 295(3) having the number 3.

Each group toner image GM is formed by all the light emitting elements 2951 belonging to the light emitting element group 295 and has a unit width Wlm in the main scanning direction MD (FIG. 22). Here, the unit width Wlm is the width of the group toner image GM in the main scanning direction MD in the case where the group toner image GM is formed by developing the group latent image GL formed by all the light emitting elements 2951 belonging to one light emitting element group 295. As shown in FIG. 22, the positions of the group toner images GM constituting the registration mark RM vary in the sub scanning direction SD due to a variation in the surface speed of the photosensitive drum 21.

In an example shown in FIG. 21, the positions of the line heads 29 of the respective colors are the same in the main scanning direction MD and positions PM of the registration marks RM(Y), RM(M), RM(C) and RM(K) of the respective colors formed for the same optical sensor SC are the same in the main scanning direction MD. For example, the registration marks RM(Y)a, RM(M)a, RM(C)a and RM(K)a of the respective colors formed for the optical sensor SCa are all at a position PM(a) in the main scanning direction MD. Here, the position PM of the registration mark RM in the main scanning direction MD is the position of a bisector of width Wmr of the registration mark RM in the main scanning direction MD (FIG. 22).

Further, there is no skew and positions PS(Y), PS(M), PS(C) and PS(K) in the sub scanning direction SD of the registration marks RM(Y), RM(M), RM(C) and RM(K) formed for the respective optical sensors SC are the same. For example, the registration mark RM(Y)a of yellow (Y) formed for the optical sensor SCa and the registration mark RM(Y)b of yellow (Y) formed for the optical sensor SCb are both at the same position PS(Y) in the sub scanning direction SD. Here, the position PS of the registration mark RM in the sub scanning direction SD is the position of a bisector of width Wsr of the registration mark RM in the sub scanning direction SD (FIG. 22).

As described above, in the example shown in FIG. 21, there is no skew and the registration marks RM formed for each optical sensor SC are all at the same position in the sub scanning direction SD. However, in FIG. 21, detection characteristics (sensing profiles) of the registration marks RM differ between the optical sensors SCa and SCb, with the result that erroneous detection may be made as if there were a skew although there is actually no skew.

Specifically, the optical sensor SCa detects the registration marks located between broken lines sandwiching the sensor spots SSa, that is, detects the group toner images GM2 constituting the registration marks RM. On the other hand, the optical sensor SCb detects the registration marks RM located between broken lines sandwiching the sensor spots SSb, that is, detects the group toner images GM2, GM3 constituting the registration marks RM. Here, an area detected by each sensor spot SS is shown by two broken lines sandwiching the sensor spot SS. An area detected by each sensor spot SS is similarly shown by two broken lines below.

In this way, the optical sensor SCa detects only the group toner images GM2 formed by the second light emitting element groups 295(2), whereas the optical sensor SCb detects the group toner images GM2 formed by the second light emitting element groups 295(2) and the group toner images GM3 formed by the third light emitting element groups 295 (3). As a result, as shown in the row "SENSING PROFILE" of FIG. 21, the detection results (detection characteristics) of the optical sensors SCa, SCb differ. Here, solid line in this row represents detection waveforms PR(Y)a, PR(M)a, PR(C)a and PR(K)a of the optical sensor SCa and broken line in this row represents detection waveforms PR(Y)b, PR(M)b, PR(C)b and PR(K)b of the optical sensor SCb. As shown in the row "AFTER BINARY CONVERSION" of FIG. 21, binary signals obtained by converting such detection results into binary values also differ between the optical sensors SCa, SCb. Here, solid line in this row represents binary signals BS(Y)a, BS(M)a, BS(C)a and BS(K)a of the optical sensor SCa and broken line in this row represents binary signals BS(Y)b, BS(M)b, BS(C)b and BS(K)b of the optical sensor SCb. As a result, there have been cases where a skew is erroneously detected although there is actually no skew and a color misregistration correction operation cannot be properly performed. Accordingly, embodiments of the present invention have the following constructions.

VI-1. First Embodiment

Figure 23:
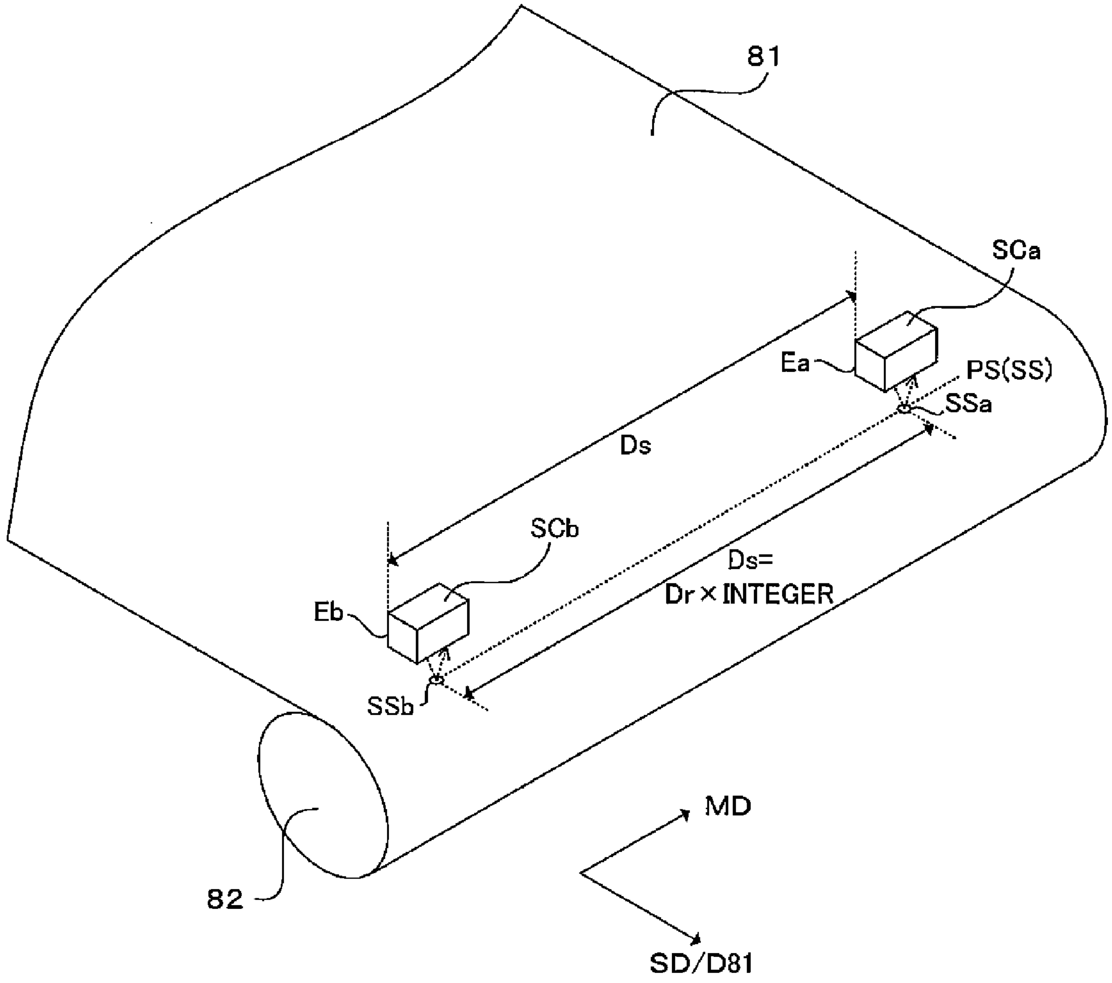
FIG. 23 is a diagram showing the arrangement of the optical sensors according to a first embodiment.

FIG. 23 is a diagram showing the arrangement of the optical sensors according to a first embodiment. In the first embodiment, the optical sensors SCa, SCb are arranged such that an inter-spot distance Ds between the sensor spots SSa, SSb in the main scanning direction MD is the integral multiple of the group column pitch Dr as shown in FIG. 23. Further, since the optical sensors SCa, SCb are identically constructed in the first embodiment, a distance between a downstream end Ea of the optical sensor SCa in the main scanning direction MD and a downstream end Eb of the optical sensor SCb in the main scanning direction MD is equal to the inter-spot distance Ds. The sensor spots SSa, SSb have the same shape and size, and the positions (PS(SS)) thereof in the sub scanning direction SD are the same.

Figure 24:
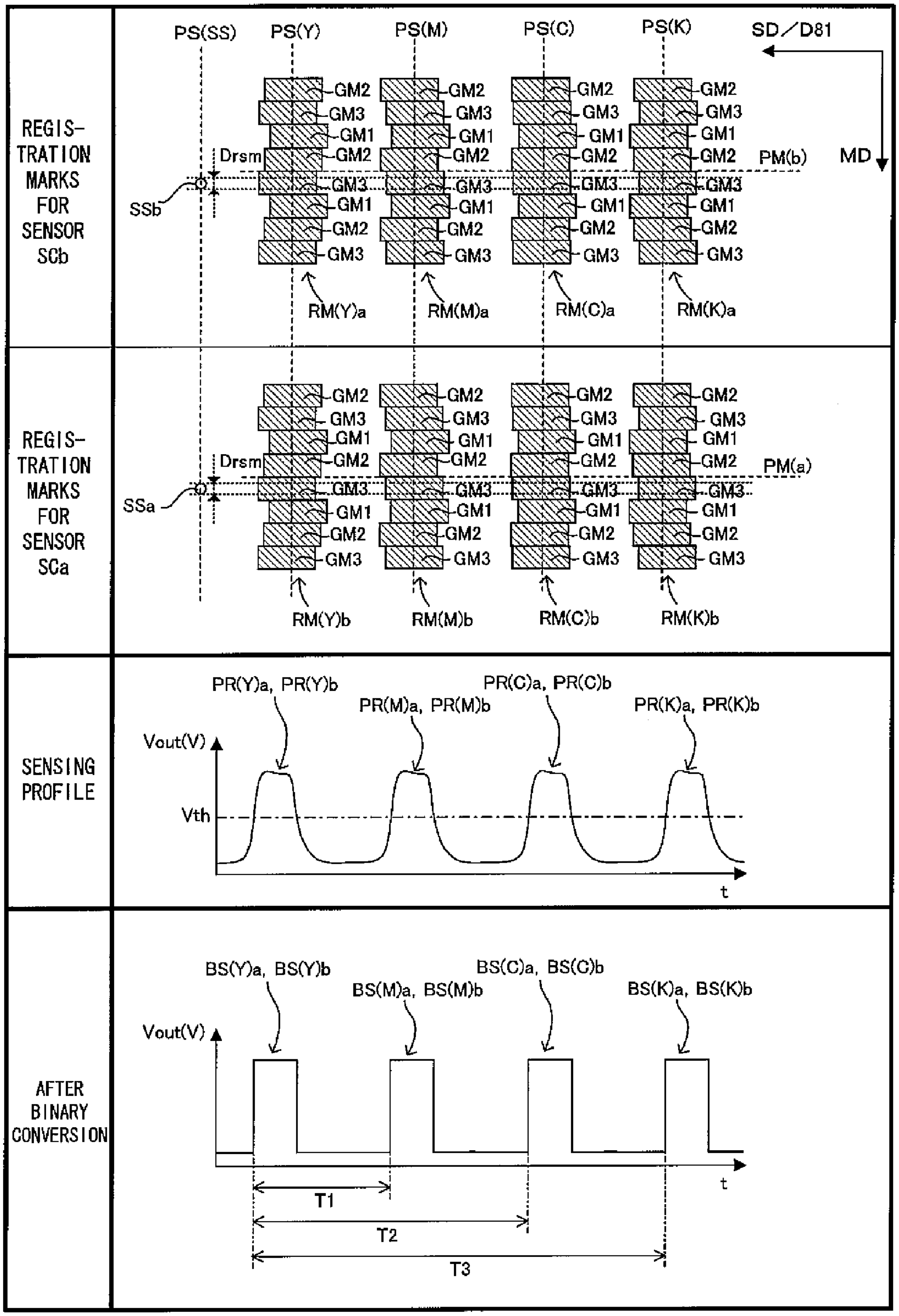
FIG. 24 is a diagram showing a registration mark detection operation in the first embodiment.

FIG. 24 is a diagram showing a registration mark detection operation in the first embodiment. In the registration mark detection operation of the first embodiment, registration marks RM are configured similar to the registration marks RM shown in FIG. 21. Specifically, each registration mark RM is made up of a plurality of (eight) group toner images GM (GM1 to GM3) consecutive and adjacent in the main scanning direction MD. Further, a main-scanning width Drsm of the sensor spots SSa, SSb in the main scanning direction MD is shorter than the unit width Wlm. What should be noted in the first embodiment is that the group toner images passing the sensor spots SSa, SSb are one group toner images GM (GM3) formed by the light emitting element groups 295 (295(3)) of the same number (3). In other words, the respective optical sensors SCa, SCb detect the registration marks RM by detecting one group toner images formed by the light emitting element groups 295 of the same number. Accordingly, as shown in the row "SENSING PROFILE" of FIG. 24, detection waveforms PR(Y)a, PR(M)a, PR(C)a and PR(K)a of the optical sensor SCa and detection waveforms PR(Y)b, PR(K)b, PR(C)b and PR(K)b of the optical sensor SCb are equal. Further, as shown in the row "AFTER BINARY CONVERSION", binary signals obtained by converting such detection waveforms into binary values are equal between the optical sensors SCa and SCb.

As described above, in the first embodiment, the distance Ds between the optical sensors SCa, SCb adjacent in the longitudinal direction LGD is the integral multiple of the group column pitch Dr and the main-scanning width Drsm of the sensor spots SSa, SSb of these optical sensors SC is shorter than the unit width Wlm. Accordingly, the respective optical sensors SCa, SCb detect the registration marks RM by detecting one group toner images GM formed by the light emitting element groups 295 of the same number, with the result that a difference in detection characteristic between the optical sensors SCa, SCb is suppressed. By detecting the registration marks RM with the optical sensors SCa, SCb having substantially equal detection characteristics, skew error detection can be suppressed and a satisfactory color misregistration correction operation can be performed.

Specifically, as shown in FIG. 24, the respective optical sensors SC can detect one group toner image GM since the main-scanning width Drsm of the sensor spots SSa, SSb of the optical sensors SC is shorter than the unit width Wlm. The group toner images GM formed by the same lens row LSR can be cyclically formed (cycle Dr) in the main scanning direction MD and the distance Ds between the sensor spots SSa, SSb of the optical sensors SCa, SCb is the integral multiple of the group column pitch Dr, wherefore the respective optical sensors SCa, SCb detect the group toner images GM3 formed by the lenses LS of the common lens row LSR3. In other words, the optical sensor SCb also detects the group toner images GM3 formed by the third light emitting element groups 295(3) if the optical sensor SCa detects the group toner images GM3 formed by the third light emitting element groups 295(3).

As can be understood from FIG. 15 and other figures, the group latent images GL formed by the same lens row LSR (that is, the respective group latent images GL formed by the light emitting element groups 295 of the same number) are formed substantially at the same timing. Accordingly, independently of a speed variation of the photosensitive member, the positions of the group latent images GL formed by the same lens row LSR are substantially the same in the sub scanning direction SD (that is, do not vary). Thus, the positions of the group latent images GL3 formed by the lens row LSR3 are the same in the sub scanning direction SD and the positions of the respective group toner images GM3 obtained by developing these group latent images GL3 are also the same in the sub scanning direction SD. Hence, as shown in the row "SENSING PROFILE" of FIG. 24, the sensing profile (detection characteristics) of the optical sensor SCa and the sensing profile (detection characteristics) of the optical sensor SCb are substantially equal by having a difference therebetween suppressed. In other words, since the respective optical sensors SCa, SCb detect the group toner images GM formed by one common (that is, the same) lens row LSR in the first embodiment, the sensing profiles (detection characteristics) of the optical sensors SCa, SCb are substantially equal by having the difference therebetween suppressed and the skew error detection is suppressed.

Since the sensor spots SSa, SSb of the respective optical sensors SCa, SCb have the same shape and size in the first embodiment, the difference in detection characteristic between the optical sensors SCa, SCb can be easily suppressed.

Specifically, if the sensor spots SSa, SSb differ from each other in shape or size, there is a possibility that the sensing profiles of the optical sensors SCa, SCb differ although the respective optical sensors SCa, SCb detect the group toner images GM formed by the lenses LS of the common lens row LSR (that is, the respective optical sensors SCa, SCb detect the group toner images GM formed by the light emitting element groups 295 of the same number). However, since the sensor spots SSa, SSb of the respective optical sensors SCa, SCb have the same shape and size in the first embodiment, the difference in detection characteristic between the optical sensors SCa, SCb can be easily suppressed without considering the problem resulting from the shape and the size of the sensor spots SS.

Further, in the first embodiment, the positions PS(SS) of the sensor spots SSa, SSb of the respective optical sensors SCa, SCb in the sub scanning direction SD (conveying direction D81) are the same. Accordingly, the color misregistration can be corrected without considering the positions of the detection areas SSa, SSb of the respective optical sensors SCa, SCb in the sub scanning direction SD. Thus, the color misregistration can be corrected without separately providing a function of adjusting a positional difference between the sensor spots SSa, SSb in the sub scanning direction SD (conveying direction D81), and the apparatus construction can be simplified.

Specifically, if the positions of the sensor spots SSa, SSb differ in the sub scanning direction SD (conveying direction D81), there is a possibility that the rise timings of the detection signals PR differ to erroneously detect a skew although the respective optical sensors SCa, SCb detect the group toner images GM formed by the light emitting element groups 295 of the same number (that is, detect the group toner images GM formed by the lenses LS of the same lens row LSR). However, in the first embodiment, the positions of the sensor spots SSa, SSb of the respective optical sensors SCa, SCb in the sub scanning direction SD are the same. Thus, the difference in detection characteristic between the optical sensors SCa, SCb can be easily suppressed without considering the problem resulting from the positions of the sensor spots SS in the sub scanning direction SD.

Further, since the optical sensors SCa, SCb are identically constructed in the first embodiment, the difference in detection characteristic between the optical sensors SCa, SCb can be easily suppressed. Specifically, in the first embodiment, the optical sensors SCa, SCb are arranged such that the inter-spot distance Ds is the integral multiple of the group column pitch Dr to suppress the difference in detection characteristic between the optical sensors SCa, SCb. However, it is not always easy to adjust the positions of the optical sensors SCa, SCb while directly measuring the distance Ds between the sensor spots. In contrast, in the first embodiment, the optical sensors SCa, SCb are identically constructed. Thus, the inter-spot distance Ds can be easily set to the integral multiple of the group column pitch Dr only by arranging the optical sensors SCa, SCb, for example, such that the distance between the end Ea of the optical sensor SCa and the end Eb of the optical sensor SCb is the integral multiple of the group column pitch Dr.

In the first embodiment, organic EL devices are suitably used as the light emitting elements 2951. This is because the organic EL devices have high positional accuracy since being manufactured in a semiconductor process and advantageously operate to suppress the difference in detection characteristic between the optical sensors SCa, SCb.

In the first embodiment, the sensor spots SSa, SSb of the optical sensors SCa, SCb are located at the part of the transfer belt 81 mounted on the roller. Thus, it is possible to stably obtain the detection results of the optical sensors SCa, SCb without being influenced by the flapping of the transfer belt 81.

VI-2. Second Embodiment

Figure 25:
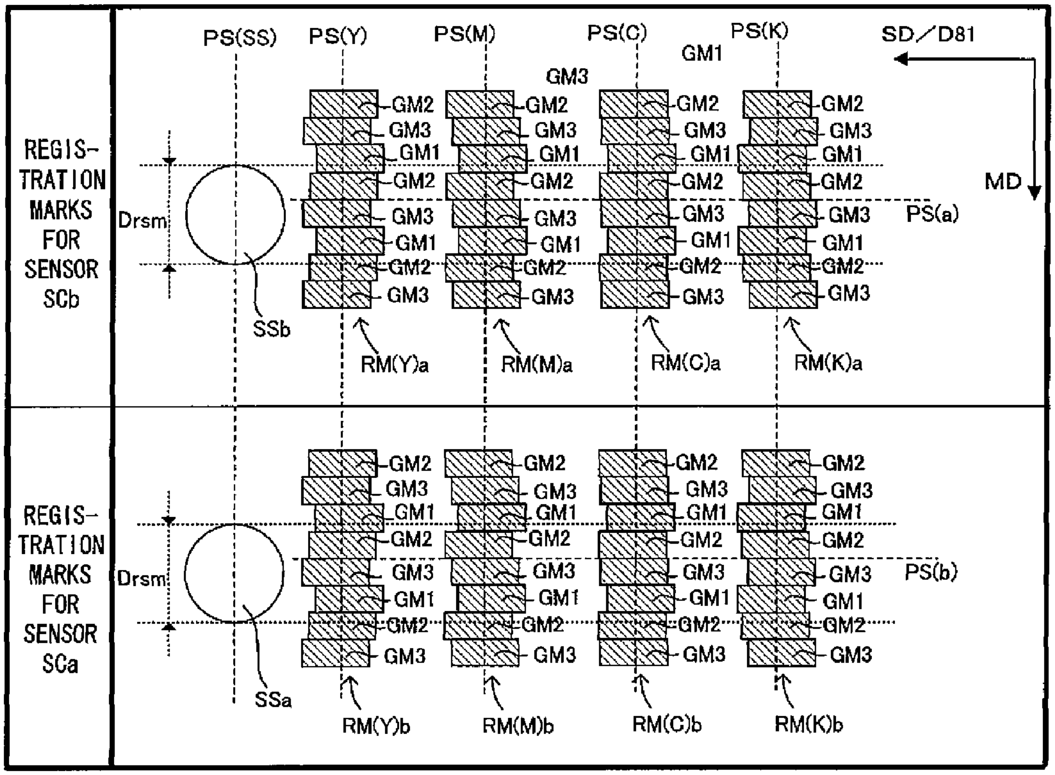
FIG. 25 is a diagram showing a registration mark detection operation in a second embodiment.

FIG. 25 is a diagram showing a registration mark detection operation in a second embodiment. The second embodiment differs from the first embodiment only in the size of the sensor spots SSa, SSb, but is identical in other constructions. In other words, in the second embodiment, the main-scanning width Drsm of the sensor spots SSa, SSb is larger than the unit width Wlm, with the result that a plurality of group toner images GM pass the respective sensor spots SSa, SSb in the registration mark detection operation.

In the second embodiment as well, the optical sensors SCa, SCb are arranged such that the sensor spots SSa, SSb have the same shape and size and the inter-spot distance Ds between the sensor spots SSa, SSb in the main scanning direction MD is the integral multiple of the group column pitch. Accordingly, the optical sensors SCa, SCb detect the registration marks RM by detecting a plurality of (five) group toner images GM (GM1, GM2, GM3, GM1, GM2 from an upstream side in the main scanning direction MD) formed by the same number of (five) light emitting element groups 295 from the light emitting element group 295 (295(1)) having the same number (1) in the longitudinal direction LGD (that is, 295(1), 295(2), 295(3), 295(1), 295(2) from an upstream side in the longitudinal direction LGD). Thus, the detection waveforms of the optical sensor SCa and those of the optical sensor SCb are equal to each other. As a result, binary signals obtained by converting such detection waveforms into binary values are also equal between the optical sensors SCa, SCb.

As described above, in the second embodiment, the distance Ds between the optical sensors SCa, SCb adjacent in the longitudinal direction LGD is the integral multiple of the group column pitch Dr. Further, the main-scanning width Drsm of the sensor spots SSa, SSb of these optical sensors SC is longer than the unit width Wlm. Accordingly, the respective optical sensors SCa, SCb detect the registration marks RM by detecting a plurality of group toner images GM formed by the same number of light emitting element groups 295 from the light emitting element group 295 of the same number in the longitudinal direction LGD, with the result that the difference in detection characteristic between the respective optical sensors SC is suppressed. By detecting the registration marks RM with the optical sensors SCa, SCb having substantially equal detection characteristics, the above skew error detection can be suppressed and a satisfactory color misregistration correction operation can be performed.

Specifically, as shown in FIG. 25, the group toner images GM formed by the same lens row LSR can be cyclically formed (cycle Dr) in the main scanning direction MD, the distance Ds between the sensor spots SSa, SSb in the main scanning direction MD is set to the integral multiple of the group column pitch Dr and the respective sensor spots SSa, SSb have the equal diameter Drsm in the main scanning direction MD. Thus, the optical sensor SCb also detects five group toner images GM1, GM2, GM3, GM1 and GM2 consecutively arranged in the main scanning direction ND if the optical sensor SCa detects five group toner images GM1, GM2, GM3, GM1 and GM2 consecutively arranged in the main scanning direction MD. In this way, in the second embodiment, the respective optical sensors SCa, SCb detect the toner images formed by the common (that is, the same) plurality of lens rows LSR1, LSR2 and LSR3 and the occurrence of a situation where only the optical sensor SCb detects the toner images (group toner images GM3) formed by the lens row LSR3 as shown in FIG. 21 is suppressed. In this specification, it is described in some cases that "the respective optical sensors SCa, SCb detect the toner images formed by the common plurality of lens rows LSR1, LSR2 and LSR3" and in other cases that "the respective optical sensors SCa, SCb detect the toner images formed by the same plurality of lens rows LSR1, LSR2 and LSR3", but these mean the same.

As can be understood from FIG. 15, the group latent images GL formed by the same lens row LSR (that is, the respective group latent images GL formed by the light emitting element groups 295 of the same number) are formed substantially at the same timing. Accordingly, independently of a speed variation of the photosensitive member, the positions of the group latent images GL formed by the same lens row LSR are substantially the same in the sub scanning direction SD (that is, do not vary). Thus, the positions of the group latent images GL formed by the same lens row LSR are the same in the sub scanning direction SD and the positions of the respective group toner images GM obtained by developing these group latent images GL are also the same in the sub scanning direction SD.

Thus, by the detection of the toner images formed by the common plurality of lens rows LSR1, LSR2 and LSR3 by means of the respective optical sensors SCa, SCb as shown in the second embodiment, the difference between the sensing profile (detection characteristic) of the optical sensor SCa and the sensing profile (detection characteristic) of the optical sensor SCb can be suppressed. As a result, the above skew error detection can be suppressed and a satisfactory color misregistration correction operation can be performed.

In the second embodiment, both of the optical sensors SCa, SCb detect two group toner images GM1 formed by the lens row LSR1, two group toner images GM2 formed by the lens row LSR2 and one group toner image GM3 formed by the lens row LSR3. In other words, the respective optical sensors SCa, SCb detect the same number of group toner images formed by the same lens rows LSR. Therefore, the difference between the sensing profiles (detection characteristics) of the respective optical sensors SCa, SCb can be more effectively suppressed, the above skew error detection can be suppressed and a satisfactory color misregistration correction operation can be performed.

Further, the respective light emitting element groups 295 are arranged such that the positions thereof in the longitudinal direction LGD are in the order of 295(1), 295(2), 295(3), 295(1), 295(2), . . . as shown in FIG. 7. The optical sensors SCa, SCb detect a plurality of (five) group toner images GM consecutive in the main scanning direction MD and formed by the same number of (five) light emitting element groups 295 from the light emitting element group 295 (295(1)) of the same number (1) in the longitudinal direction LGD (the same number of light emitting element groups 295(1), 295(2), 295(3), 295(1), 295(2) in the order of the positions in the longitudinal direction LGD). In other words, the respective optical sensors SCa, SCb both detect the five group toner images GM1, GM2, GM3, GM1 and GM2 consecutively arranged in this order in the main scanning direction MD. Thus, the difference between the sensing profiles (detection characteristics) of the respective optical sensors SCa, SCb can be quite effectively suppressed, the above skew error detection can be suppressed and a satisfactory color misregistration correction operation can be performed. It should be noted that "the same number of light emitting element groups 295 from the light emitting element group 295 of the same number in the longitudinal direction LGD" means "the same number of light emitting element groups 295 inclusively from the light emitting element group 295 of the same number in the order of the positions in the longitudinal direction LGD".

As described above, in the above first and second embodiments, the sub scanning direction SD corresponds to a "first direction" of the invention, the main scanning direction MD corresponds to a "second direction" of the invention, and the second direction is orthogonal to or substantially orthogonal to the first direction. The longitudinal direction LGD and the main scanning direction M correspond to an "arrangement direction" of the invention. In the above embodiments, the image forming stations Y, M, C and K and the transfer belt 81 (transfer medium) correspond to an "image forming section" of the invention; the photosensitive drum 21 to a "latent image carrier" of the invention; the optical sensors SC, SCa and SCb to "detectors" of the invention; and the sensor spots SS, SSa and SSb to "detection areas" of the invention. A "detection unit" of the invention is constructed by two optical sensors SCa, SCb. The group toner images GM, GM1, GM2 and GM3 correspond to "group images" of the invention. The light emitting element group column 295C corresponds to a "group column" of the invention. The distance Ds between the sensor spots SSa, SSb in the main scanning direction MD can be obtained, for example, as a distance between profile centers CT (FIG. 18) of the respective sensor spots SSa, SSb in the main scanning direction MD. The lens LS corresponds to an "imaging optical system" of the invention, and the lens row LSR to an "imaging optical system row" of the invention. The line head 29 corresponds to an "exposure head" of the invention.

VI-3. Miscellaneous

The invention is not limited to the above embodiments and various changes other than the above ones can be made without departing from the gist thereof. For example, in the first and second embodiments, the positions of the line heads 29 of the respective colors are the same in the main scanning direction MD and the positions PM of the registration marks RM(Y), RM(M), RM(C) and RM(K) of the respective colors formed for the same optical sensors SC are the same in the main scanning direction MD. However, the invention is also applicable to such a construction in which the positions of the registration marks RM(Y), RM(M), RM(C) and RM(K) of the respective colors formed for the same optical sensors SC differ in the main scanning direction MD.

Figure 26:
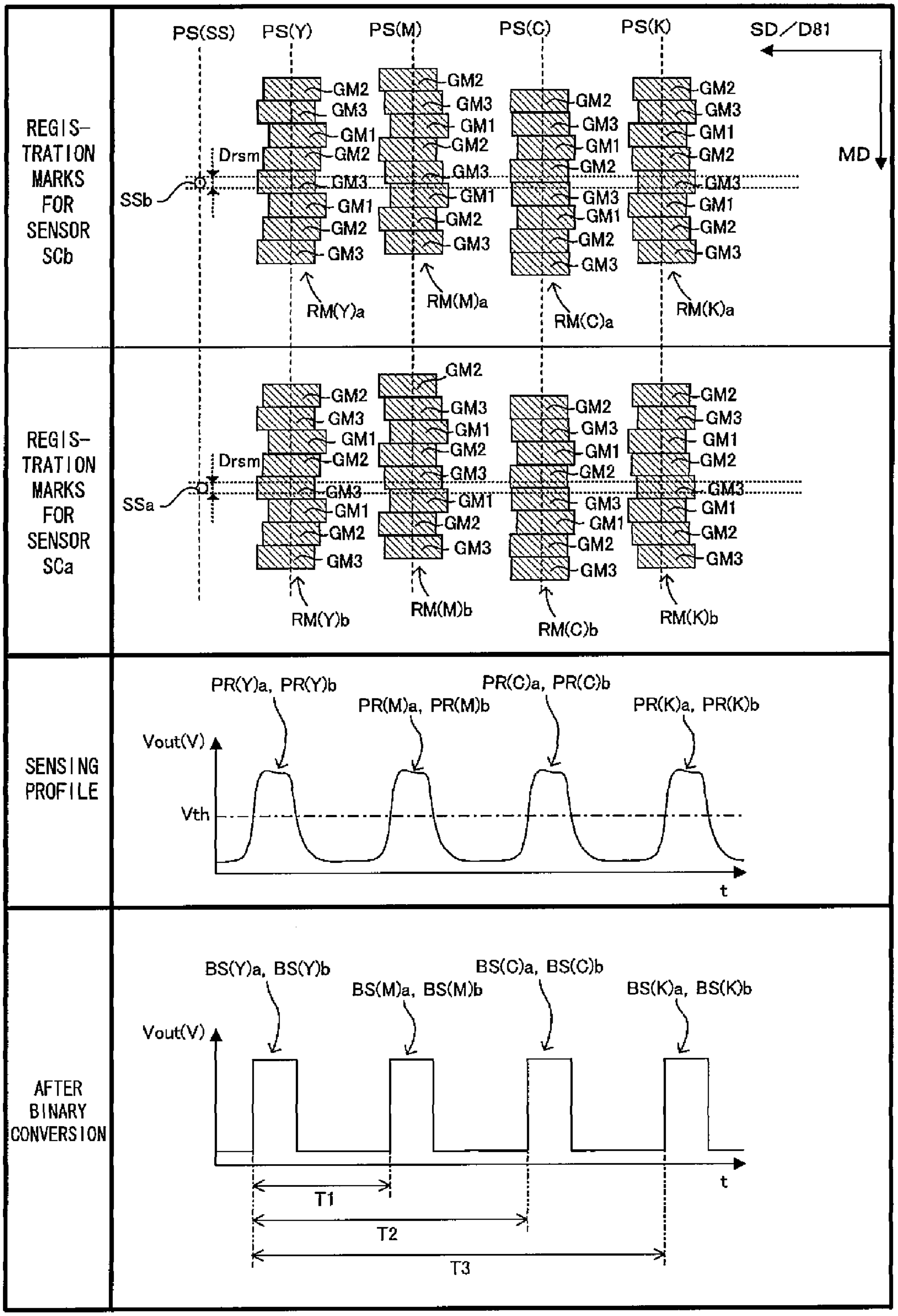
FIG. 26 is a diagram showing a case where the invention is applied to the construction in which the positions of the registration marks of the respective colors formed for the same optical sensors differ in the main scanning direction.

FIG. 26 is a diagram showing a case where the invention is applied to the construction in which the positions of the registration marks RM(Y), RM(M), RM(C) and RM(K) of the respective colors formed for the same optical sensors SC differ in the main scanning direction MD. An embodiment shown in FIG. 26 differs in construction from the first embodiment in the positions of the registration marks RM in the main scanning direction MD, and the other constructions are the same. As shown in FIG. 26, upon detecting the registration marks RM(Y) of yellow (Y), the optical sensors SCa, SCb detect one group toner images GM (GM3) formed by the light emitting element groups 295 (295(3)) of the same number (3). Accordingly, as shown in the row "SENSING PROFILE" of FIG. 26, a detection waveform PR(Y)a of the optical sensor SCa and the one PR(Y)b of the optical sensor SCb are equal. Further, as shown in the row "AFTER BINARY CONVERSION" of FIG. 26, binary signals BS(Y)a, BS(Y)b obtained by converting such detection waveforms into binary values are also equal between the optical sensors SCa, SCb.

Upon detecting the registration marks RM(M) of magenta (M), the optical sensors SCa, SCb detect two group toner images GM (GM3, GM1) formed by the same number of (two) light emitting element groups 295 (295(3), 295(1)) from the light emitting element group 295 (295(3)) of the same number (3). Accordingly, as shown in the row "SENSING PROFILE" of FIG. 26, a detection waveform PR(M)a of the optical sensor SCa and the one PR(M)b of the optical sensor SCb are equal. Further, as shown in the row "AFTER BINARY CONVERSION" of FIG. 26, binary signals BS(M) a, BS(M)b obtained by converting such detection waveforms into binary values are also equal between the optical sensors SCa, SCb. This similarly holds for the other colors. In this way, a difference in detection characteristic between the respective optical sensors SCa, SCb is suppressed also in the embodiment shown in FIG. 26. By detecting the registration marks RM with the optical sensors SCa, SCb having substantially equal detection characteristics, the above skew error detection can be suppressed and a satisfactory color misregistration correction operation can be performed.

In the first and second embodiments, the registration marks RM are formed for the respective colors and the displacements of the registration marks RM of the respective colors in the sub scanning direction SD are detected. In order to detect a skew upon detecting these displacements, a plurality of optical sensors SCa, SCb are disposed at positions different in the main scanning direction MD. In other words, the registration marks RM are formed for the respective optical sensors SCa, SCb, and a skew is judged if the detection timings of the registration marks RM by the respective optical sensors SCa, SCb differ. In the first and second embodiments, the respective optical sensors SCa, SCb detect images obtained by developing latent images formed by the common lens row LSR in order to suppress the above skew error detection.

However, the problem of the skew error detection could occur not only in the case where skew detection is made upon detecting the displacements in the sub scanning direction SD as in the first and second embodiments, but also in the case where skew detection is made, for example, upon detecting color misregistration in the main scanning direction MD. Thus, the invention is suitably applied even in the case of the skew detection upon detecting the color misregistration in the main scanning direction MD. This is described below.

Figure 27:
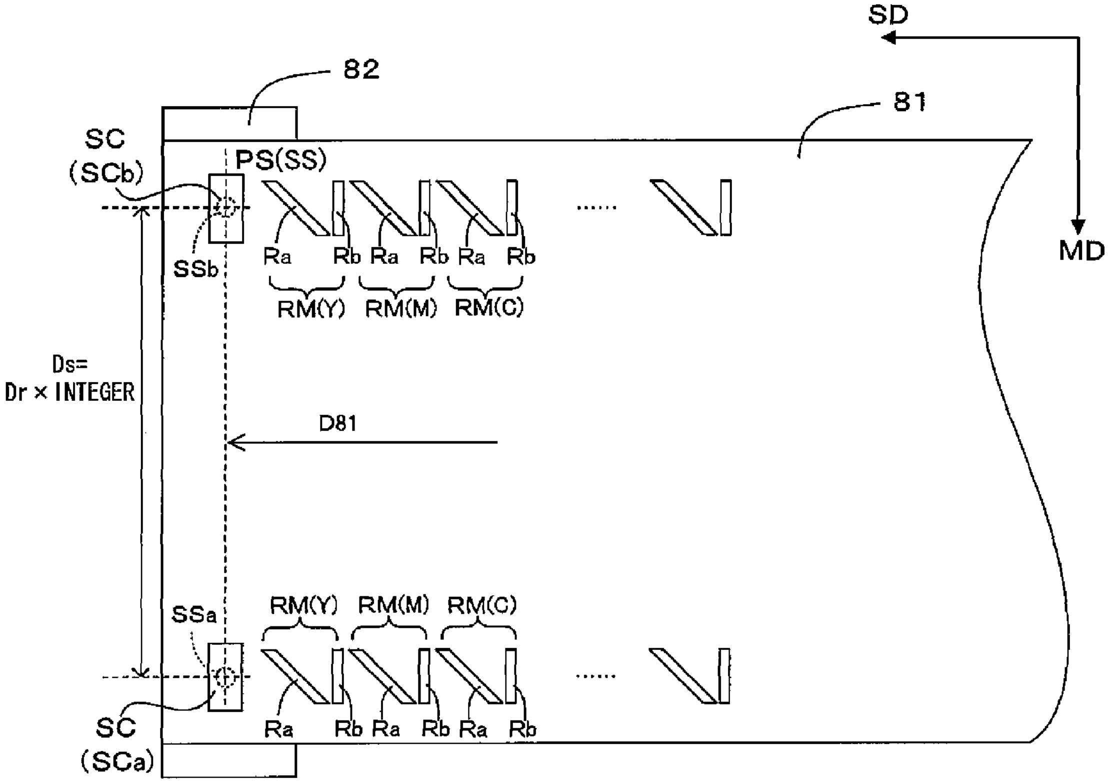
FIG. 27 is a diagram showing registration marks formed upon detecting color misregistration in the main scanning direction.

FIG. 27 is a diagram showing registration marks formed upon detecting color misregistration in the main scanning direction. An embodiment shown in FIG. 27 and the above embodiments are common in that the registration marks RM(Y), RM(M), RM(C) and RM(K) for the respective colors Y, M, C and K are formed side by side in the sub scanning direction SD. However, the configuration of the respective registration marks RM(Y), RM(M), RM(C) and RM(K) differ between the embodiment shown in FIG. 27 and the above embodiments. In other words, in the embodiment shown in FIG. 27, each of the registration mark RM(Y), etc. is made up of an oblique part Ra oblique to the main scanning direction MD and a horizontal part Rb substantially parallel to the main scanning direction MD. By detecting the registration marks RM(Y), etc. made up of the oblique parts Ra and the horizontal parts Rb with optical sensors SC, displacements of the registration marks RM(Y), etc. in the main scanning direction MD can be detected.

Figure 28:
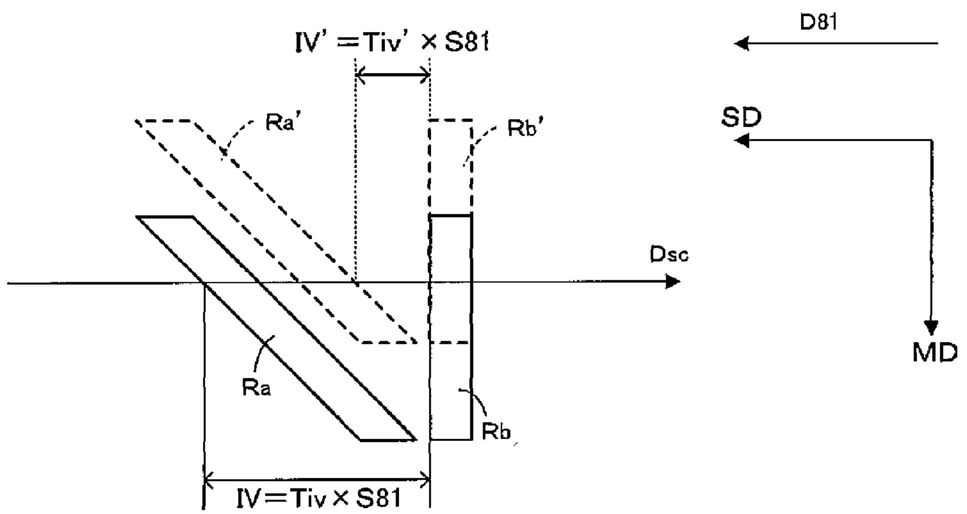
FIG. 28 is a diagram showing the detection principle of the color misregistration in the main scanning direction.

FIG. 28 is a diagram showing the detection principle of the color misregistration in the main scanning direction. The registration mark Ra, Rb shown by solid line in FIG. 28 corresponds to the registration mark free from displacement, and the registration mark Ra', Rb' shown by broken line in FIG. 28 corresponds to the registration mark with a displacement.

First of all, a detection operation of the registration mark Ra, Rb free from displacement will be described. Since the transfer belt 81 moves in the moving direction D81 as described above, the registration mark Ra, Rb also moves in the moving direction D81 as this transfer belt 81 moves. Then, the registration mark Ra, Rb passes a sensor spot (not shown in FIG. 28) of the optical sensor SC to be detected by the optical sensor SC. In other words, the sensor spot passes above the registration mark Ra, Rb in a direction of arrow Dsc shown in FIG. 28 to detect the registration mark Ra, Rb. Accordingly, the optical sensor SC detects a downstream edge of the horizontal part Rb in the moving direction D81 after first detecting a downstream edge of the oblique part Ra in the moving direction D81. At this time, an interval between the downstream edge of the oblique part Ra and the downstream edge of the horizontal part Rb on the arrow Dsc is an interval IV Accordingly, an edge detection time Tiv from the edge detection of the oblique part Ra to that of the horizontal part Rb is obtained from an equation Tiv=IV/S81, where, S81 represents a conveying speed of the transfer belt 81.

On the other hand, in the example shown in FIG. 28, the registration mark Ra', Rb' is displaced upward in FIG. 28 relative to the registration mark Ra, Rb. As a result, an interval IV' between the downstream edges of the oblique part Ra' and the horizontal part Rb' on the arrow Dsc in the registration mark Ra', Rb' thus displaced is shorter as compared with the case free from displacement (that is, IV'<IV). Accordingly, an edge detection time Tiv' (=IV'/S81) from the edge detection of the oblique part Ra' to that of the horizontal part Rb' is also shorter than the edge detection time Tiv in the case free from displacement (that is, Tiv'<Tiv). If the registration mark Ra', Rb' is displaced downward contrary to the example shown in FIG. 28, the edge detection time Tiv' becomes longer than the edge detection time Tiv (that is, Tiv'>Tiv). As described above, if the registration marks RM(Y), etc. are displaced, the edge detection times Tiv from the downstream edge detections of the oblique parts Ra to those of the horizontal parts Rb vary. Therefore, in this color misregistration correction operation, displacements in the main scanning direction MD among the respective colors are calculated from the edge detection times Tiv.

Figure 29:
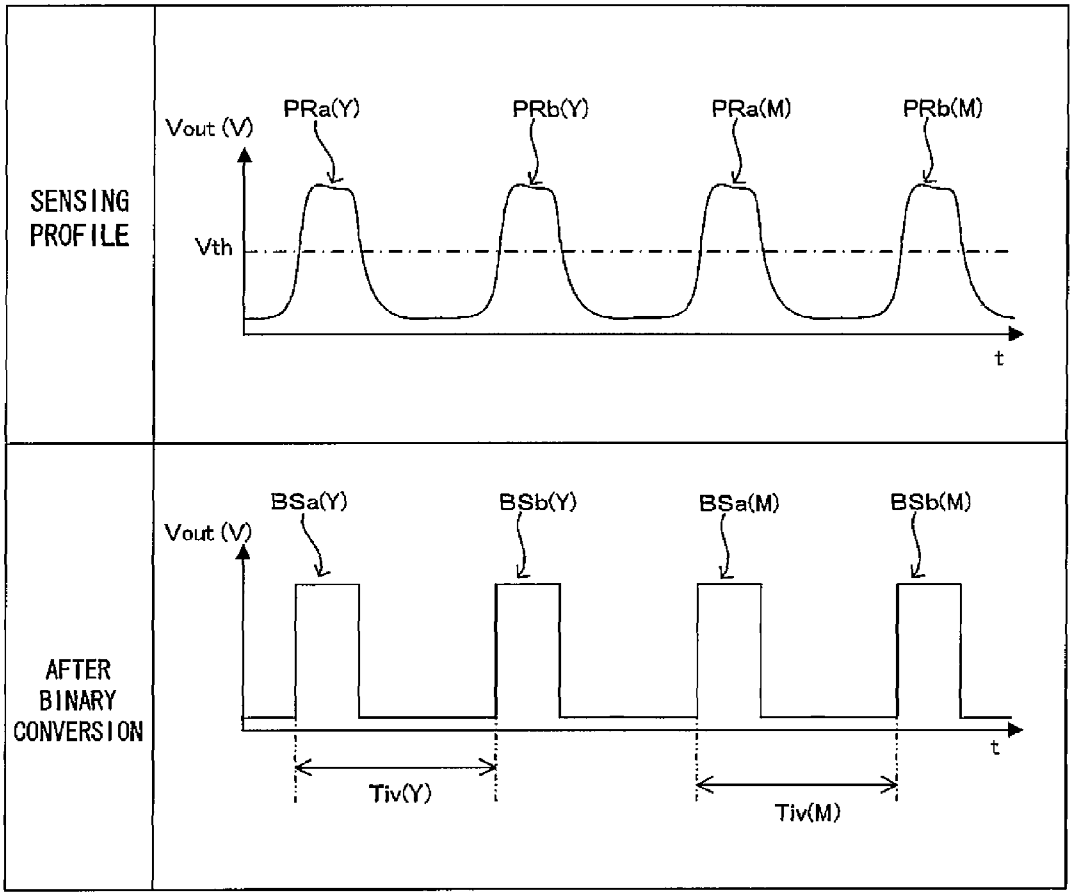
FIG. 29 is a diagram showing the color misregistration correction operation in the main scanning direction.

FIG. 29 is a diagram showing the color misregistration correction operation in the main scanning direction. FIG. 29 shows a case where a displacement in the main scanning direction MD between yellow (Y) and magenta (M) is calculated. In the row "SENSING PROFILE" of FIG. 29 are shown signals outputted from the optical sensor SC upon detecting the registration marks RM(Y), etc. In the row "AFTER BINARY CONVERSION" of FIG. 29 are shown signals obtained by converting the signals shown in the sensing profile into binary values using a threshold voltage Vth. As shown in the sensing profile, the oblique part Ra of the registration mark RM(Y) of yellow (Y) is first detected to obtain a profile signal PRa(Y) and then the horizontal part Rb of the registration mark RM(Y) of yellow (Y) is detected to obtain a profile signal PRb(Y). Subsequently, the oblique part Ra of the registration mark RM(M) of magenta (M) is detected to obtain a profile signal PRa(M) and then the horizontal part Rb of the registration mark RM(M) of magenta (M) is detected to obtain a profile signal PRb(M).

The respective profile signals PRa(Y), PRb(Y), PRa(M) and PRb(M) thus obtained are converted into binary values to obtain binary signals BSa(Y), BSb(Y), BSa(M) and BSb(M). The edge detection times Tiv for the respective colors are calculated from rising edge intervals of the binary signals BSa(Y), BSb(Y), BSa(M) and BSb(M). Specifically, the edge detection time Tiv(Y) of yellow (Y) is calculated from the rising edges of the binary signals BSa(Y), BSb(Y), and the edge detection time Tiv(M) of magenta (M) is calculated from the rising edges of the binary signals BSa(M), BSb(M). By multiplying a difference between the edge detection times Tiv of the respective colors (=Tiv(Y)−Tiv(M)) by the moving speed S81 of the transfer belt 81, a displacement in the main scanning direction MD between the registration marks RM(Y) and RM(M) can be calculated.

In the embodiment shown in FIG. 27, this color misregistration correction operation is performed for a plurality of optical sensors SCa, SCb disposed at the positions different in the main scanning direction MD. As shown in FIG. 27, a distance between the sensor spots SSa, SSb of the respective optical sensors SCa, SCb in the main scanning direction MD is set to the integral multiple of the group column pitch Dr, and the sensor spots SSa, SSb are located at the same position PS(SS) in the sub scanning direction SD. Further, the sensor spots SSa, SSb have the same shape (round shape) and size and have the same diameter Drsm (FIG. 30) in the main scanning direction MD.

The registration marks RM are formed for the respective optical sensors SCa, SCb and the displacements in the main scanning direction MD described with reference to FIGS. 28 and 29 are detected. Upon detecting such displacements, skew detection can be made from the detection results on the horizontal parts Rb. Specifically, when the line head 29 is skewed relative to the photosensitive drum 21, the registration mark RMa formed for the optical sensor SCa and the registration mark RMb formed for the optical sensor SCb are displaced in the sub scanning direction SD. Thus, timings at which the respective optical sensors SCa, SCb detect the horizontal parts Rb of the registration marks RM differ. Therefore, in the embodiment shown in FIG. 27, the skew can be detected from the detection results on the horizontal parts Rb of the registration marks RM by the respective optical sensors SCa, SCb.

However, due to a speed variation of the photosensitive drum 21 or the like, there are cases where the positions of the group toner images GM vary also in the registration marks RM shown in FIGS. 27 and 28. As a result, the sensing profiles of the respective optical sensors SCa, SCb differ and a skew may be erroneously detected. For this, it is preferable to configure the sensor spots SSa, SSb and the registration marks RM as follows.

Figure 30:
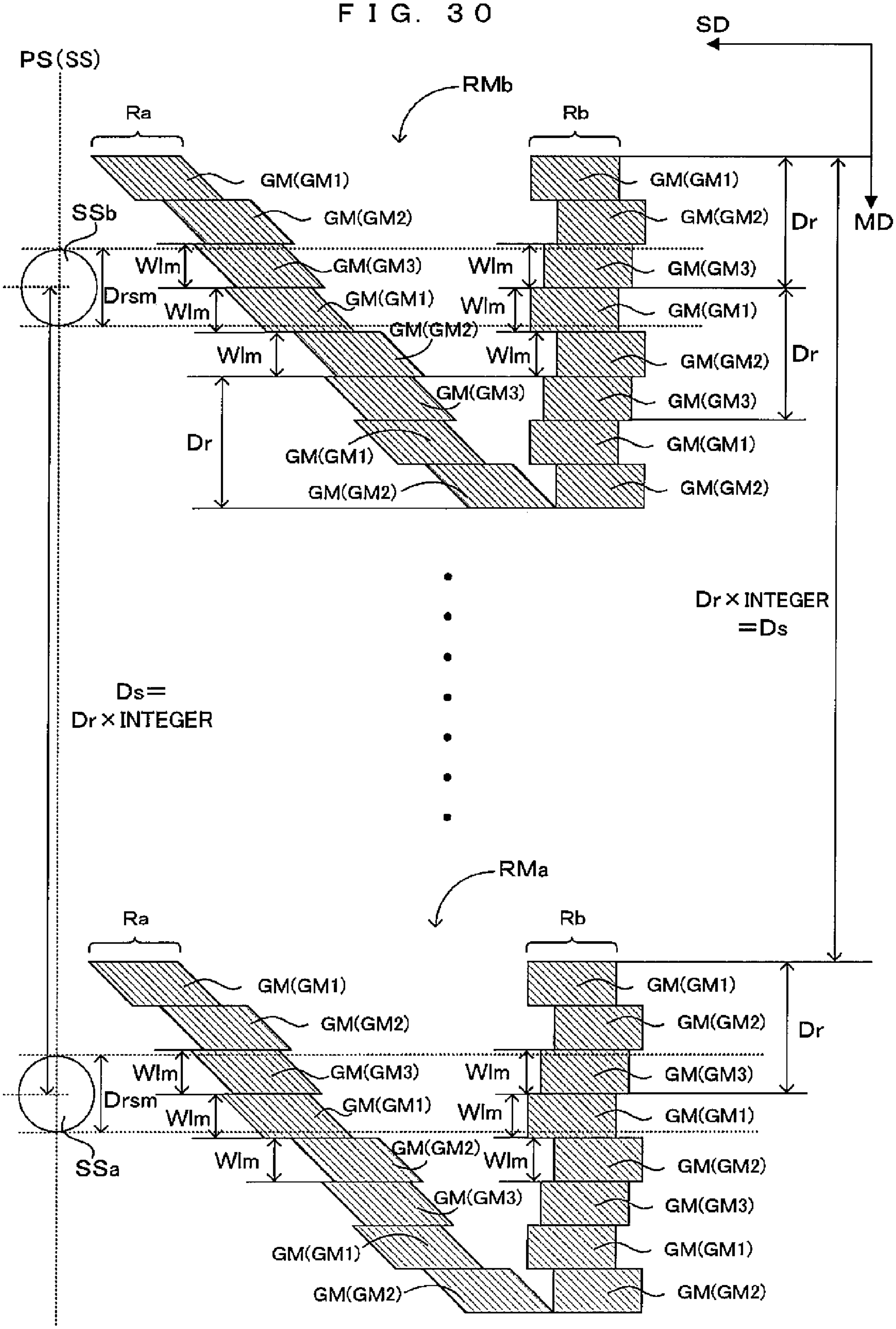
FIG. 30 is a diagram showing a relationship between the sensor spots and the registration marks in the embodiment shown in FIG. 27 and corresponds to a case in the absence of skew.

FIG. 30 is a diagram showing a relationship between the sensor spots and the registration marks in the embodiment shown in FIG. 27 and corresponds to a case in the absence of skew. In FIG. 30, for the easier understanding of the invention, reference numerals RMa, RMb are assigned to two registration marks RM formed for the respective optical sensors SCa, SCb and the registration marks RMa, RMb are shown side by side in the main scanning direction MD, but an interval between the registration marks RMa, RMb in the main scanning direction MD is partly omitted for the sake of diagrammatic representation. As shown in FIG. 30, the registration marks RMa, RMb have the same shape. The registration marks RMa, RMb are both made up of the same number of (eight) group toner images GM consecutive in the main scanning direction MD, and the distance between the registration marks RMa, RMb in the main scanning direction MD is the integral multiple of the group column pitch Dr (=distance Ds between the sensor spots SSa, SSb in the main scanning direction MD). Therefore, the registration marks RMa, RMb are made up of the same number of (eight)

group toner images GM consecutive in the main scanning direction MD from the group toner image GM1 formed by the same lens row LSR1 (that is, the light emitting element groups 295 of the same number (1)).

Specifically, the group toner images GM by the same lens row LSR are cyclically formed at the group column pitches Dr in the main scanning direction MD. For example, as shown in FIG. 30, the group toner images GM1 formed by the lens row LSR1 are cyclically formed at intervals Dr in the main scanning direction MD. Accordingly, when the distance between the registration marks RMa, RMb in the main scanning direction MD is the integral multiple of the group column pitch Dr, the group toner images GM1 formed by the same lens row LSR1 (light emitting element groups 295 of the same number (1)) are located at ends in the both registration marks RMa, RMb as shown in FIG. 30. By constituting the respective registration marks RMa, RMb by the same number of group toner images MG, the registration marks RMa, RMb are both made up of the same number of (eight) group toner images GM consecutive in the main scanning direction MD from the group toner images GM1 formed by the same lens row LSR1 (by the light emitting element groups 295 of the same number (1)).

The sensor spots SSa, SSb of the optical sensors SCa, SCb are configured as follows. Specifically, the distance between the sensor spots SSa, SSb in the main scanning direction MD is set to the integral multiple of the group column pitch Dr and the respective sensor spots SSa, SSb have an equal diameter Drsm in the main scanning direction MD. Further, as described above, the group toner images GM by the same lens row LSR are cyclically formed at the intervals Dr in the main scanning direction MD. Accordingly, in the case where the optical sensor SCa detects two group toner images GM3, GM1 arranged side by side in the main scanning direction MD, the optical sensor SCb detects the group toner images GM3, GM1 at a position distanced by the integral multiple (=Ds) of the group column pitch Dr in the main scanning direction MD from the group toner images GM3, GM1 detected by the optical sensor SCa. In other words, the both optical sensors SCa, SCb detect one group toner image GM3 formed by the lens row LSR3 and one group toner image GM1 formed by the lens row LSR1, that is, detect the same number of group toner images formed by the same lens rows LSR.

In this way, the respective optical sensors SCa, SCb detect the toner images formed by the common plurality of lens rows LSR3, LSR1. As described above, in the absence of skew, the positions of the respective group toner images GM formed by the same lens row LSR are the same in the sub scanning direction SD independently of a speed variation of the photosensitive member. Thus, by the detection of the toner images formed by the common plurality of lens rows LSR3, LSR1 by means of the respective optical sensors SCa, SCb, the difference between the sensing profiles (detection characteristics) of the optical sensors SCa, SCb can be suppressed. As a result, the occurrence of the problem of erroneously detecting a skew despite the absence of any skew is suppressed and a satisfactory color misregistration correction operation can be performed.

Both the optical sensors SCa, SCb detect one group toner image GM3 formed by the lens row LSR3 and one group toner image GM1 formed by the lens row LSR1, that is, detect the same number of group toner images formed by the same lens rows LSR. Thus, the difference between the sensing profiles (detection characteristics) of the respective optical sensors SCa, SCb can be more effectively suppressed, the above skew error detection can be suppressed and a satisfactory color misregistration correction operation can be performed.

The respective optical sensors SCa, SCb detect a plurality of (two) group toner images GM formed by the same number of (two) light emitting element groups 295 in the longitudinal direction LGD from the light emitting element group 295 (295(3)) of the same number (3) (by the same number of light emitting element groups 295(3), 295(1) in the order of the positions in the longitudinal direction LGD). In other words, the both optical sensors SCa, SCb detect two group toner images GM3, GM1 arranged side by side in this order in the main scanning direction MD. Thus, the difference between the sensing profiles (detection characteristics) of the respective optical sensors SCa, SCb can be more effectively suppressed, the above skew error detection can be suppressed and a satisfactory color misregistration correction operation can be performed.

In the above embodiment, displacements among mutually different colors are calculated by detecting the registration marks RM. However, besides displacements among mutually different colors, there are cases where a displacement called "sub scanning magnification displacement" occurs for one color. Specifically, there are cases where the speed of the photosensitive drum 21 is faster or slower than a desired speed, for example, for a certain color to contract or extend an image transferred to the transfer belt 81, with the result that the image transferred to the transfer belt 81 looks as if the magnification thereof would have been deviated in the sub scanning direction SD (as if a sub scanning magnification displacement would have occurred). Such a sub scanning magnification displacement can also be calculated by detecting registration marks RM as described next.

Figure 31:
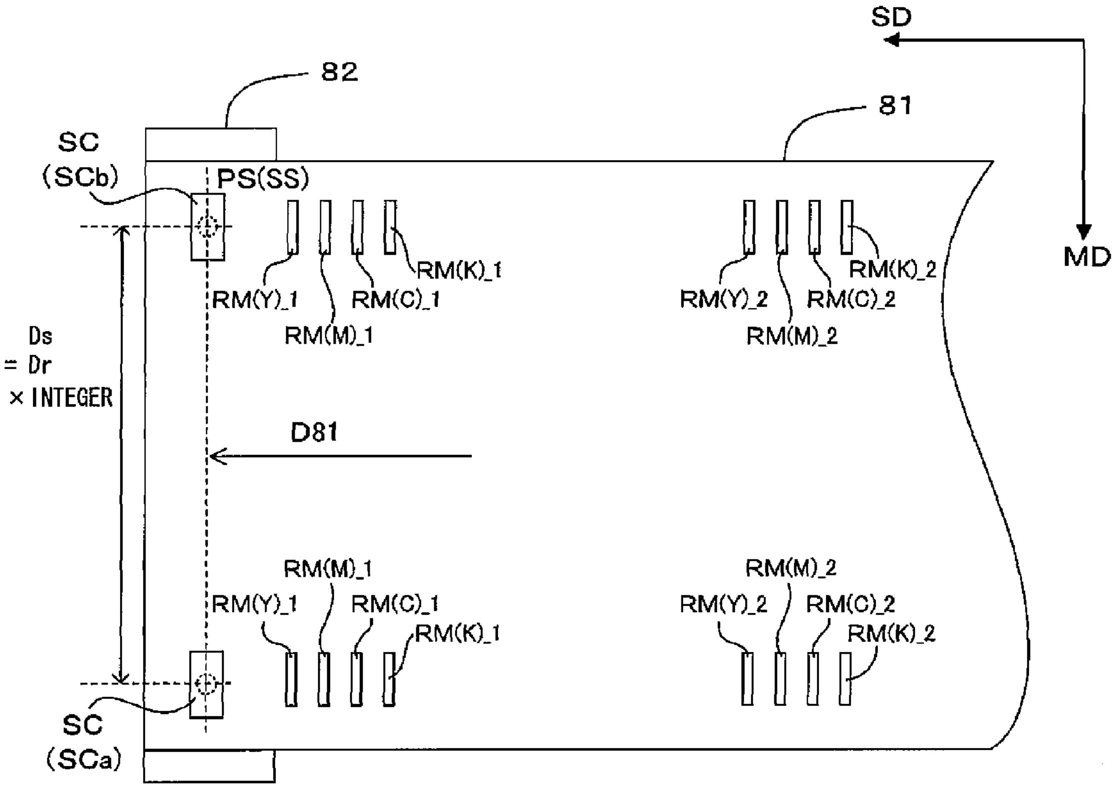
FIG. 31 is a diagram showing registration marks formed in a sub scanning magnification displacement correction operation.

FIG. 31 is a diagram showing registration marks formed in a sub scanning magnification displacement correction operation. As shown in FIG. 31, two registration marks RM are formed for each of the colors Y. M, C and K while being spaced apart in the sub scanning direction SD. For example, for yellow (Y), the registration marks RM(Y)_1, RM(Y)_2 are formed while being spaced apart in the sub scanning direction SD. These two registration marks RM(Y)_1, RM(Y)_2 are detected by the optical sensor SC to calculate a sub scanning magnification displacement for yellow (Y).

Figure 32:
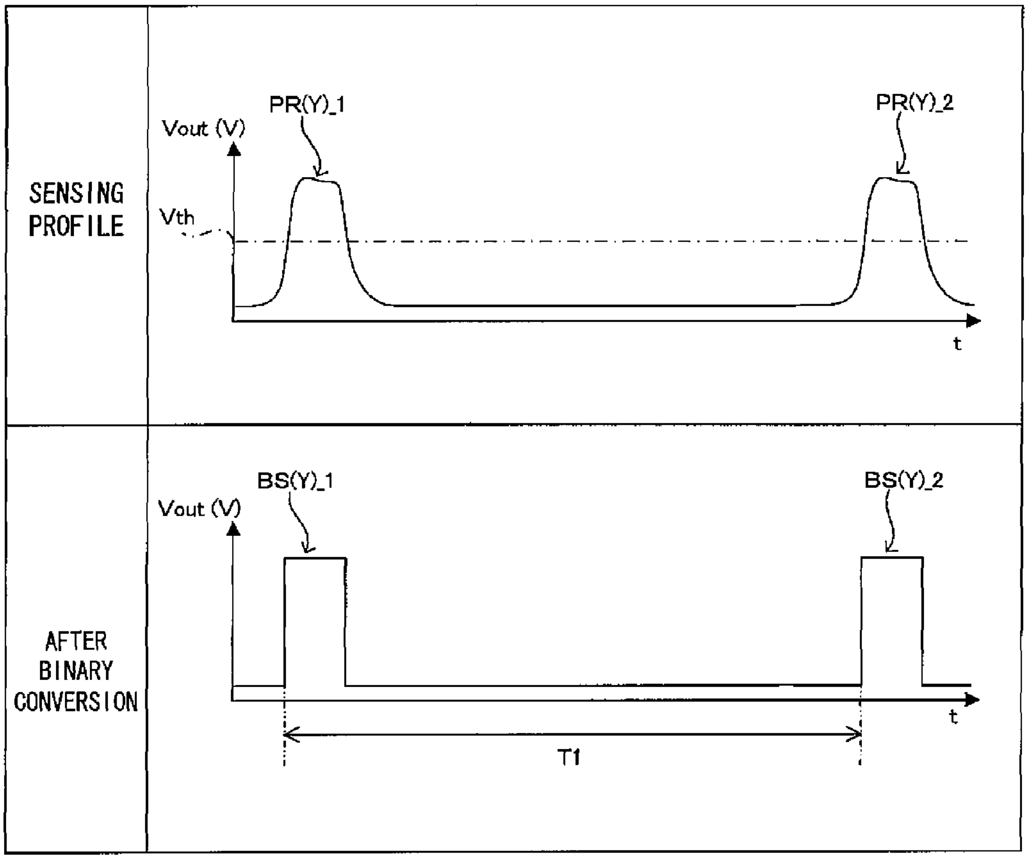
FIG. 32 is a group of graphs showing the sub scanning magnification displacement correction operation and corresponds to a case of calculating the sub scanning magnification displacement for yellow (Y).

FIG. 32 is a group of graphs showing the sub scanning magnification displacement correction operation and corresponds to a case of calculating the sub scanning magnification displacement for yellow (Y). In the row "SENSING PROFILE" of FIG. 32 are shown signals outputted by the optical sensor SC upon detecting the registration marks RM(Y)_1, RM(Y)_2. In the row "AFTER BINARY CONVERSION" of FIG. 32 are shown signals obtained by converting the signals shown in the sensing profile into binary values using a threshold voltage Vth. As shown in the sensing profile, the downstream registration mark RM(Y)_1 in the moving direction D81 of the transfer belt 81 is first detected to obtain a profile signal PR(Y)_1 and, then, the upstream registration mark RM(Y)_2 in the moving direction D81 is detected to obtain a profile signal PR(Y)_2.

The respective profile signals PR(Y)_1, PR(Y)_2 thus obtained are converted into binary values to obtain binary signals BS(Y)_1, BS(Y)_2. An edge detection time T1 is calculated from a rising edge interval of the binary signals BS(Y)_1, BS(Y)_2, and an interval between the registration marks RM(Y)_1, RM(Y)_2 in the sub scanning direction SD is calculated by multiplying this edge detection time T1 by the conveying speed S81 of the transfer belt 81. Then, by calculating how far the thus calculated interval between the registration marks RM(Y)_1, RM(Y)_2 is deviated from a desired value, the sub scanning magnification displacement can be calculated for yellow (Y). Sub scanning magnification displacements can be similarly calculated for the colors other than yellow (Y). By controlling, for example, the emission timings of the light emitting elements 2951 based on the thus calculated sub scanning magnification displacements, the length of the image to be transferred to the transfer belt 81 in the sub scanning direction SD can be set to a suitable length.

In an embodiment shown in FIG. 31, a plurality of optical sensors SCa, SCb are disposed at positions different in the main scanning direction MD. A distance between sensor spots SSa, SSb of the respective optical sensors SCa, SCb in the main scanning direction MD is set to the integral multiple of the group column pitch Dr, and the sensor spots SSa, SSb are at the same position PS(SS) in the sub scanning direction SD. Further, the sensor spots SSa, SSb have the same shape (round shape) and size and have an equal diameter Drsm (FIGS. 33 and 34) in the main scanning direction MD.

The registration marks RM are formed for the respective optical sensors SCa, SCb to perform displacement detection in the main scanning direction MD shown in FIGS. 31 and 32 and skew detection. Specifically, if the line head 29 is skewed relative to the photosensitive drum 21, the positions of the registration marks RM formed for the optical sensor SCa and those of the registration marks RM formed for the optical sensor SCb are displaced in the sub scanning direction SD, wherefore the detection timings of the registration marks RM by the respective optical sensors SCa, SCb differ. For example, a timing at which the optical sensor SCa detects the registration mark RM(Y)_1 and a timing at which the optical sensor SCb detects the registration mark RM(Y)_1 differ. Thus, even in the embodiment shown in FIG. 31, the skew can be detected from the detection timings of the registration marks RM by the respective optical sensors SCa, SCb.

Figure 33:
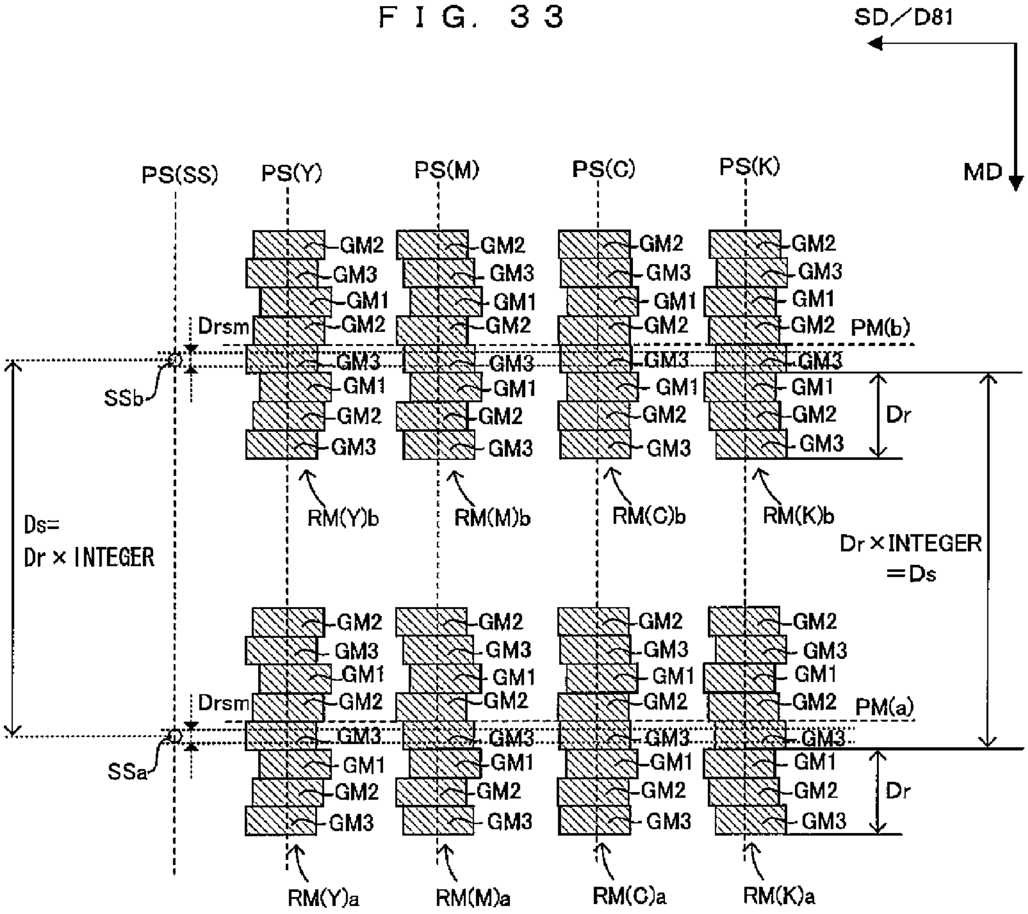
FIG. 33 is a diagram showing an exemplary relationship between the registration marks and the sensor spots in a sub-scanning-direction displacement correction operation and corresponds to a case in the absence of skew.
Figure 34:
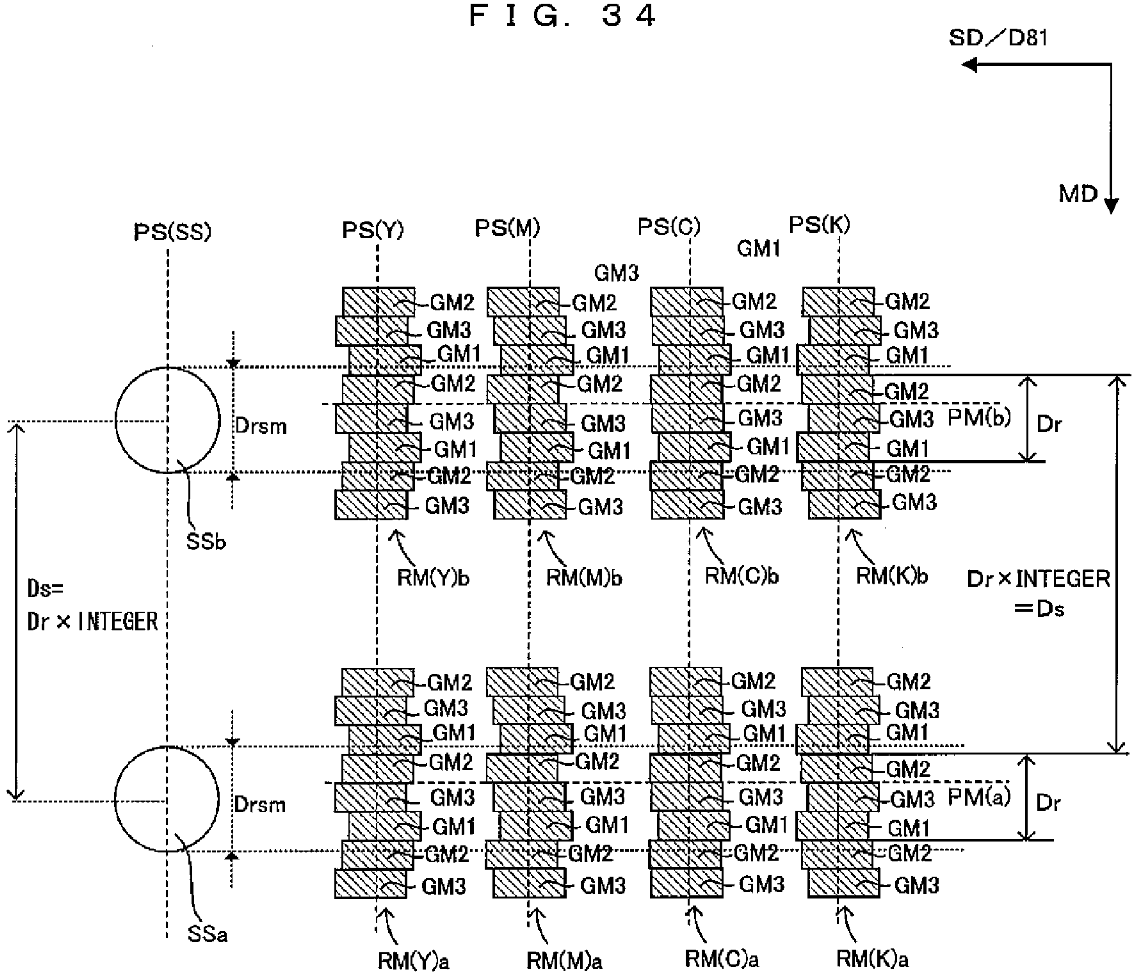
FIG. 34 is a diagram showing another exemplary relationship between the registration marks and the sensor spots in the sub-scanning-direction displacement correction operation.

However, the positions of the group toner images GM may vary also in the registration marks RM shown in FIGS. 31, 32 due to, for example, a speed variation of the photosensitive drum 21. As a result, skew error detection may occur due to a difference between the sensing profiles of the respective optical sensors SCa, SCb. To deal with this, the distance Ds between the respective optical sensors SCa, SCb adjacent in the longitudinal direction LGD (main scanning direction MD) is set to the integral multiple of the group column pitch Dr. Accordingly, the difference between the sensing profiles (detection characteristics) of the respective optical sensors SCa, SCb can be suppressed to suppress the skew error detection by adopting the construction as shown in FIG. 24 in the first embodiment (that is, construction as shown in FIG. 33 described below) or the construction as shown in FIG. 25 in the second embodiment (that is, construction as shown in FIG. 34 described below). This is specifically described below.

FIG. 33 is a diagram showing an exemplary relationship between the registration marks and the sensor spots in a sub-scanning-direction displacement correction operation and corresponds to a case in the absence of skew. In FIG. 33, for the easier understanding of the invention, the registration marks RM (RM(Y)a, RM(Y)b, for instance) formed for the respective optical sensors SCa, SCb are shown side by side in the main scanning direction MD, but an interval between the registration marks (RM(Y)a, RM(Y)b) in the main scanning direction MD is partly omitted for the sake of diagrammatic representation. As shown in FIG. 33, the registration marks are both made up of the same number of (eight) group toner images GM consecutive in the main scanning direction MD, and a distance between the registration marks RM (RM(Y)a, RM(Y)b, for instance) in the main scanning direction MD is the integral multiple of the group column pitch Dr (=distance Ds between the sensor spots SSa, SSb in the main scanning direction MD). Therefore, the registration marks RMa, RMb are made up of the same number of (eight) group toner images GM consecutive in the main scanning direction MD from the group toner images GM2 formed by the same lens row LSR2 (the light emitting element groups 295 of the same number (2)).

In an embodiment shown in FIG. 33 also, the distance between the sensor spots SSa, SSb in the main scanning direction MD is set to the integral multiple of the group column pitch Dr and the respective sensor spots SSa, SSb have an equal diameter Drsm in the main scanning direction MD. Accordingly, when the optical sensor SCa detects the group toner image GM3, the optical sensor SCb detects the group toner image GM3 at a position distanced by the integral multiple (=Ds) of the group column pitch Dr in the main scanning direction MD from the group toner image GM3 detected by the optical sensor SCa. In other words, the both optical sensors SCa, SCb detect one group toner image GM3 formed by the common lens row LSR3, that is, detect the group toner image formed by the same lens row LSR. Further, as described above, the positions of the group toner images GM formed by the same lens row LSR are substantially the same in the sub scanning direction SD in the absence of skew. Therefore, the skew error detection can be suppressed by suppressing the difference between the sensing profiles of the optical sensors SCa, SCb.

FIG. 34 is a diagram showing another exemplary relationship between the registration marks and the sensor spots in the sub-scanning-direction displacement correction operation. In FIG. 34, for the easier understanding of the invention, the registration marks RM (RM(Y)a, RM(Y)b, for instance) formed for the respective optical sensors SCa, SCb are shown side by side in the main scanning direction MD, but an interval between the registration marks (RM(Y)a, RM(Y)b) in the main scanning direction MD is partly omitted for the sake of diagrammatic representation. As shown in FIG. 34, the registration marks are both made up of the same number of (eight) group toner images GM consecutive in the main scanning direction MD, and a distance between the registration marks RM (RM(Y)a, RM(Y)b, for instance) in the main scanning direction MD is the integral multiple of the group column pitch Dr (=distance Ds between the sensor spots SSa, SSb in the main scanning direction MD). Therefore, the registration marks RMa, RMb are made up of the same number of (eight) group toner images GM consecutive in the main scanning direction MD from the group toner images GM2 formed by the same lens row LSR2 (the light emitting element groups 295 of the same number (2)).

In an embodiment shown in FIG. 34 also, the distance between the sensor spots SSa, SSb in the main scanning direction MD is set to the integral multiple of the group column pitch Dr and the respective sensor spots SSa, SSb have an equal diameter Drsm in the main scanning direction MD. Accordingly, when the optical sensor SCa detects five group toner images GM1, GM2, GM3, GM1 and GM2 arranged in the main scanning direction MD, the optical sensor SCb detects five group toner image GM1, GM2, GM3, GM1, GM2 at positions distanced by the integral multiple (=Ds) of the group column pitch Dr in the main scanning direction M from the five group toner images detected by the optical sensor SCa. In other words, the both optical sensors SCa, SCb detect two group toner images GM1 formed by the lens row LSR1, two group toner images GM2 formed by the lens row LSR2 and one group toner image GM3 formed by the lens row LSR3, that is, detect the same number of group toner images formed by the same lens rows LSR.

As described above, in this embodiment as well, the respective optical sensors SCa, SCb detect the toner images formed by the common plurality of lens rows LSR1, LSR2 and LSR3. Therefore, the skew error detection can be suppressed by suppressing the difference between the sensing profiles of the optical sensors SCa, SCb.

The both optical sensors SCa, SCb detect two group toner images GM1 formed by the lens row LSR1, two group toner images GM2 formed by the lens row LSR2 and one group toner image GM3 formed by the lens row LSR3, that is, detect the same number of group toner images formed by the same lens rows LSR. Therefore, the difference between the sensing profiles (detection characteristics) of the respective optical sensors SCa, SCb can be more effectively suppressed, the above skew error detection can be suppressed, and a satisfactory color misregistration correction operation can be performed.

The optical sensors SCa, SCb detect a plurality of (five) group toner images GM formed by the same number of (five) light emitting element groups 295 from the light emitting element group 295 (295(1)) of the same number (1) in the longitudinal direction LGD (the same number of light emitting element groups 295(1), 295(2), 295(3), 295(1) and 295 (2) in the order of the positions in the longitudinal direction LGD). In other words, the respective optical sensors SCa, SCb both detect the five group toner images GM1, GM2, GM3, GM1 and GM2 arranged in this order in the main scanning direction MD. Thus, the difference between the sensing profiles (detection characteristics) of the respective optical sensors SCa, SCb can be effectively suppressed, the above skew error detection can be suppressed and a satisfactory color misregistration correction operation can be performed.

Although the registration mark RM is made up of eight group toner images GM in the above embodiments, it is not essential to the invention to configure the registration mark RM in this manner. In short, it is sufficient that the registration mark RM is made up of at least one group toner image GM.

Although one group toner image GM constituting the registration mark RM (that is, each group toner image GM constituting the registration mark RM) is formed by all the light emitting elements 2951 belonging to the light emitting element group 295 in the above embodiments, the group toner image GM may be formed by some of light emitting elements 2951 belonging to the light emitting element group 295.

For example, the above light emitting element group 295 includes a plurality of light emitting element rows 2951R. Accordingly, the respective group latent images GL constituting the test latent image TLI may be formed, for example, by causing only one of the plurality of light emitting element rows 2951R to emit lights. In other words, each group latent image GL may be formed by causing only one of the light emitting element row 2951R of FIG. 8 to emit lights. A registration mark RM obtained by developing the test latent image TLI thus configured may be detected.

In the above embodiments, the light emitting element group 295 includes eight light emitting elements 2951. However, the number of the light emitting elements 2951 constituting the light emitting element group 295 is not limited to this and may be 2 or greater.

Figure 35:
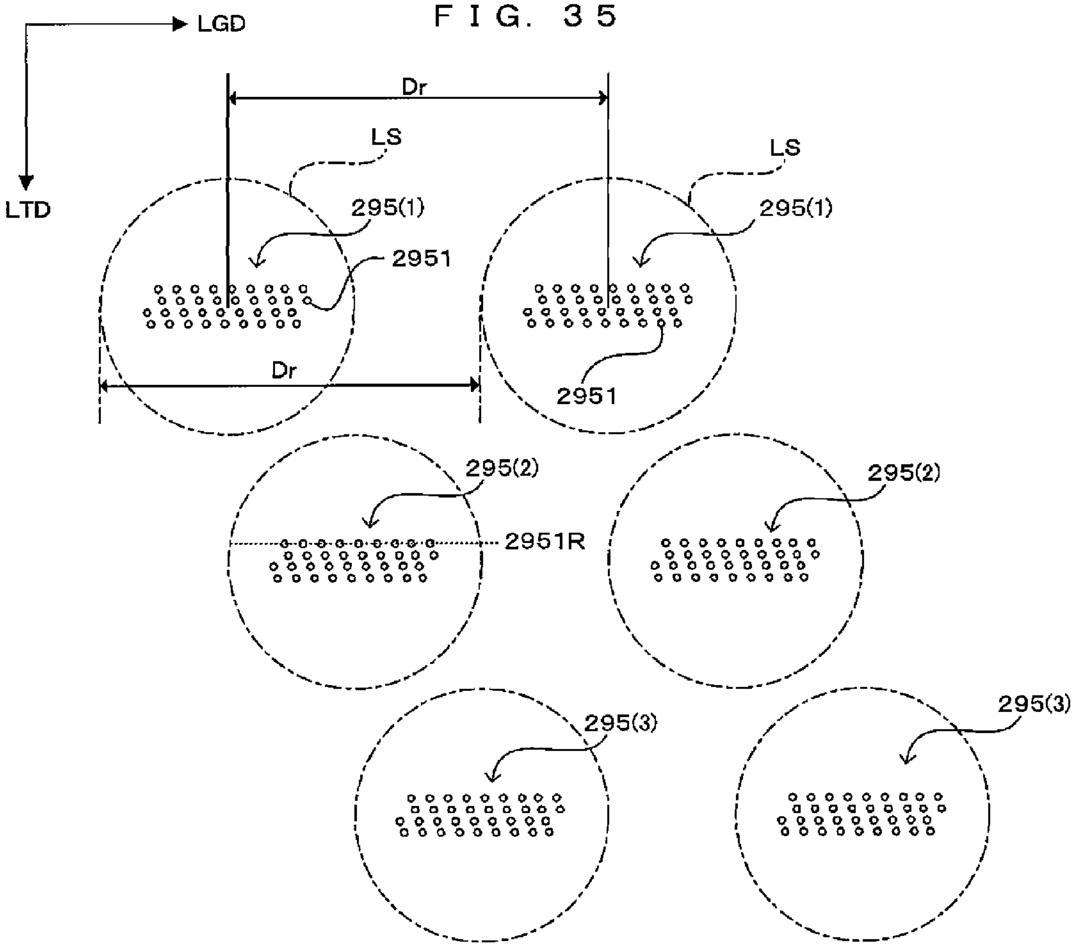
FIG. 35 is a diagram showing another configuration of light emitting element groups.

Although the light emitting element group 295 is made up of two light emitting element rows 2951R in the above embodiments, the number of the light emitting element rows 2951R constituting the light emitting element group 295 is not limited to this. FIG. 35 is a diagram showing another configuration of light emitting element groups. In an example shown in FIG. 35, four light emitting element rows 2951R are arranged in the width direction LTD in each light emitting element group 295. Each light emitting element row 2951R is made up of nine light emitting elements 2951 aligned in the longitudinal direction LGD. The respective light emitting element rows 2951R are relatively displaced in the longitudinal direction LGD, with the result that the positions of the respective light emitting elements 2951 differ in the longitudinal direction LGD.

Also in FIG. 35, a plurality of light emitting element groups 295 are arranged such that a plurality of light emitting element group columns 295C each including three light emitting element groups 295(1), 295(2) and 295(3) assigned with numbers of 1 to 3 and displaced in the width direction LTD and the longitudinal direction LGD are arranged at group column pitches Dr in the longitudinal direction LGD. This group column pitch Dr is a distance between two light emitting element groups 295 adjacent in the longitudinal direction LGD and equal to a pitch between two lenses LS adjacent in the longitudinal direction LGD. In the apparatus with the thus configured light emitting element groups 295, the difference in detection characteristic between the optical sensors SCa, SCb can be suppressed by setting the inter-spot distance between the optical sensors SCa, SCb to the integral multiple of the group column pitch Dr.

Although the registration marks RM are detected by the two optical sensors SCa, SCb in the above embodiments, the number of the optical sensors SC is not limited to two and is sufficient to be equal to or greater than 2. In short, differences in detection characteristic among a plurality of optical sensors SC can be suppressed by setting distances in the main scanning direction MD between the sensor spots SS of the optical sensors SC adjacent in the main scanning direction MD to the integral multiples of the group column pitch Dr.

In the above embodiments, the light emitting element group column 295C is formed by relatively displacing the three light emitting element groups 295(1), 295(2) and 295(3) assigned with numbers of 1 to 3 in the width direction LTD and the longitudinal direction LGD, that is, the above embodiments correspond to a case where "I" of the invention is 3. However, the value of "I" is not limited to this and may be any natural number equal to or greater than 2.

Figure 36:
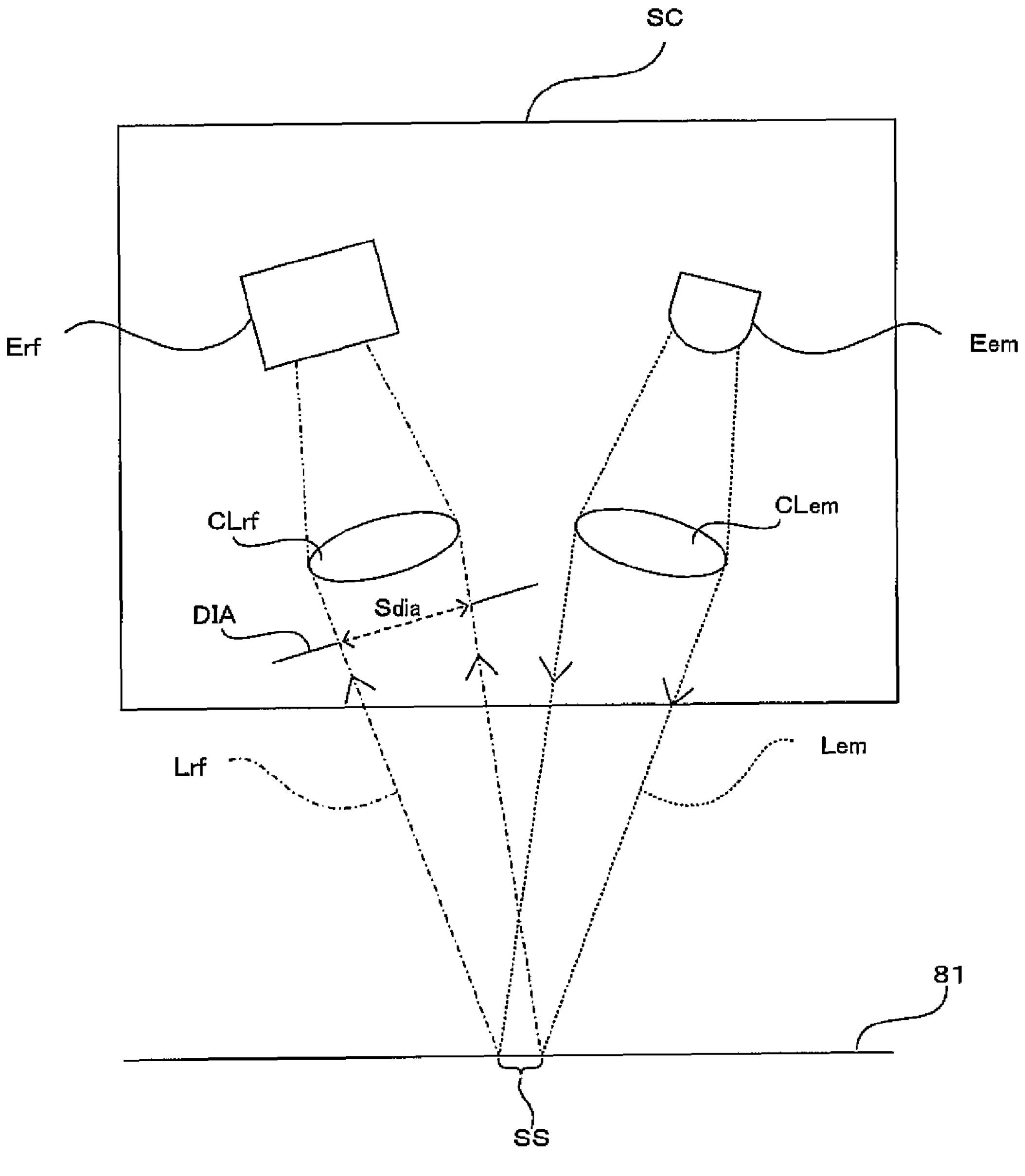
FIG. 36 is a diagram showing a modification of the optical sensor.

The optical sensors SCa, SCb may have the following construction besides the one shown in FIG. 17. FIG. 36 is a diagram showing a modification of the optical sensor SC. The optical sensor SC according to this modification is common to the one shown in FIG. 17 except for including an aperture diaphragm DIA. Accordingly, the following description is centered on the construction of the aperture diaphragm DIA. This aperture diaphragm DIA is provided between the sensor spot SS and the light receiver Erf. Accordingly, only light having passed through the aperture diaphragm DIA out of light reflected by the transfer belt 81 can reach the light receiver Erf. Further, an area Sdia of the opening of the aperture diaphragm DIA is variable, and the quantity of the light reaching the light receiver Erf can be controlled by adjusting the opening area Sdia. In other words, in this optical sensor SC, the size and shape of the sensor spot SS can be adjusted by changing the opening area Sdia. Such a function of adjusting the sensor spot SS can also be realized by providing the aperture diaphragm DIA between the light emitter Eem and the sensor spot SS. In other words, in this case, only light having passed through the aperture diaphragm DIA out of light emitted from the light emitter Eem can be reflected by the transfer belt 81 and reach the light receiver Erf. Accordingly, the quantity of the light reaching the light receiver Erf can be controlled and the size and shape of the sensor spot SS can be adjusted by changing the opening area Sdia.

As described above, in the optical sensor SC of FIG. 36, the aperture diaphragm DIA is provided and the light quantity used for the detection of detection images can be restricted by the aperture diaphragm. As a result, the occurrence of a problem that the detection result is disturbed, for example, by stray lights can be suppressed. Since the aperture diaphragm is formed such that the light quantity passing therethrough is variable, the light quantity used for the detection of detection images can be adjusted when needed. In other words, the size and shape of the sensor spot SS can be adjusted.

Although the diameters of the sensor spots SSa, SSb of the respective optical sensors SCa, SCb in the main scanning direction MD are equal to each other in the above embodiments, they may differ. In short, the difference between the sensing profiles (detection characteristics) of the respective optical sensors SCa, SCb can be suppressed if the respective sensor spots SSa, SSb are configured such that the respective optical sensors SCa, SCb detect the group toner images GM formed by the same lens rows LSR.

Figure 37:
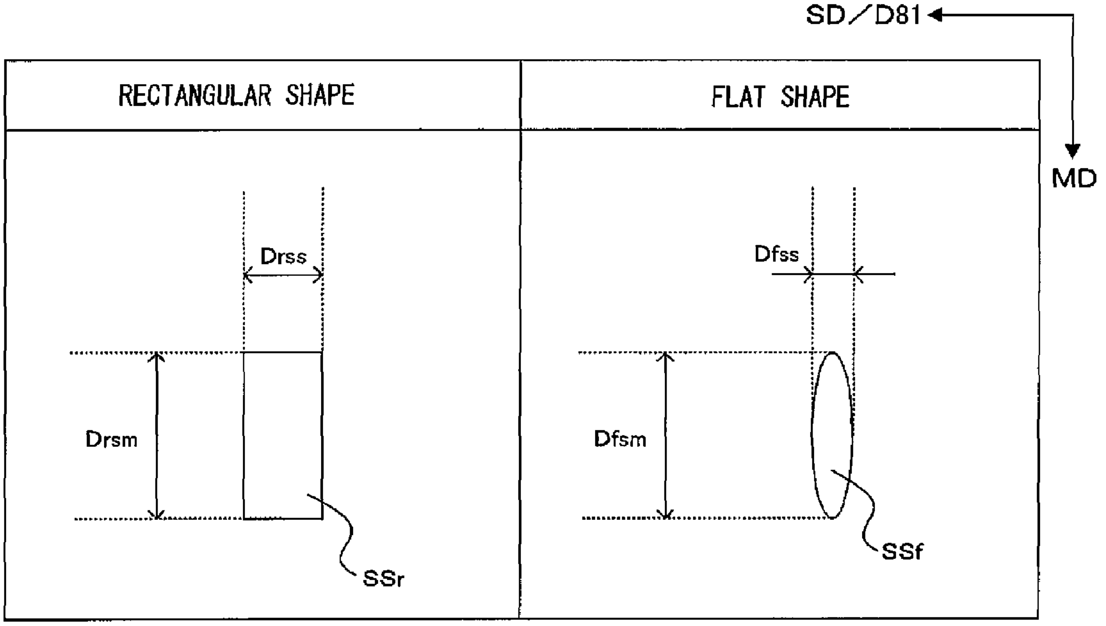
FIG. 37 is a diagram showing modified embodiments of the shape of the sensor spot.

Although the sensor spot SS has a round shape in the above embodiments, the shape thereof is not limited to this and may be shaped as shown in FIG. 37. FIG. 37 is a diagram showing modified embodiments of the shape of the sensor spot. The sensor spot SS may have a rectangular shape as shown in the column "RECTANGULAR SHAPE" of FIG. 37. In a rectangular sensor spot SSr, a main-scanning spot diameter Drsm and a sub-scanning spot diameter Drss can be defined as shown in FIG. 37. In other words, the width of the rectangular sensor spot SSr in the main scanning direction MD is the main-scanning spot diameter Drsm and the width thereof in the sub scanning direction SD is the sub-scanning spot diameter Drss. The sensor spot SS may have a flat shape as shown in the column "FLAT SHAPE" of FIG. 37. In a flat sensor spot SSf, a main-scanning spot diameter Dfsm and a sub-scanning spot diameter Dfss can be defined as shown in FIG. 37. In other words, the width of the flat sensor spot SSf in the main scanning direction MD is the main-scanning spot diameter Dfsm and the width thereof in the sub scanning direction SD is the sub-scanning spot diameter Dfss.

In the above embodiments, organic EL devices are used as the light emitting elements 2951. However, devices usable as the light emitting elements 2951 are not limited to organic EL devices and LEDs (light emitting diodes) may also be used as the light emitting elements 2951.

Although the respective group toner images GM constituting the registration mark RM have the unit width Wlm in the above embodiments, the width of the respective group toner images GM is not limited to this and may be shorter than the unit width Wlm.

In the above embodiments, a plurality of (eight in the above) light emitting elements 2951 are arranged while being grouped into the light emitting element group 295. However, a plurality of light emitting elements 2951 can be arranged as follows without being grouped.

Figure 38:
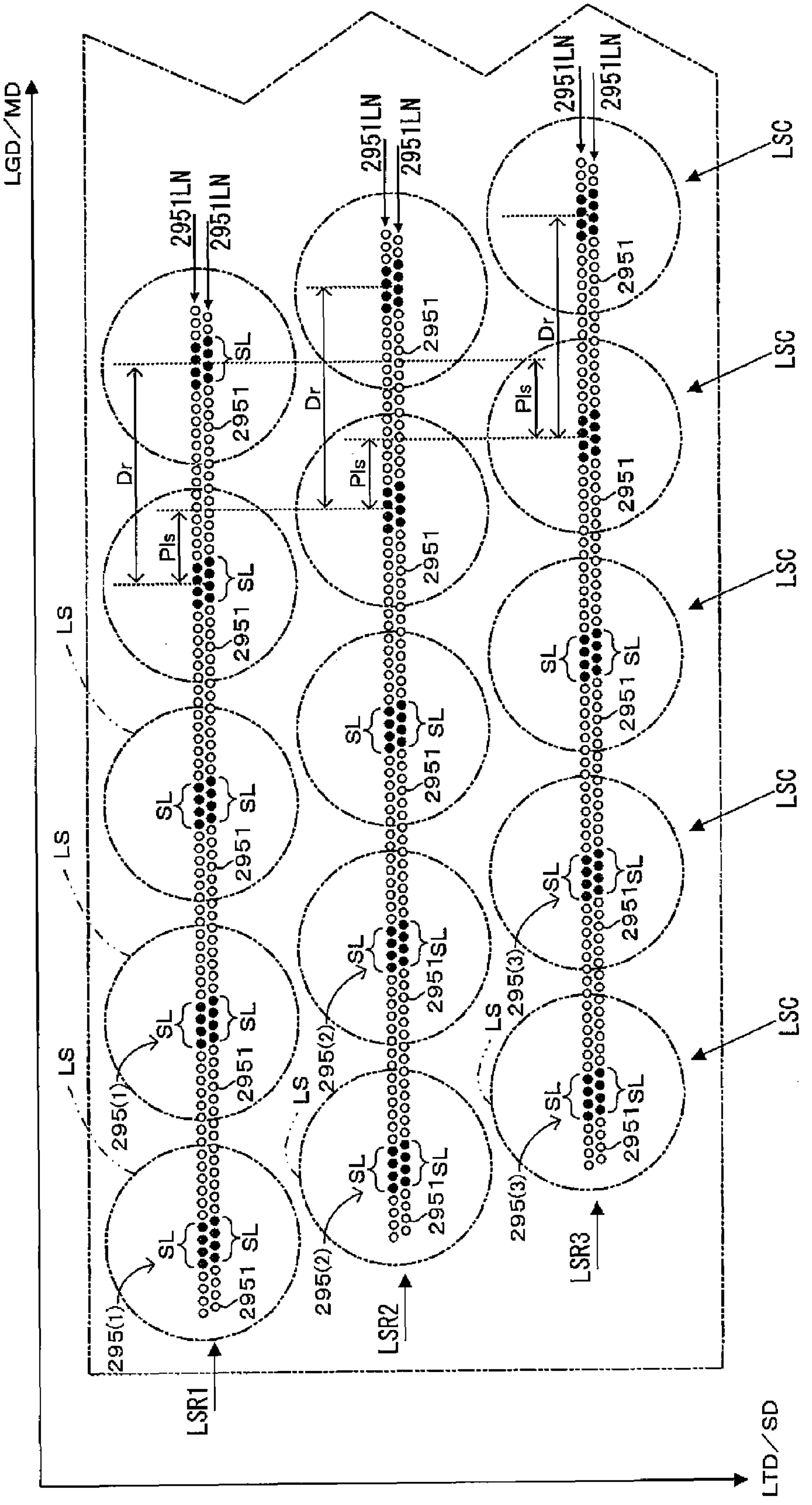
FIG. 38 is a plan view showing another arrangement mode of light emitting elements.

FIG. 38 is a plan view showing another arrangement mode of light emitting elements. Following the description of an arrangement mode of lenses LS with reference to FIG. 38, the arrangement mode of the light emitting elements 2951 is described. As shown in FIG. 38, the arrangement mode of the respective lenses LS is similar to the one described in the above embodiments. Specifically, three lens rows LSR1 to LSR3 are arranged in the width direction LTD, and a distance between two lenses LS adjacent in the longitudinal direction LGD in each lens row LSR is equal to the above group column pitch Dr. Further, the respective lens rows LSR are displaced from each other in the longitudinal direction LGD. As a result, the positions of the respective lenses LS in the longitudinal direction LGD differ from each other, and the respective lenses LS are arranged at lens pitches Pls in the longitudinal direction LGD. The arrangement mode of the light emitting elements 2951 are as follows. Specifically, a plurality of light emitting elements 2951 are aligned in the longitudinal direction LGD to form a light emitting element line 2951LN. Two light emitting element lines 2951LN are provided for one lens row LSR, and the two light emitting element lines 2951LN corresponding to the same lens row LSR are relatively displaced in the longitudinal direction LGD. As a result, the positions of the respective light emitting elements 2951 corresponding to the same lens row LSR differ in the longitudinal direction LGD. It should be noted that the number of the light emitting element lines 2951LN corresponding to one lens row LSR is not limited to two, and may be one, three or more. However, in the case of providing a plurality of light emitting element lines 2951LN, the respective light emitting element lines 2951LN are relatively displaced in the longitudinal direction LGD so that the positions of the respective light emitting elements 2951 corresponding to the same lens row LSR differ from each other in the longitudinal direction LGD.

Figure 39:
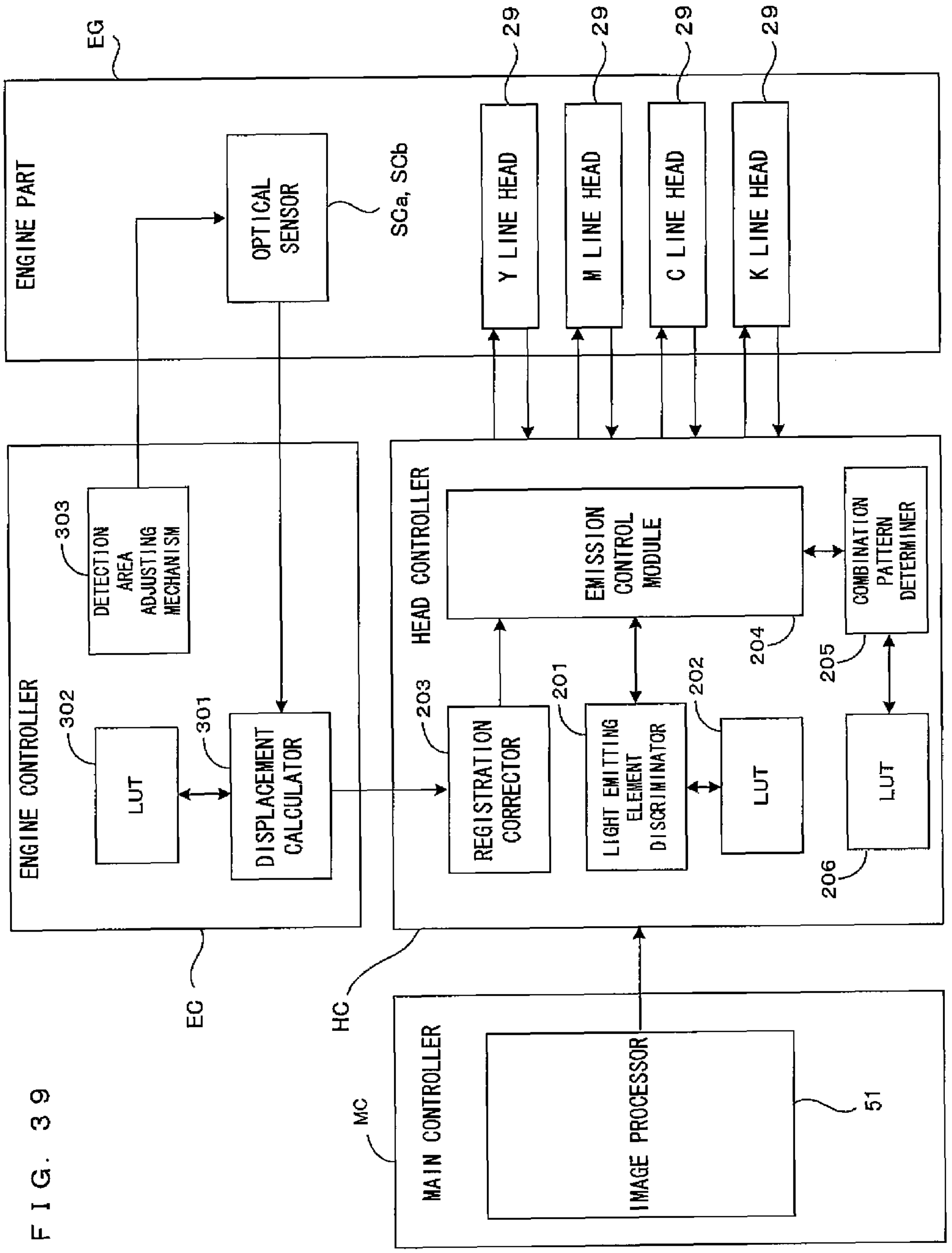
FIG. 39 is a block diagram showing the electrical construction of an image forming apparatus provided with the line heads of FIG. 38.

FIG. 39 is a block diagram showing the electrical construction of an image forming apparatus provided with the line heads of FIG. 38. An engine part EG includes optical sensors SCa, SCb capable of adjusting the size and shape of sensor spots SS by adjusting opening areas Sdia as shown in FIG. 36 and disposed at positions different in the main scanning direction MD, and registration marks RMa, RMb are detected by the respective optical sensors SCa, SCb. On the other hand, an engine controller EC for controlling this engine part EG includes a displacement calculator 301, a LUT (look-up table) 302 and a detection area adjusting mechanism 303. The displacement calculator 301 calculates a displacement based on the detection results on the registration marks RMa, RMb inputted from the optical sensors SCa, SCb and the stored content of the LUT 302. In other words, detection results of the optical sensors SC and displacements are stored being associated with each other in the LUT 302, and the displacement calculator 301 obtains the displacement by comparing the registration mark detection results and the stored content of the LUT 302. The displacement obtained by the displacement calculator 301 is outputted to a head controller HC to be used for the emission control of the light emitting elements of the line heads 29.

The head controller HC includes a registration corrector 203 for calculating correction amounts of emission timings of the light emitting elements 2951 based on the inputted displacement. The head controller HC further includes a light emitting element discriminator 201, a LUT 202, an emission control module 204, a combination pattern determiner 205 and a LUT 206 in addition to the registration corrector 203. The lenses LS and the light emitting elements 2951 corresponding to the lenses LS are stored in the LUT 202, and the light emitting element discriminator 201 discriminates the light emitting elements 2951 corresponding to the respective lenses LS by referring to the LUT 202. The light emitting elements thus discriminated are used light emitting elements SL hatched in FIG. 38, and the lens LS and eight used light emitting elements SL located in a chain double-dashed line circle representing the lens LS correspond to each other. Lights emitted from the used light emitting elements SL are imaged by the corresponding lenses LS to form latent images on the surface of the photosensitive drum 21. The emission control module 204 drives the respective used light emitting elements SL to emit lights while correcting the emission timings of the used light emitting elements SL by the correction amounts calculated by the registration corrector 203. In other words, in this embodiment, eight used light emitting elements SL corresponding to one lens LS function like the above light emitting element group 295 to form a group latent image GL and a group toner image GM.

Figure 40:
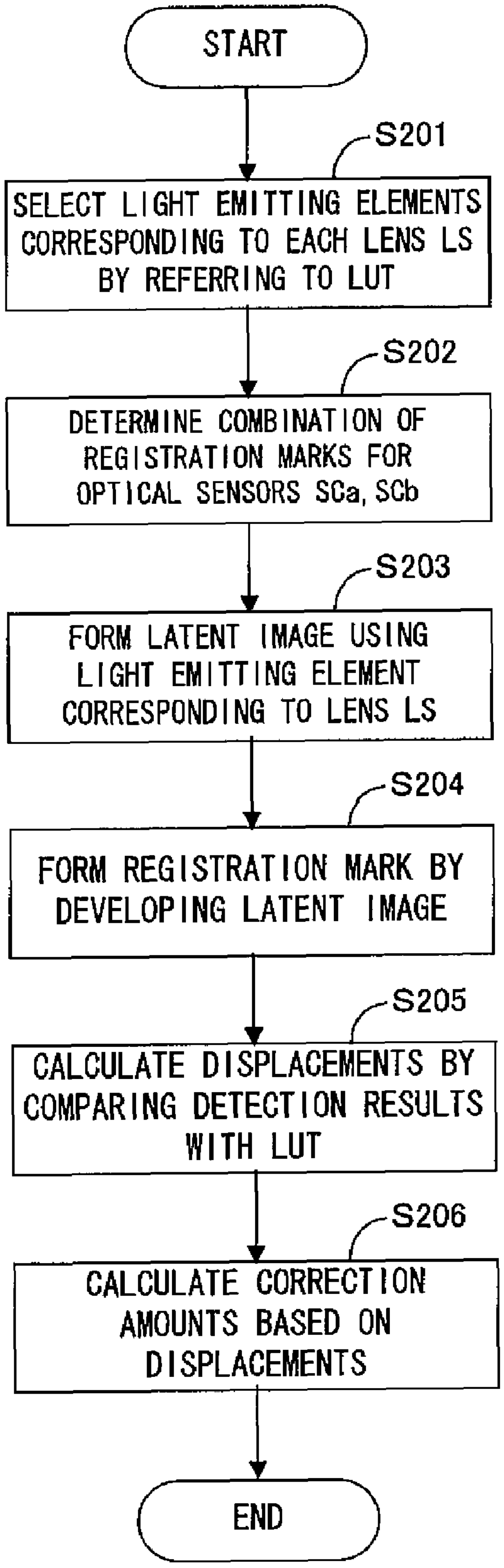
FIG. 40 is a flow chart showing a registration mark detecting operation performed in the image forming apparatus shown in FIGS. 38 and 39.

FIG. 40 is a flow chart showing a registration mark detecting operation performed in the image forming apparatus shown in FIGS. 38 and 39. In Step S201, the light emitting element discriminator 201 of the head controller HC selects the used light emitting elements SL for each lens LS by referring to the LUT (look-up table) 202. In Step S202, the configurations of the registration marks RMa, RMb formed for the respective optical sensors SCa, SCb are determined by the combination pattern determiner 205 with reference to the LUT 206. In other words, in this embodiment, registration marks RM corresponding to a combination pattern selected from a plurality of combination patterns shown in FIG. 41 are formed for the respective optical sensors SCa, SCb.

Figure 41:
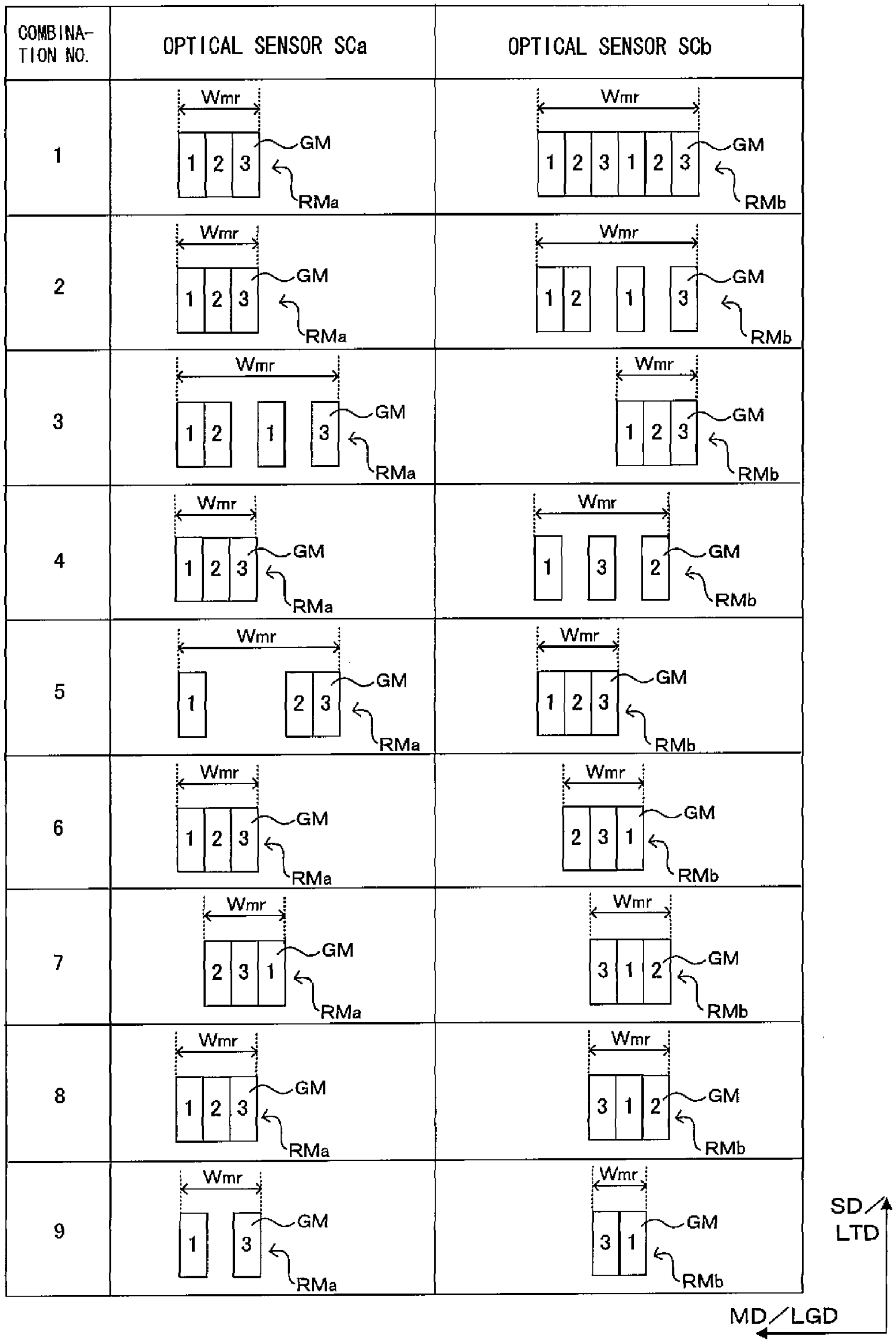
FIG. 41 is a group of diagrams diagrammatically showing the configurations of the registration marks formed for the respective optical sensors.

Here, FIG. 41 is a group of diagrams diagrammatically showing the configurations of the registration marks formed for the respective optical sensors. FIG. 41 does not show actually formed registration marks, but shows merely combinations of group toner images constituting registration marks desired to be formed. Accordingly, a positional variation of the group toner images in the sub scanning direction SD due to a circumferential speed variation of the photosensitive drum 21 is not reflected in FIG. 41.

In FIG. 41, rectangles assigned with numbers represent the group toner images GM, and the respective numbers indicate the lens rows LSR for forming the group toner images GM. In other words, the group toner images GM assigned with the number 1 are group toner images GM1 formed by the lens row LSR1, the group toner images GM assigned with the number 2 are group toner images GM2 formed by the lens row LSR2 and the group toner images GM assigned with the number 3 are group toner images GM3 formed by the lens row LSR3.

Thus, in the case of selecting, for example, a combination No. "3", the registration mark RMa for the optical sensor SCa is made up of two group toner images GM1 formed by the lens row LSR1, one group toner image GM2 formed by the lens row LSR2 and one group toner image GM3 formed by the lens row LSR3. Further, this registration mark RM is not continuous in the main scanning direction MD. For example, the two group toner images GM from the right side of FIG. 41 (that is, group toner images GM3, GM1) are separated. On the other hand, the registration mark RMb for the optical sensor SCb is made up of one each of the group toner images GM1 to GM3 formed by the respective lens rows LSR1 to LSR3, and these three group toner images GM1 to GM3 are consecutive in the main scanning direction MD.

In the case of selecting a combination No. "9", the registration mark RMa for the optical sensor SCa is made up of a group toner image GM1 by the lens row LSR1 and a group toner image GM3 by the lens row LSR3, which are formed separately from each other. On the other hand, the registration mark RMb for the optical sensor SCb is made up of a group toner image GM1 by the lens row LSR1 and a group toner image GM3 by the lens row LSR3, which are consecutively formed in the main scanning direction MD. In this embodiment, the both sensor spots of the respective optical sensors SCa, SCb have a width larger in the main scanning direction MD than the registration marks RMa, RMb to be detected, and the entire registration marks RMa, RMb pass inside the corresponding sensor spots (that is, are detected by the respective optical sensors SC).

In the second embodiment and other embodiments, the respective optical sensors SCa, SCb detect the same number of group toner images GM formed by the same lens rows LSR and these group toner images GM are consecutively formed in the main scanning direction MD. In contrast, with the respective combinations shown in FIG. 41, the respective optical sensors SCa, SCb do not necessarily detect the same number of group toner images GM formed by the same lens rows LSR and the respective group toner images GM are not necessarily consecutively formed in the main scanning direction MD. In other words, it is not essential to the invention that the respective optical sensors SCa, SCb detect the same number of group toner images GM formed by the same lens rows LSR. Neither is it essential to the invention that the respective optical sensors SCa, SCb detect the group toner images GM consecutive in the main scanning direction MD. In short, a difference between the detection characteristics of the respective optical sensors SCa, SCb can be suppressed if the respective optical sensors SCa, SCb detect the group toner images GM formed by the common lens rows LSR (imaging focusing system rows). The reason for this is as follows.

Figure 42:
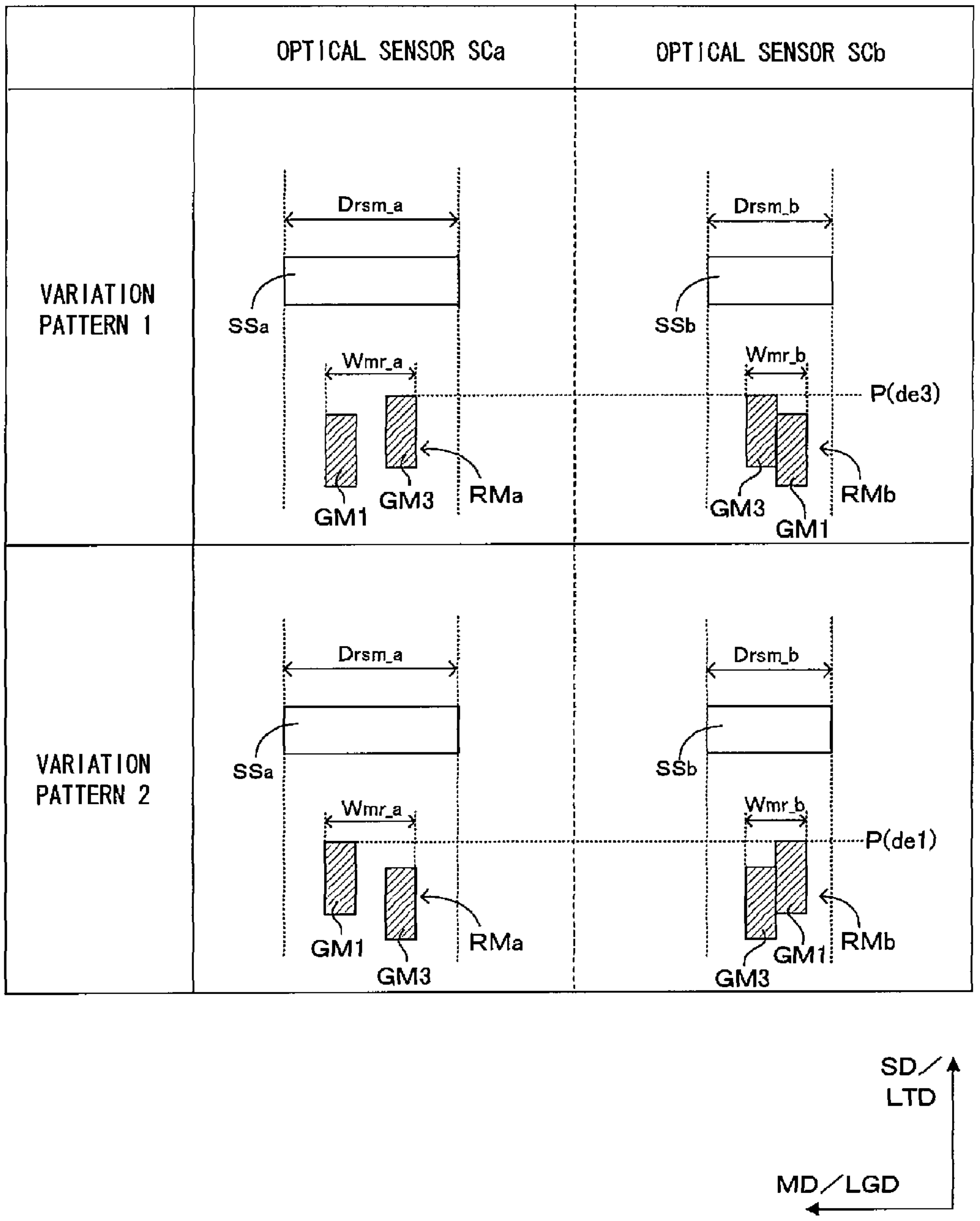
FIG. 42 is a group of diagrams showing the reason why the difference between the detection characteristics of the respective optical sensors can be suppressed.

FIG. 42 is a group of diagrams showing the reason why the difference between the detection characteristics of the respective optical sensors SCa, SCb can be suppressed and shows registration marks RMa, RMb, which can be actually formed in the case of selecting the combination No. "9". The registration mark RMa is the one formed for the optical sensor SCa, and the registration mark RMb is the one formed for the optical sensor SCb. As shown in FIG. 42, a diameter Drsm_a of the sensor spot SSa of the optical sensor SCa in the main scanning direction MD is larger than a main-scanning-direction width Wmr_a of the registration mark RMa, so that the entire registration mark RMa is detected by the optical sensor SCa. Similarly, a diameter Drsm_b of the sensor spot SSb of the optical sensor SCb in the main scanning direction MD is larger than a main-scanning-direction width Wmr_b of the registration mark RMb, so that the entire registration mark RMb is detected by the optical sensor SCb.

FIG. 42 shows a "variation pattern 1" in which the group toner image GM3 is formed downstream of the group toner image GM1 in the sub scanning direction SD and a "variation pattern 2" in which, contrary to the former, the group toner image GM1 is formed downstream of the group toner image GM3 in the sub scanning direction SD. It is described below that the difference between the detection characteristics of the respective optical sensors SCa, SCb can be suppressed independently of the variation pattern through the detection of the group toner images GM formed by the common lens rows LSR by the respective optical sensors SCa, SCb.

In the case of a variation shown in the "variation pattern 1", the both optical sensors SCa, SCb first detect the downstream edges of the group toner images GM3 in the sub scanning direction SD. In addition, these edges of the respective group toner images GM3 are at the same position P(de3) in the sub scanning direction SD independently of a circumferential speed variation of the photosensitive drum 21. Thus, even if the variation shown in the "variation pattern 1" occurs, the rise timings of the sensing profiles of the optical sensors SCa, SCb are substantially the same.

Further, in the case of a variation shown in the "variation pattern 2", the both optical sensors SCa, SCb first detect the downstream edges of the group toner images GM1 in the sub scanning direction SD. In addition, these edges of the respective group toner images GM1 are at the same position P(del) in the sub scanning direction SD independently of the circumferential speed variation of the photosensitive drum 21. Thus, even if the variation shown in the "variation pattern 2" occurs, the rise timings of the sensing profiles of the optical sensors SCa, SCb are substantially the same.

As described above, in an example shown in FIG. 42, the respective optical sensors SCa, SCb detect the group toner images GM formed by the common lens rows LSR1, LSR3. Thus, the rise timings of the sensing profiles of the optical sensors SCa, SCb are the same regardless of which variation pattern occurs.

More specifically, if the "variation pattern 2", for example, occurs when the group toner image GM1 was not formed by the lens row LSR1 for the optical sensor SCa, the rise timing of the sensing profile of the optical sensor SCa is a timing at which the downstream edge of the group toner image GM3 in the sub scanning direction SD is detected, and the rise timings of the sensing profiles of the optical sensors SCa, SCb differ. In contrast, since the respective optical sensors SCa, SCb detect the group toner images GM formed by the common lens rows LSR1, LSR3 in the example shown in FIG. 42, the rise timings of the sensing profiles of the optical sensors SCa, SCb are substantially the same independently of the variation pattern and the difference between the detection characteristics of the respective optical sensors SCa, SCb can be suppressed. Accordingly, in this embodiment, the registration marks RM are configured based on the combinations of FIG. 41.

Referring back to FIG. 40, the combination pattern determiner 205 determines the combination of the registration marks to be formed by referring to the LUT (look-up table) 206 in Step 202. Specifically, the combination Nos. and the configurations of the registration marks corresponding to the combination Nos. are stored in the LUT 206. In Steps S203, S204, the registration marks RM corresponding to the combination No. determined in Step S202 are formed for the respective optical sensors SCa, SCb. In other words, the used light emitting elements SL corresponding to the lenses LS for forming the group latent images GL corresponding to the respective group toner images GM are driven to emit lights to form the group latent images GL. These group latent images GL are developed to form the group toner images GM, thereby forming the registration marks RM. At this time, there are formed the registration marks corresponding to the correction operation to be performed out of the color misregistration correction operation in the sub scanning direction SD, the color misregistration correction operation in the main scanning direction MD and the sub-scanning-direction magnification correction operation.

Then, displacements are obtained from the detection results on the registration marks RM by the respective optical sensors SCa, SCb and the stored content of the LUT 302 (Step S205) and the correction amounts of the emission timings of the light emitting elements are calculated based on these displacements (Step S206). The skew detection can be performed as such displacements are detected. As described above, since the respective optical sensors SCa, SCb detect the group toner images GM formed by the common lens rows LSR (imaging optical system rows) in this embodiment, the rise timings of the sensing profiles of the optical sensors SCa, SCb are the same and the occurrence of the skew error detection can be suppressed.

An embodiment of an image forming apparatus according to an aspect of the invention comprises a latent image carrier moving in a first direction, an exposure head, a developing unit and two detectors. The exposure head includes light emitting elements and two or more imaging optical system rows which are arranged in the first direction and each of which is made up of imaging optical systems which are arranged in a second direction different from the first direction and image lights emitted from the light emitting elements on the latent image carrier. The developing unit develops a latent image formed on the latent image carrier by the exposure head. The two detectors detect images obtained by developing latent images by the developing unit, the latent images being formed using the same imaging optical system row.

An embodiment of an image forming method according to an aspect of the invention comprises the steps of exposing, developing and detecting. The exposing is a step of exposing a latent image carrier that moves in a first direction by an exposure head that includes light emitting elements and two or more imaging optical system rows which are arranged in the first direction and each of which is made up of imaging optical systems which are arranged in a second direction different from the first direction and image lights emitted from the light emitting elements on the latent image carrier. The developing is a step of developing a latent image formed on the latent image carrier by the exposure head to form an image. The detecting is a step of detecting images obtained by developing latent images formed using the same imaging optical system row by means of two detectors.

An embodiment of an image detecting method according to an aspect of the invention comprises the steps of exposing, developing and detecting. The exposing is a step of exposing a latent image carrier that moves in a first direction by an exposure head that includes light emitting elements and imaging optical system rows which are arranged in the first direction and each of which is made up of imaging optical systems which are arranged in a second direction different from the first direction and image lights emitted from the light emitting elements. The developing is a step of developing a latent image formed by the exposure head to form an image. The detecting is a step of detecting images obtained by developing latent images formed using the same imaging optical system row by means of two detectors.

In the embodiment (image forming apparatus, image forming method and image detecting method) thus constructed, two detectors detect images obtained by developing latent images formed by the same imaging optical system row. Therefore, it is possible to suppress a difference in detection characteristic between the two detectors.

The two detectors may detect images obtained by developing the latent images formed using one imaging optical system row. Alternatively, the two detectors may detect images obtained by developing the latent images formed using two or more imaging optical system rows. By such a construction, a difference in detection characteristic between the two detectors can be suppressed.

A transfer medium to which the images are transferred from the latent image carrier, may be provided, and the two detectors may detect the images transferred to the transfer medium. At this time, two or more latent image carriers to each of which the exposure head and the developing unit are arranged opposed may be arranged opposed to the transfer medium. A controller that obtains information on a position of the image transferred to the transfer medium from the detection results of the two detectors may also be provided, and the invention is preferably applied to such a construction. This is because, by applying the invention, the information on a position of the image transferred to the transfer medium can be properly obtained by satisfactorily performing the image detection while suppressing the difference between the detection characteristics of the two detectors. Further, the controller can satisfactorily form a color image by controlling the positions of images of a plurality of different colors based on this information.

It may be configured that detection areas of the two detectors on the transfer medium have the same shape and the same size. Hence, it is possible to easily construct such that the two detectors detect images obtained by developing the latent images formed by the same imaging optical system row, and the difference in detection characteristic between the two detectors can be suppressed.

Each detector may include a light emitter for emitting light to the detection area and a light receiver for receiving the light reflected from the detection area. At this time, an aperture diaphragm may be disposed between the light emitter and the detection area or between the detection area and the light receiver. In the case of such a construction, the light quantity used for the detection of an image can be restricted by the aperture diaphragm. Hence, the occurrence of a problem such as the detection result being disturbed due to stray lights and the like can be suppressed. Further, the aperture diaphragm may be formed such that the quantity of light passing through this aperture diaphragm is variable. Such a construction is advantageous in performing satisfactory image detection since the light quantity used for the detection of an image can be adjusted if necessary.

The latent image carrier may be a photosensitive drum that rotates about a central rotation axis thereof. In a construction using such a photosensitive drum, the speed of the photosensitive drum may vary due to the eccentricity of the rotation axis of the photosensitive drum in some cases. As a result, a variation as described above is likely to occur in an image. Therefore, it is preferable to suppress the difference in detection characteristic between the respective detectors by applying the invention to such a construction.

Further, the exposure head may include a light shielding member arranged between the light emitting elements and the imaging optical systems and formed with a light guide hole. In such a construction, lights having passed through the light guide hole formed in the light shielding member after being emitted from the light emitting elements are incident on the imaging optical systems to contribute to image formation. In other words, the lights contributing to image formation by being incident on the imaging optical systems are restricted by the light shielding member. Accordingly, a problem that images to be formed are disturbed by stray lights can be suppressed by the light shielding member, and images can be satisfactorily formed. The detection results on the images can be made stable by detecting the images satisfactorily formed in this way.

An embodiment of an image forming apparatus according to another aspect of the invention comprises a latent image carrier that rotates in a first direction and a line head including a plurality of light emitting elements grouped into light emitting element groups. The respective light emitting element groups expose areas mutually different in a second direction different from the first direction by emitting light beams to a surface of the latent image carrier. The line head includes an image forming section and a detection unit. The image forming section includes a plurality of group columns made up of I (I is an integer equal to or greater than 2) of first to I-th light emitting element groups which expose in the second direction and are displaced from each other in a direction corresponding to the first direction are arranged in an arrangement direction corresponding to the second direction. The detection unit has a plurality of detectors which are disposed at mutually different positions in the second direction and detect detection images being conveyed in the first direction. The image forming section forms the detection images for the respective detectors by developing latent images obtained by exposing the surface of the latent image carrier by means of the line head. A group image is an image formed by developing a latent image which is formed using one light emitting element group. Each detection image is made up of at least one group image. The detection of the detection images by the respective detectors is performed by detecting one group image which is formed using the light emitting element groups of the same number or a plurality of group images which are formed using the same number of light emitting element groups in the arrangement direction from the light emitting element groups of the same number.

An embodiment of an image forming method according to another aspect of the invention comprises a detection image forming step and an image detecting step. The detection image forming step is a step of forming detection images by developing latent images obtained by exposing a surface of a latent image carrier rotating in a first direction by means of a plurality of light emitting elements of a line head grouped into light emitting element groups. The image detecting step is a step of detecting the detection images being conveyed in the first direction by detectors. The respective light emitting element groups expose areas mutually different in a second direction different from the first direction by emitting light beams to the surface of the latent image carrier. The line head includes a plurality of group columns each made up of I (I is an integer equal to or greater than 2) of first to I-th light emitting element groups which expose in the second direction and are displaced from each other in a direction corresponding to the first direction are arranged in an arrangement direction corresponding to the second direction. In the detection image forming step, the detection image made up of at least one group image is formed for each detector when the group image is an image formed by developing a latent image formed using one light emitting element group. In the image detecting step, the detection of the detection images by the respective detectors is performed by detecting one group image formed using the light emitting element groups of the same number or a plurality of group images formed using the same number of light emitting element groups in the arrangement direction from the light emitting element groups of the same number.

In the embodiment (image forming apparatus, image forming method) thus constructed, the detection of the detection images by the respective detectors is performed by detecting one group image formed using the light emitting element groups of the same number or a plurality of group images formed using the same number of light emitting element groups in the arrangement direction from the light emitting element groups of the same number. Thus, a difference in detection characteristic between the respective detectors can be suppressed.

In the image forming apparatus in which the detectors detect detection images passing detection areas in the first direction, the detection areas of the detectors may have the same shape and the same size. By configuring the detection areas of the respective detectors to have the same shape and size, the difference in detection characteristic between the respective detectors can be easily suppressed.

In the image forming apparatus in which a plurality of group columns are arranged at group column pitches in the arrangement direction, a distance in the second direction between the detection areas of the detectors adjacent in the second direction may be an integral multiple of the group column pitch. This is because the difference in detection characteristic between the respective detectors can be easily suppressed by such a construction.

The detection areas of the respective detectors may be at the same position in the first direction. This is because, by such a construction, the apparatus construction can be simplified since the positions of the detection areas of the respective detectors in the first direction need not be considered such as in the case of obtaining a condition relating to image formation, for example, from the detection results of the detectors.

The respective detectors may be identically constructed. In the case of such a construction, the difference in detection characteristic between the respective detectors can be easily suppressed.

The light emitting elements may be organic EL devices. This is because the organic EL devices have high positional accuracy since being manufactured in a semiconductor process and advantageously operate to suppress the difference in detection characteristic between the detectors.

Further, in the image forming apparatus in which a transfer belt is mounted on a plurality of rollers and conveyed in the first direction and the detection images are transferred to the transfer belt and conveyed to the detection areas of the detectors after being formed by the image forming section, the detection areas of the detectors may be located on a part of the transfer belt mounted on the roller. By such a construction, the detectors can stably obtain the detection results.

Although the invention has been described with reference to specific embodiments, this description is not meant to be construed in a limiting sense. Various modifications of the disclosed embodiment, as well as other embodiments of the invention, will become apparent to persons skilled in the art upon reference to the description of the invention. It is therefore contemplated that the appended claims will cover any such modifications or embodiments as fall within the true scope of the invention.

What is claimed is:

1. An image forming apparatus, comprising:

a latent image carrier that moves in a first direction;

an exposure head that includes a light emitting element and an imaging optical system row which is arranged in the first direction and which is made up of imaging optical systems which are arranged in a second direction different from the first direction and image light emitted from the light emitting element on the latent image carrier;

a developing unit that develops a latent image formed on the latent image carrier by the exposure head; and two detectors that detect an image obtained by developing a latent image by the developing unit, the latent image being formed using the same imaging optical system row.

2. The image forming apparatus according to claim 1, wherein the detectors detect the image obtained by developing the latent image which is formed using one imaging optical system row.

3. The image forming apparatus according to claim 1, wherein the detectors detect the image obtained by developing the latent image which is formed using two or more imaging optical system rows.

4. The image forming apparatus according to claim 1, comprising a transfer medium to which the image is transferred from the latent image carrier, wherein the detectors detect the image transferred to the transfer medium.

5. The image forming apparatus according to claim 4, wherein two or more of the latent image carriers, to which the exposure head and the developing unit are arranged opposed, are arranged opposed to the transfer medium.

6. The image forming apparatus according to claim 5, comprising a controller that obtains information on a position of the image transferred to the transfer medium from the detection result of the detectors.

7. The image forming apparatus according to claim 6, wherein the controller controls the position of the image transferred from the latent image carrier to the transfer medium based on the information.

8. The image forming apparatus according to claim 1, comprising a transfer medium to which the image is transferred from the latent image carrier, wherein the two detectors have detection areas on the transfer medium whose shapes and sizes are the same.

9. The image forming apparatus according to claim 8, wherein the detectors include a light emitter that emits a light to the detection area and a light receiver that receives the light reflected from the detection area.

10. The image forming apparatus according to claim 9, comprising an aperture diaphragm that is arranged between the light emitter and the detection area or between the detection area and the light receiver.

11. The image forming apparatus according to claim 10, wherein the aperture diaphragm is so constructed and arranged that a quantity of light passing therethrough is variable.

12. The image forming apparatus according to claim 1, wherein the latent image carrier is a photosensitive drum that rotates about a central rotation axis thereof.

13. The image forming apparatus according to claim 1, wherein the exposure head includes a light shielding member that is arranged between the light emitting element and the imaging optical system and is provided with a light guide hole.

14. An image forming method, comprising:

exposing a latent image carrier that moves in a first direction by an exposure head that includes a light emitting element and an imaging optical system row which is arranged in the first direction and which is made up of an imaging optical system which is arranged in a second direction different from the first direction and images light emitted from the light emitting element on the latent image carrier;

developing a latent image formed on the latent image carrier by the exposure head to form an image; and detecting an image obtained by developing a latent image formed using the same imaging optical system row by means of two detectors.

15. An image detecting method, comprising:

exposing a latent image carrier that moves in a first direction by an exposure head that includes a light emitting element and an imaging optical system row which is arranged in the first direction and which is made up of an imaging optical system which is arranged in a second direction different from the first direction and images light emitted from the light emitting element;

developing a latent image formed by the exposure head to form an image; and detecting an image obtained by developing a latent image formed using the same imaging optical system row by means of two detectors.

* * * * *